United States Patent [19]
Martin et al.

[11] Patent Number: 6,039,899
[45] Date of Patent: *Mar. 21, 2000

[54] CONSOLIDATED CONTACT LENS MOLDING

[75] Inventors: Wallace Anthony Martin, Orange Park; Jonathan Patrick Adams, Jacksonville, both of Fla.; Finn Thrige Andersen, Vedbaek, Denmark; Stephen Robert Beaton, Neptune Beach, Fla.; Svend Christensen, Allinge, Denmark; Allan G. Jensen, Hørsholm, Denmark; Ture Kindt-Larsen, Holte, Denmark; Victor Lust, Jacksonville, Fla.; Craig William Walker, Jacksonville, Fla.; Daniel Tsu-Fang Wang, Jacksonville, Fla.

[73] Assignee: Johnson & Johnson Vision Products, Inc., Jacksonville, Fla.

[*] Notice: This patent is subject to a terminal disclaimer.

[21] Appl. No.: 09/005,277

[22] Filed: Jan. 9, 1998

Related U.S. Application Data

[60] Continuation of application No. 08/461,887, Jun. 5, 1995, abandoned, which is a division of application No. 08/258,654, Jun. 10, 1994, Pat. No. 5,804,107.

[51] Int. Cl.[7] ..................................................... B29D 11/00
[52] U.S. Cl. ...................... 264/1.36; 118/256; 264/1.37; 264/1.38; 264/101; 264/102; 264/334; 425/73; 425/135; 425/174.4; 425/347; 425/808
[58] Field of Search ..................................... 264/1.1, 1.36, 264/1.38, 102, 85, 1.37, 334, 101; 425/73, 90, 135, 347, 174.4, 451.9, 808; 118/256

[56] References Cited

U.S. PATENT DOCUMENTS

| | | |
|---|---|---|
| 2,911,678 | 11/1959 | Brunfeldt . |
| 3,423,488 | 1/1969 | Bowser . |
| 3,496,254 | 2/1970 | Wichterle . |
| 3,660,545 | 5/1972 | Wichterle . |
| 4,054,624 | 10/1977 | LeBoeuf et al. . |
| 4,284,591 | 8/1981 | Neefe . |
| 4,495,313 | 1/1985 | Larsen . |
| 4,565,348 | 1/1986 | Larsen . |
| 4,640,489 | 2/1987 | Larsen . |
| 4,680,336 | 7/1987 | Larsen et al. . |
| 4,691,820 | 9/1987 | Martinez . |
| 4,786,444 | 11/1988 | Hwang . |
| 4,889,664 | 12/1989 | Kindt-Larsen et al. . |
| 4,988,277 | 1/1991 | Wichterle et al. . |
| 5,039,459 | 8/1991 | Kindt-Larsen et al. . |
| 5,080,839 | 1/1992 | Kindt-Larsen . |
| 5,094,609 | 3/1992 | Kindt-Larsen . |
| 5,200,121 | 4/1993 | Hagmann et al. . |
| 5,230,840 | 7/1993 | Nishiguchi et al. . |
| 5,271,875 | 12/1993 | Appleton et al. . |
| 5,294,379 | 3/1994 | Ross et al. . |
| 5,681,510 | 10/1997 | Valint, Jr. et al. . |
| 5,753,150 | 5/1998 | Martin et al. ............................. 264/1.1 |

FOREIGN PATENT DOCUMENTS

| | | |
|---|---|---|
| 0 183 324 | 6/1986 | European Pat. Off. . |
| 0 227 365 | 1/1987 | European Pat. Off. . |
| 0 318 164 | 5/1989 | European Pat. Off. . |
| 61-172711 | 8/1986 | Japan . |
| 1092749A | 11/1967 | United Kingdom . |
| 1516194A | 6/1978 | United Kingdom . |
| 2235406A | 3/1991 | United Kingdom . |

Primary Examiner—Mathieu D. Vargot

[57] ABSTRACT

An automated method and apparatus is provided to mold and cure soft contact lenses. A molding station injection molds first and second mold parts for the production of the lenses and these mold parts are transferred to an inert gas or low oxygen environment wherein a series of automated stations receive the mold parts, deposit a polymerizable hydrogel within the first mold part, assemble and clamp the first and second mold parts together, apply radiant energy for polymerizing the hydrogel and subsequently separate the mold parts.

99 Claims, 37 Drawing Sheets

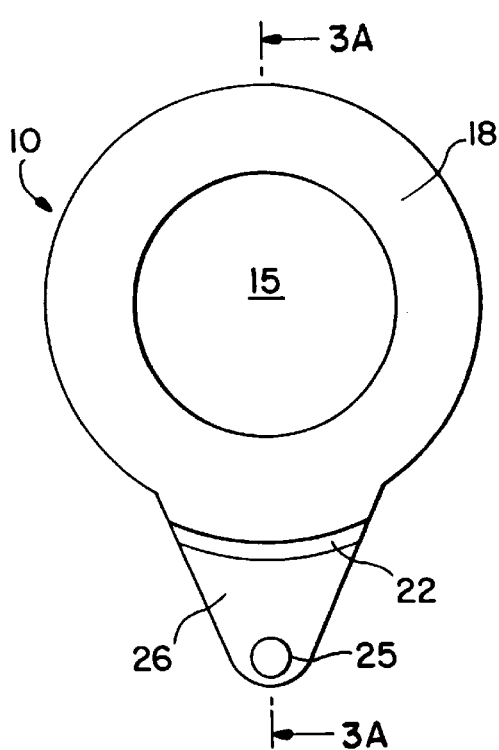
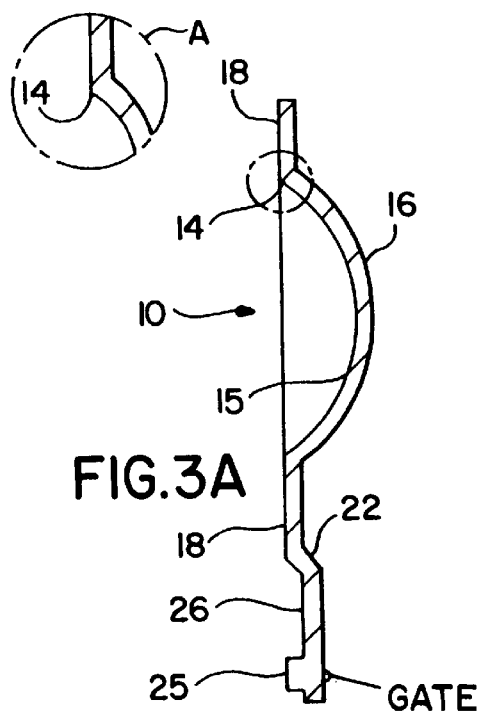
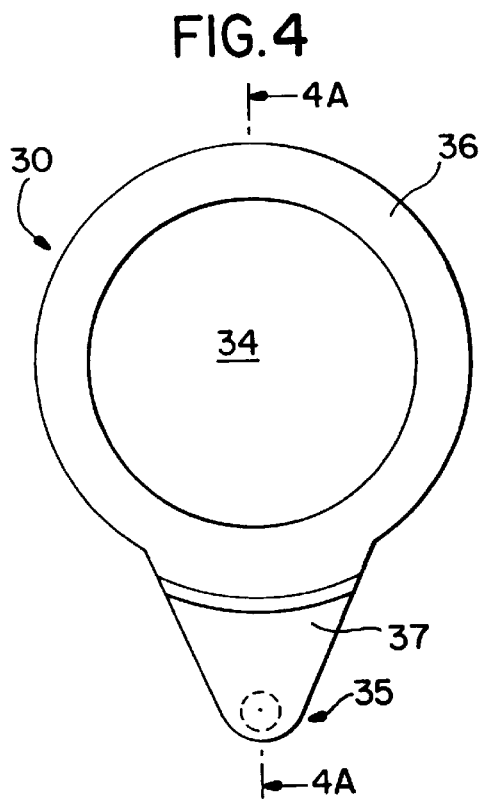
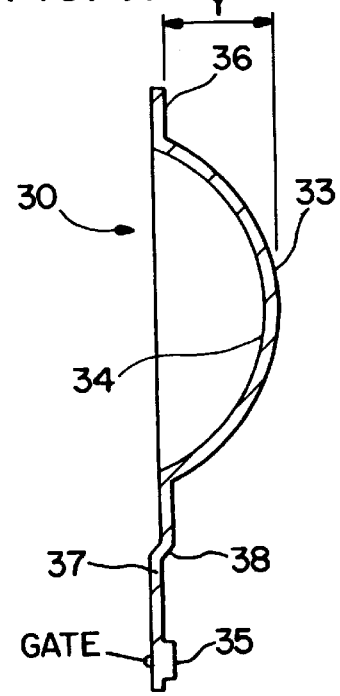

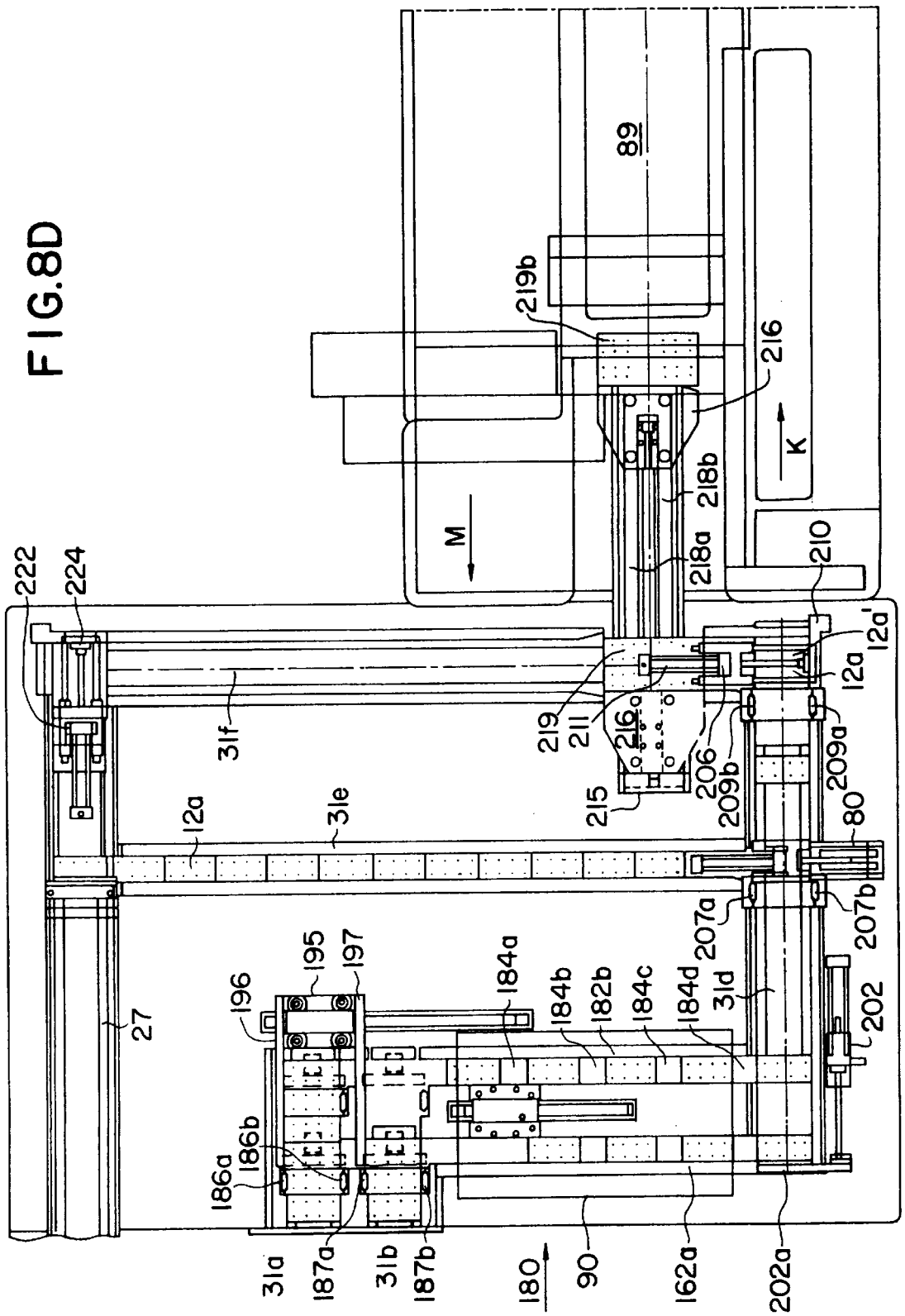

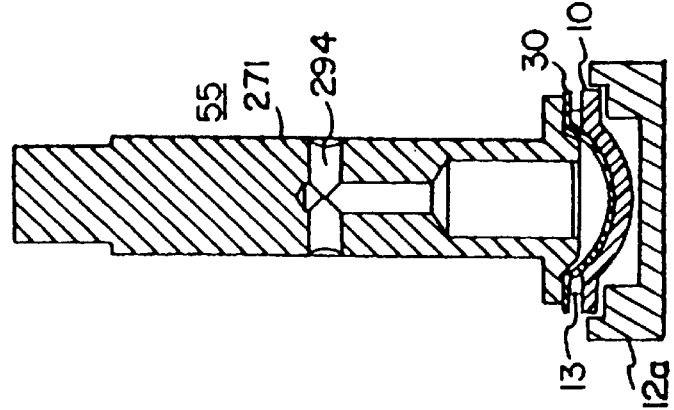
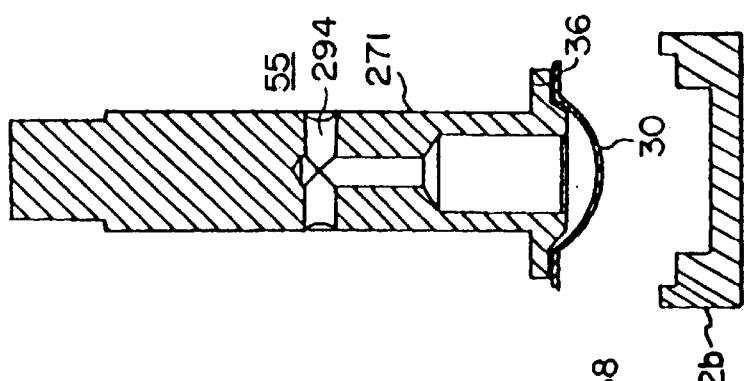
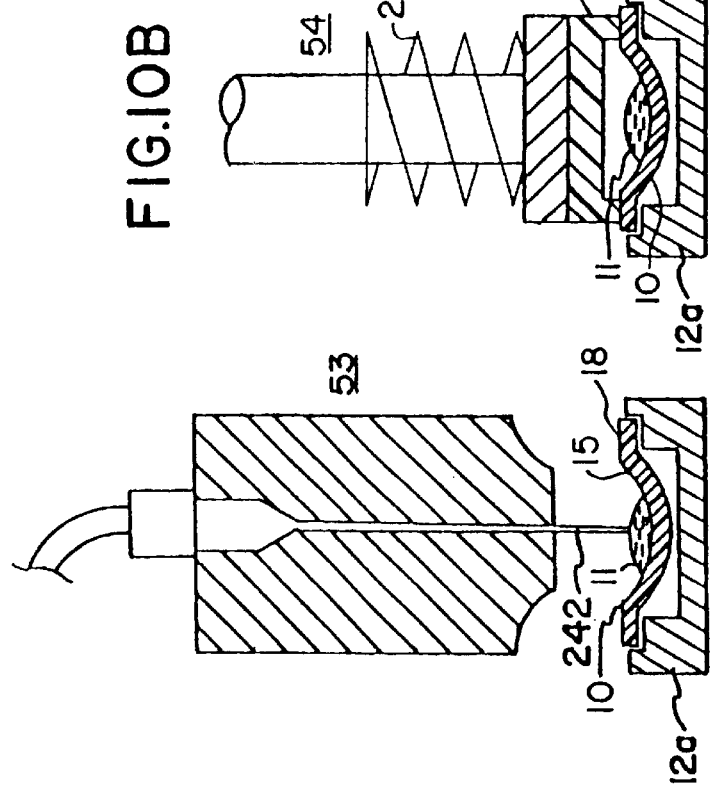
FIG. 10E

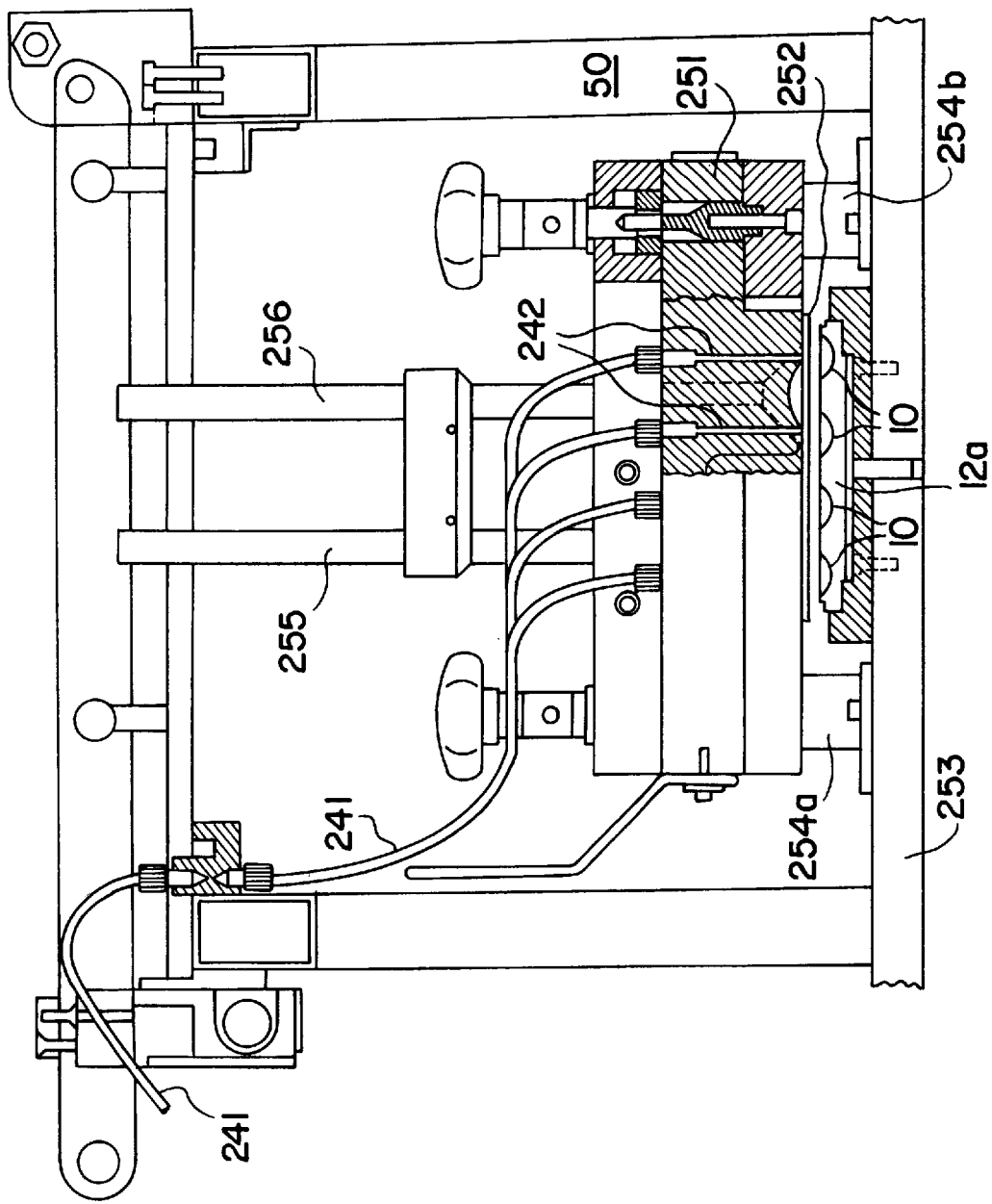

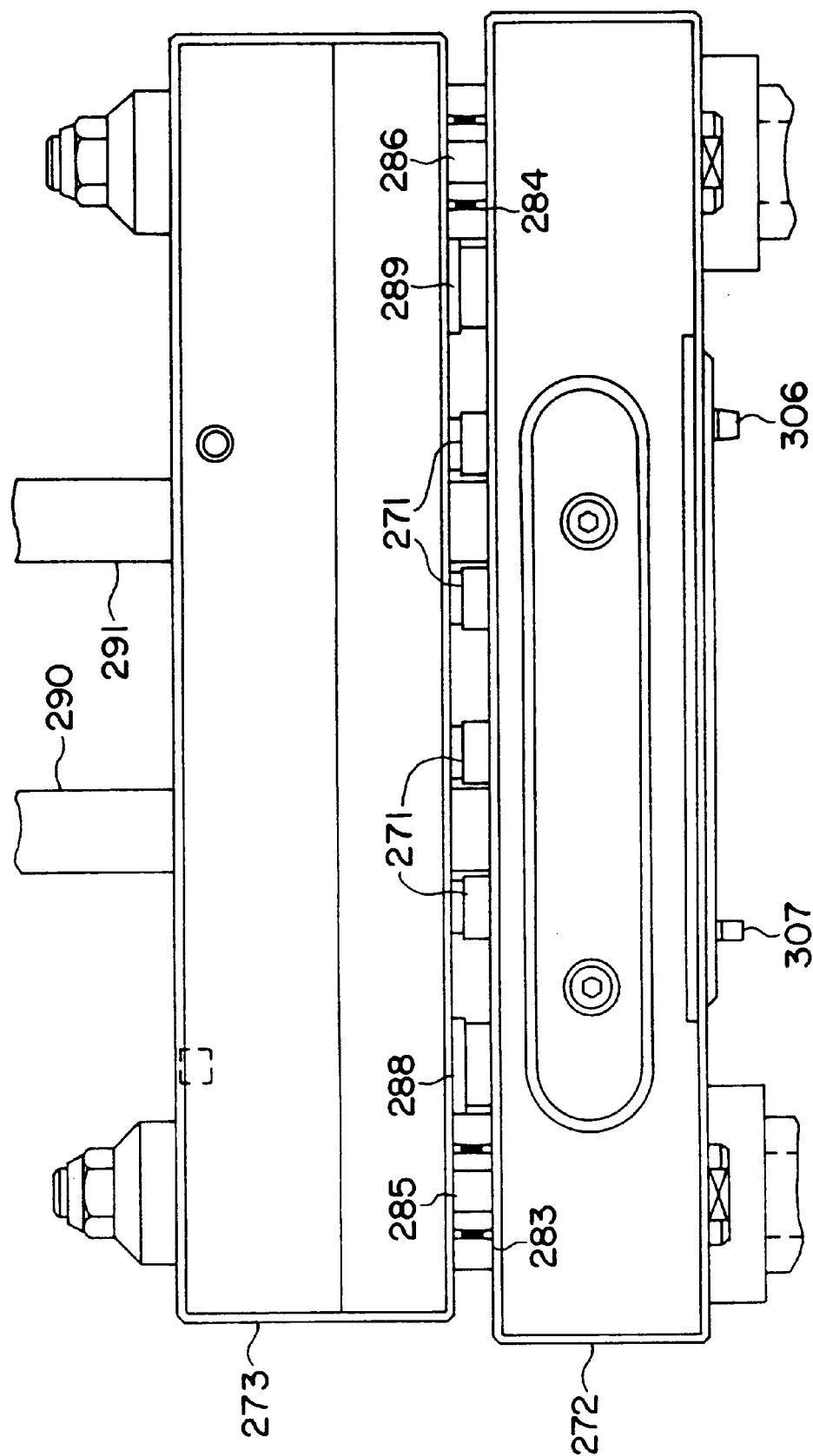

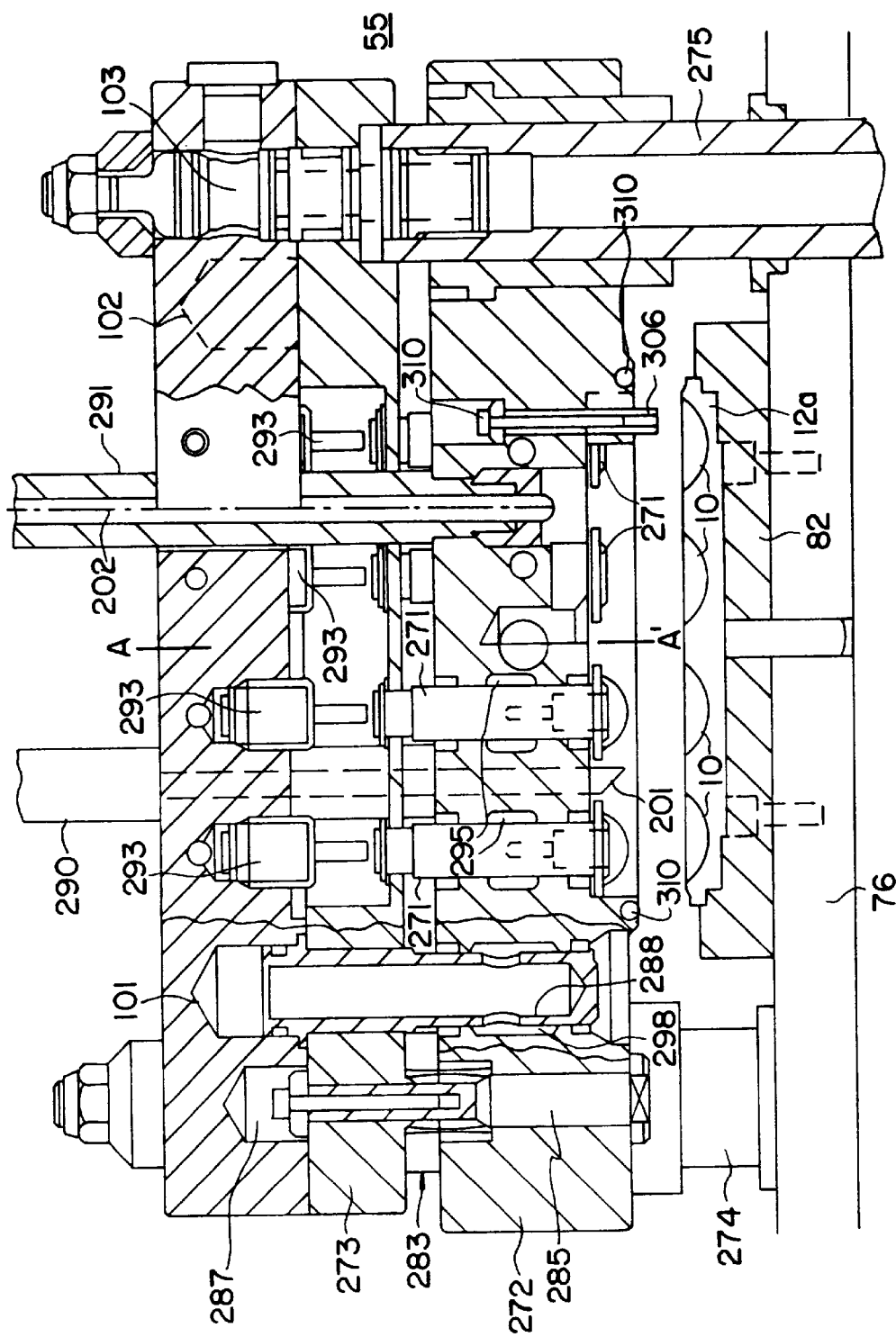

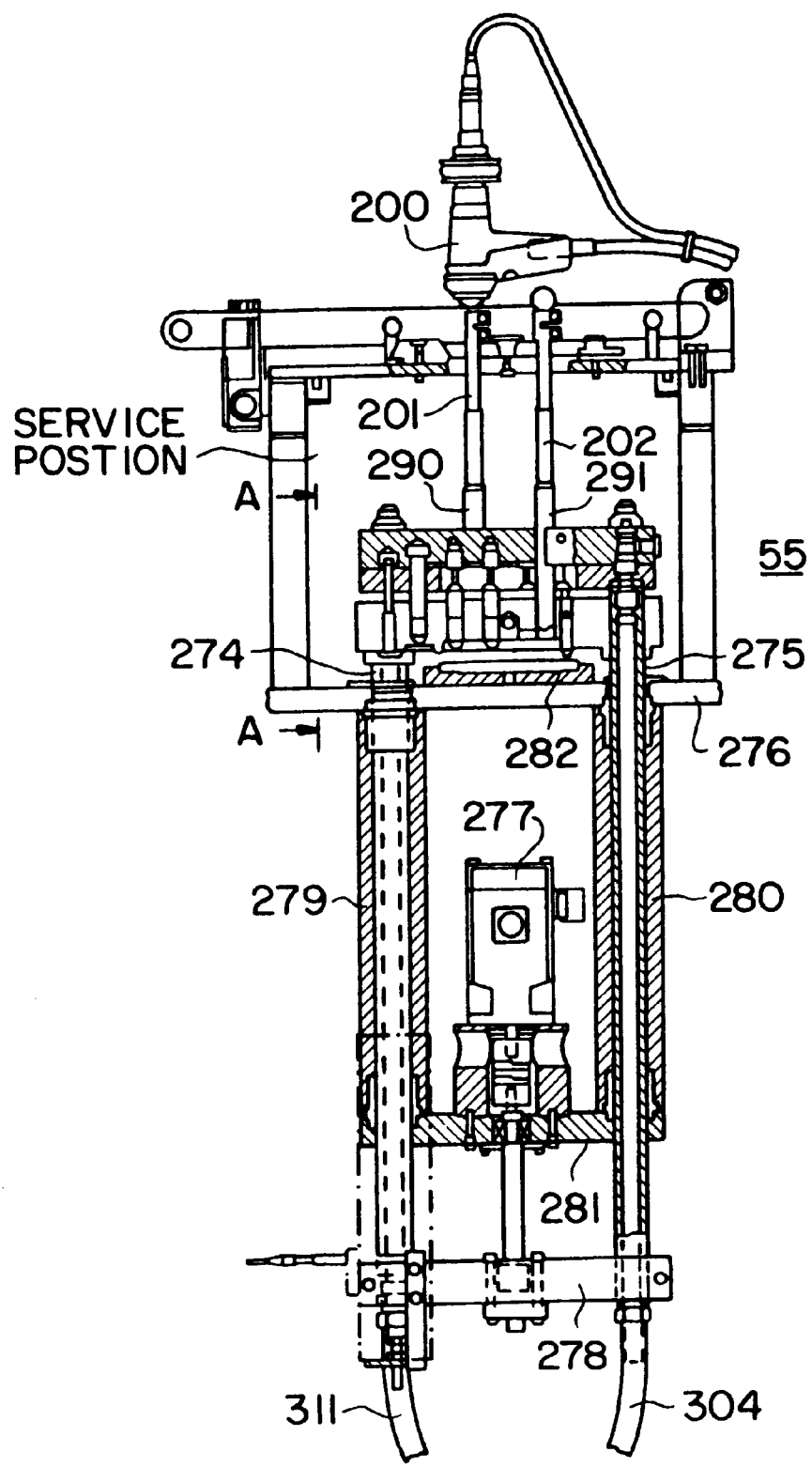

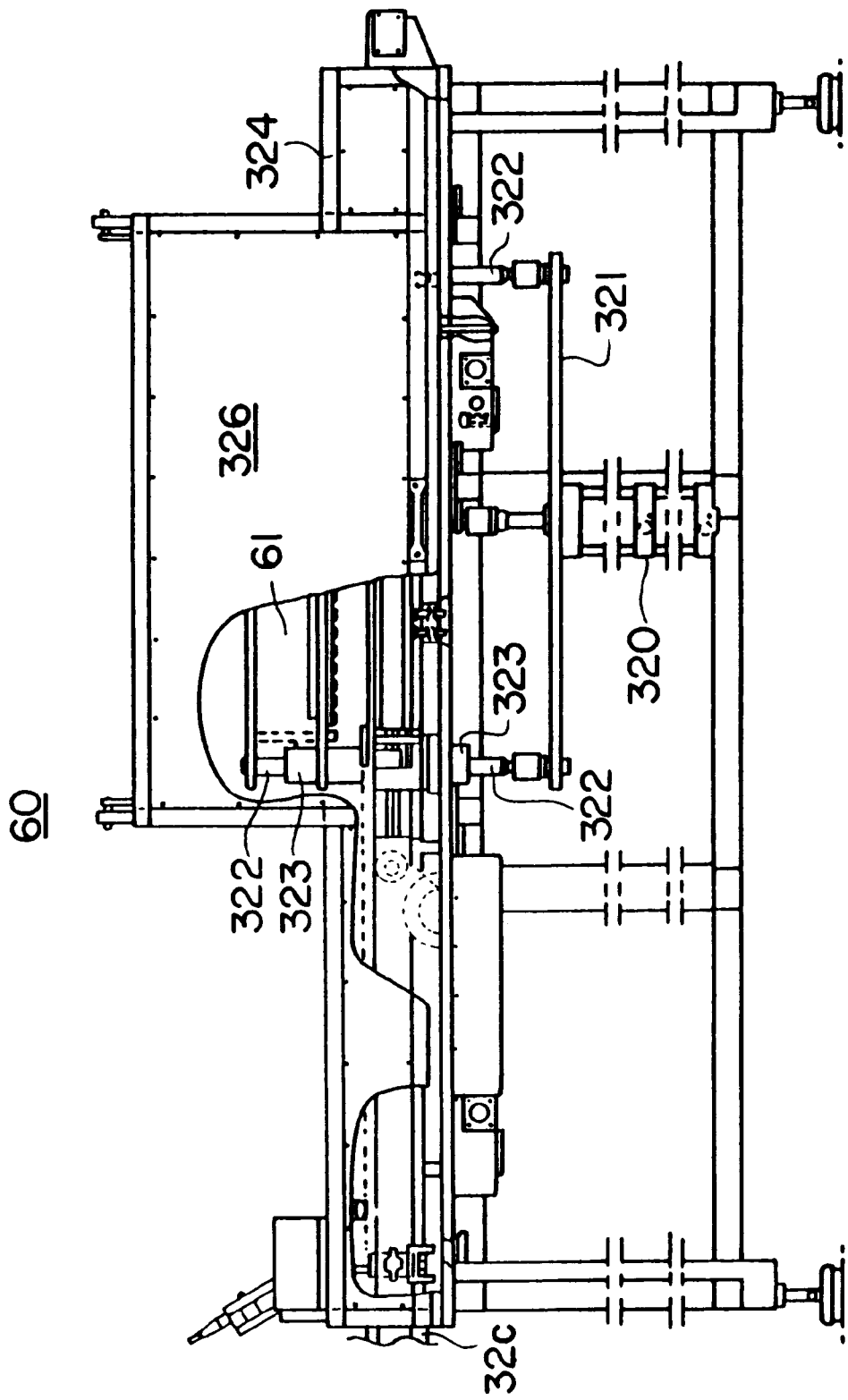

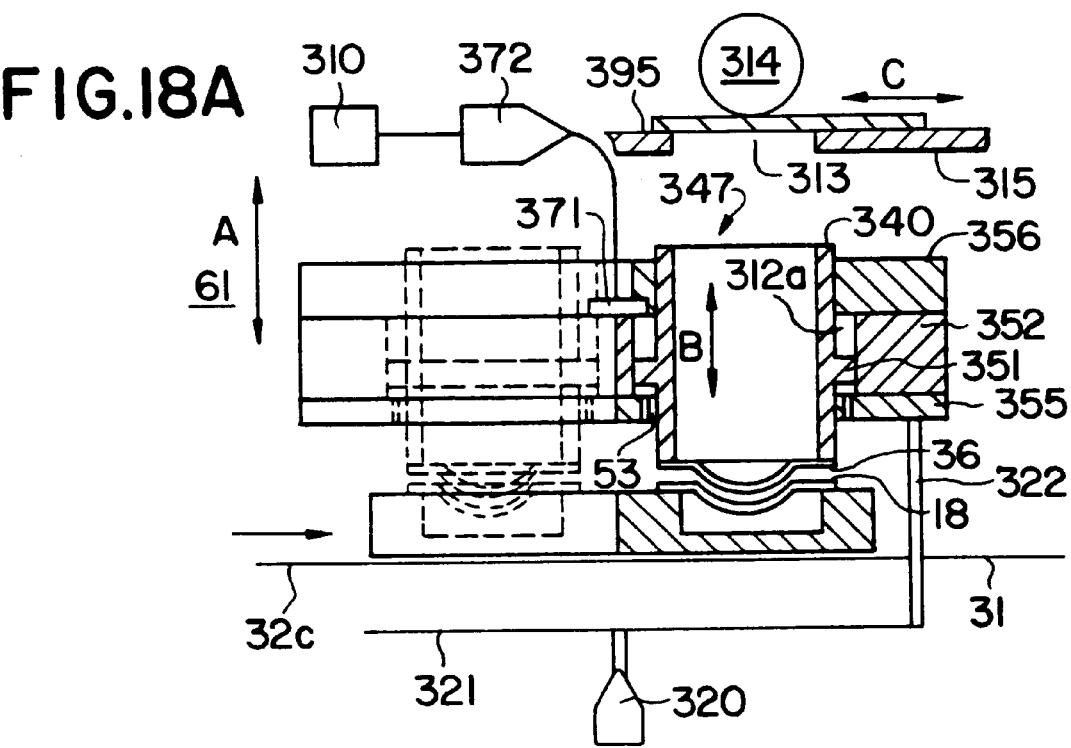
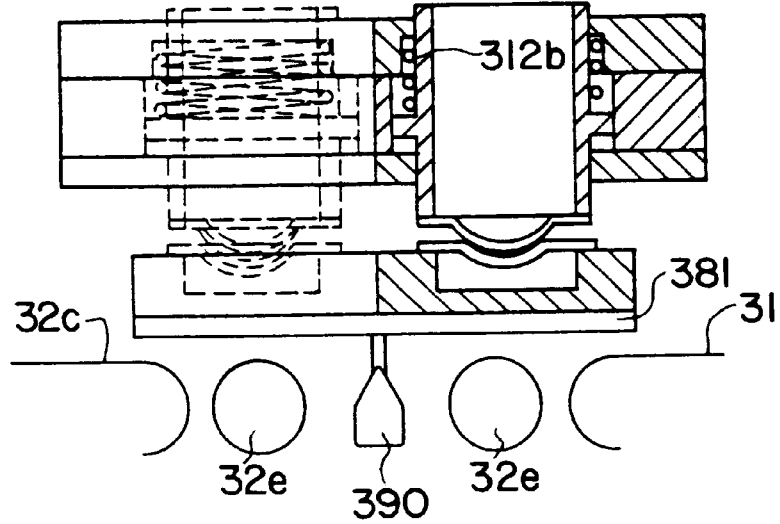

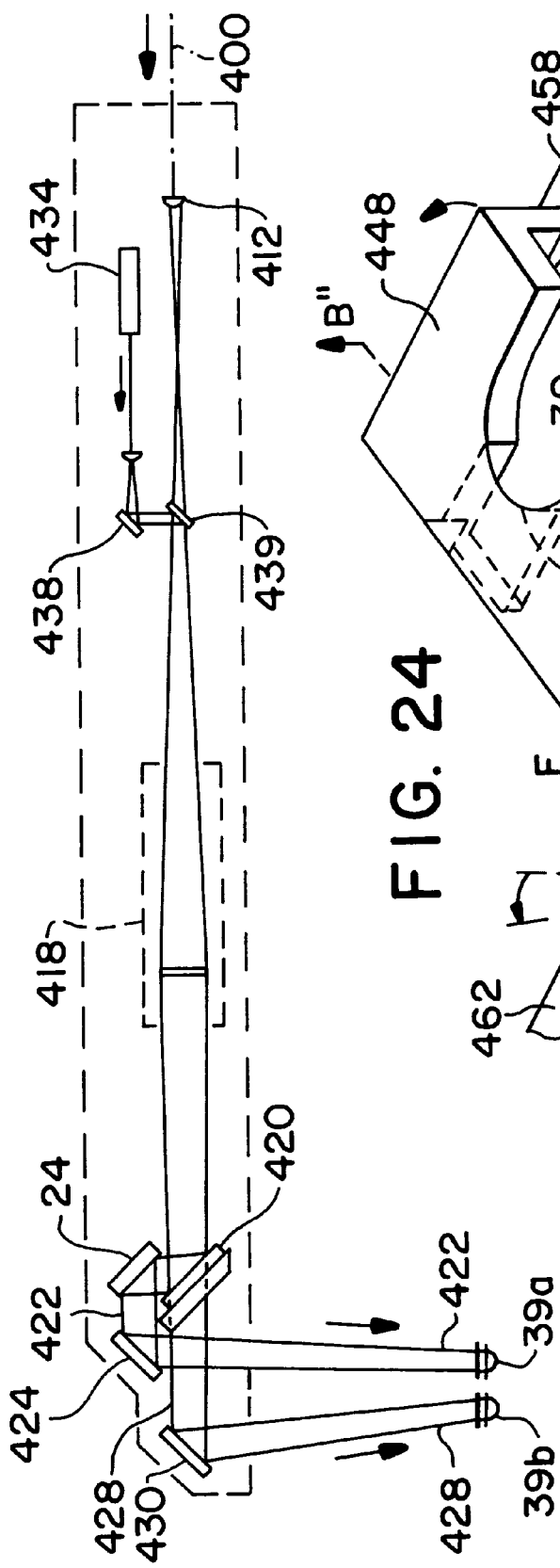
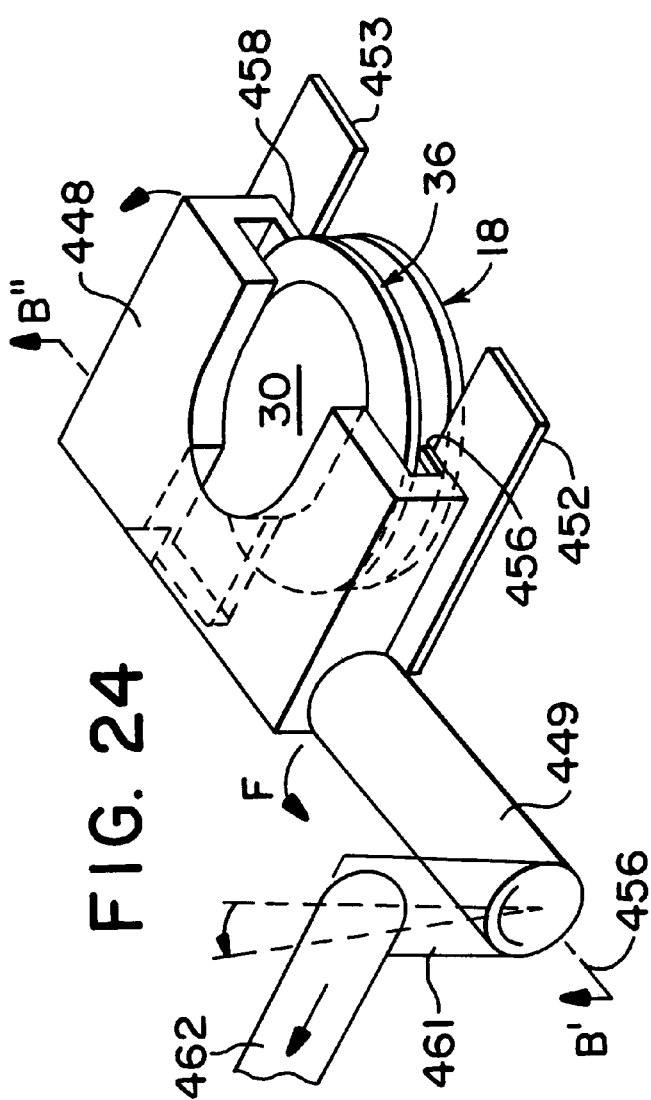
FIG. 25
FIG. 24

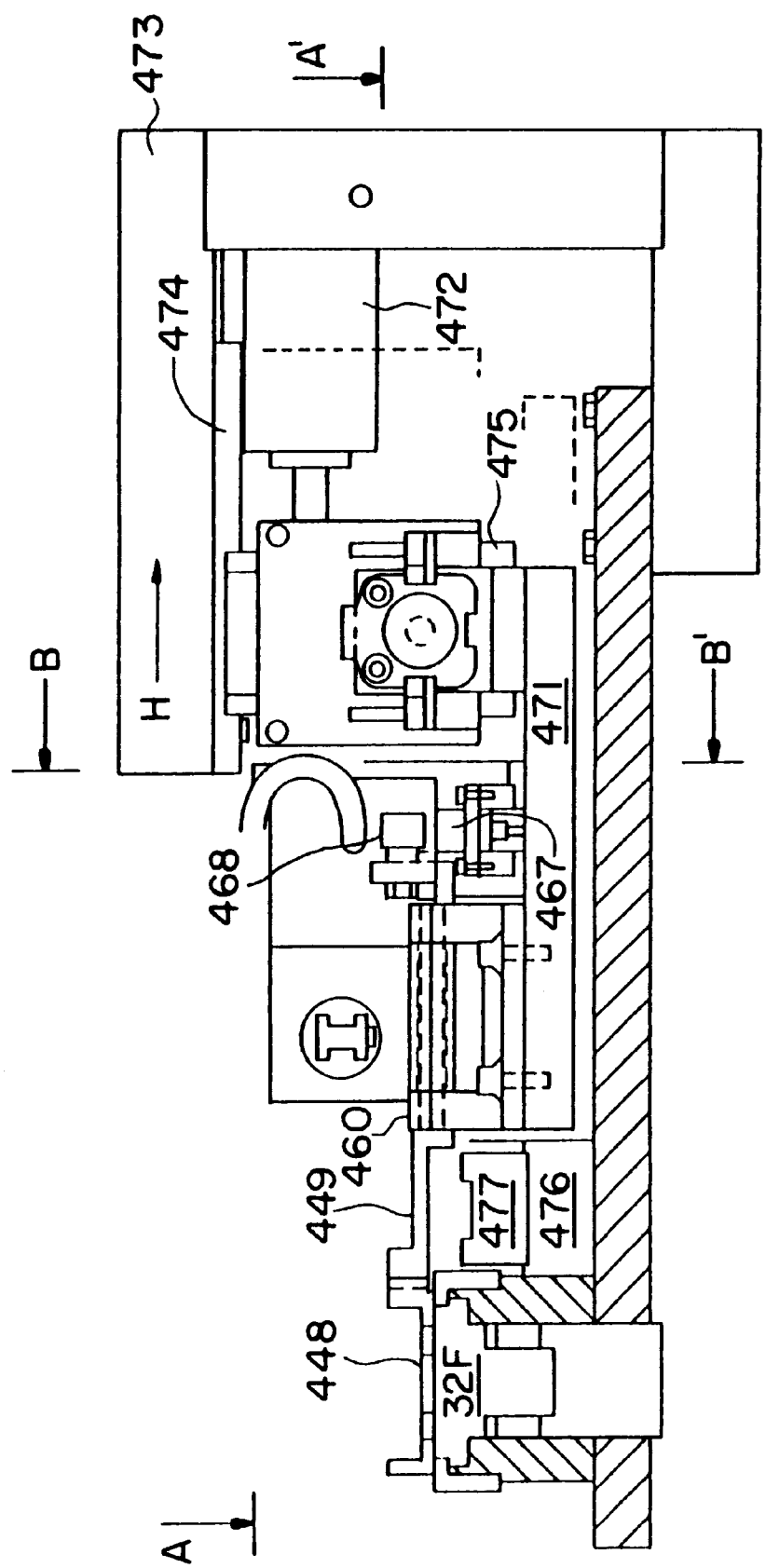

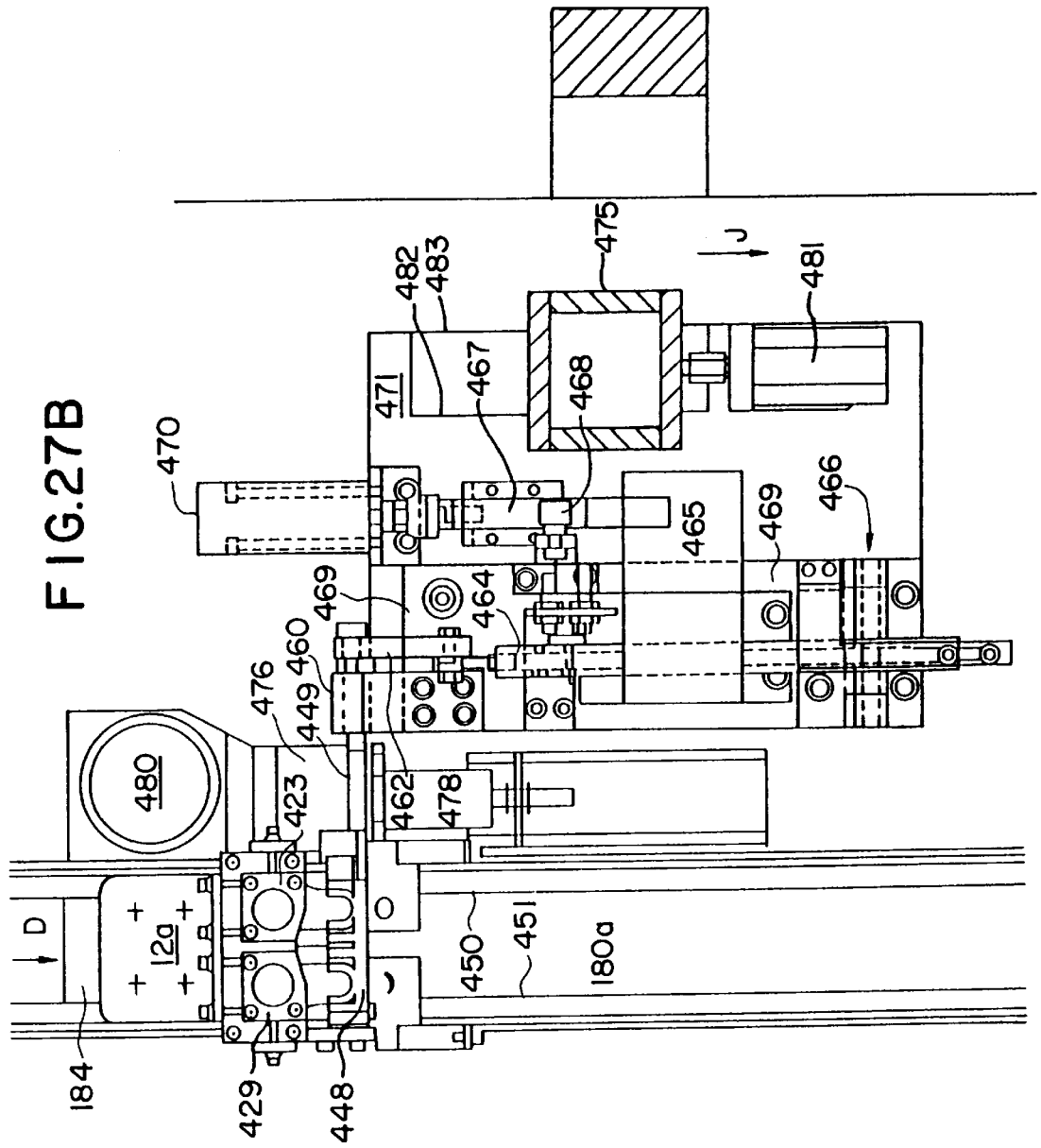

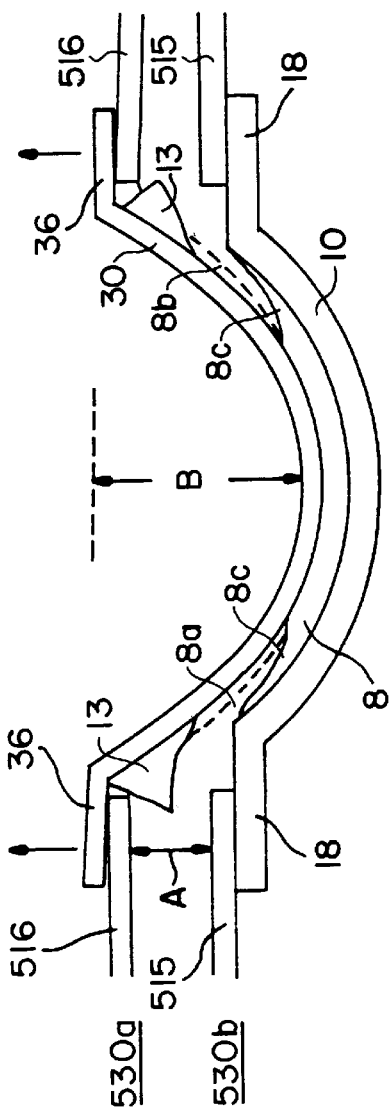
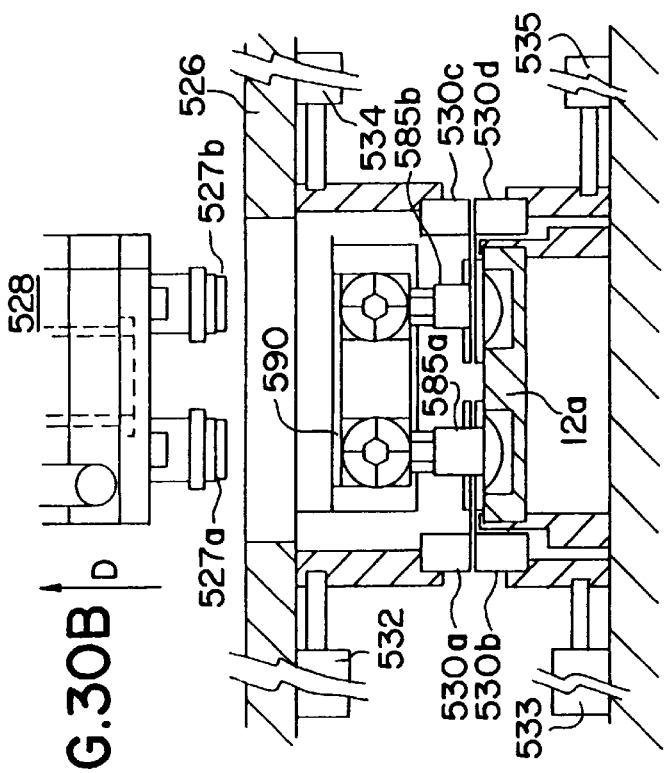
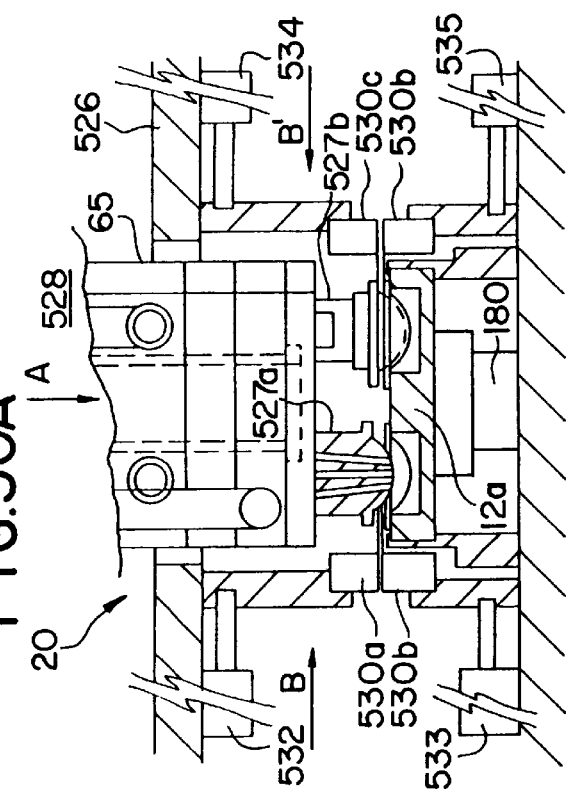

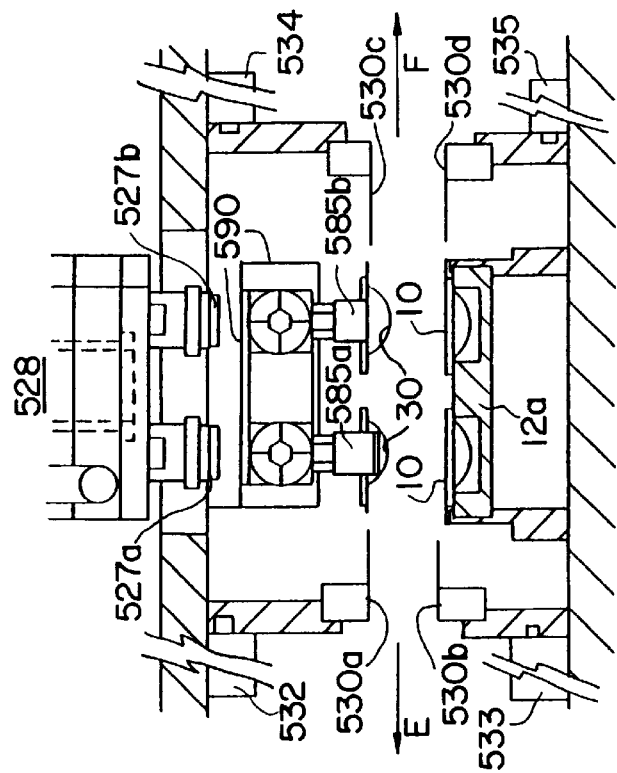
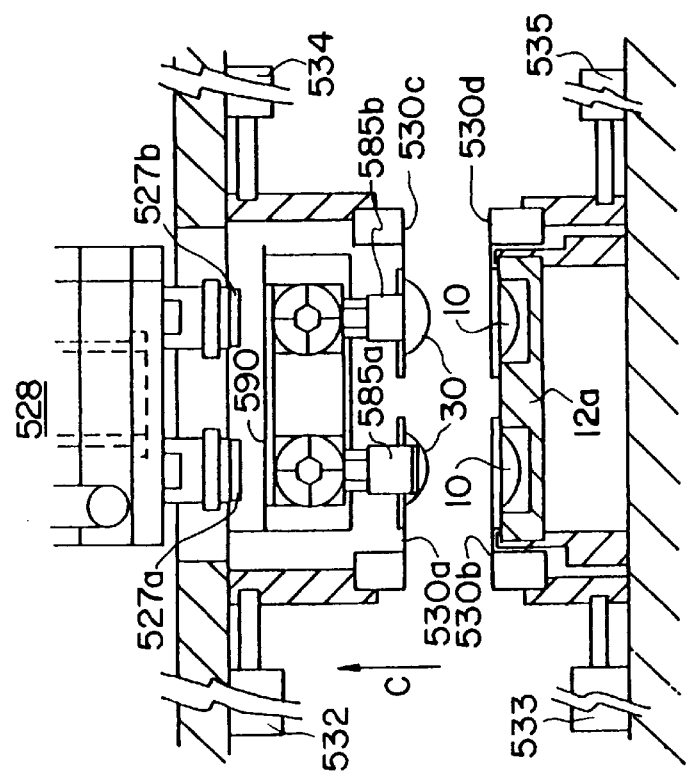

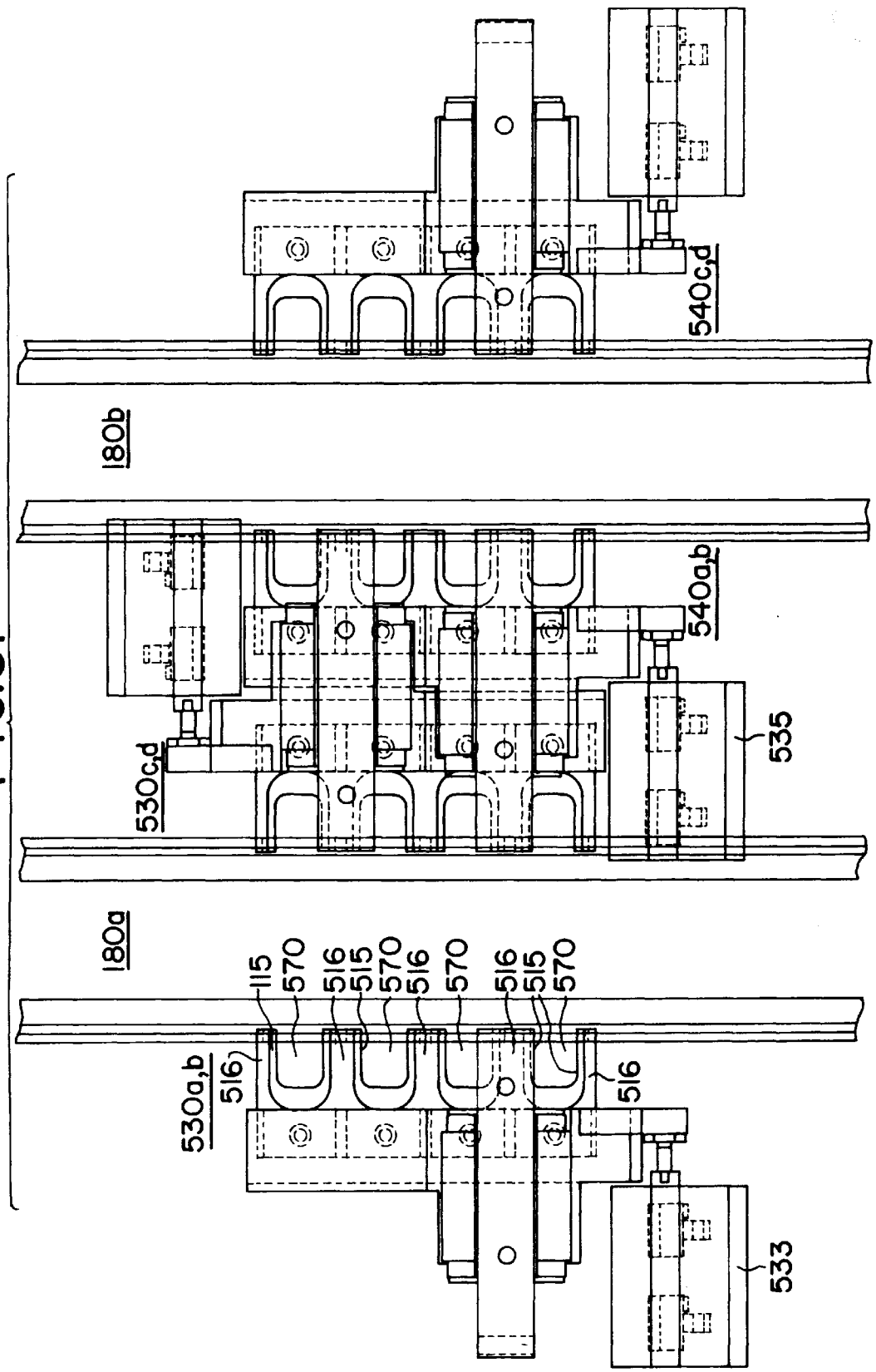

CONSOLIDATED CONTACT LENS MOLDING

CROSS REFERENCE TO RELATED APPLICATIONS

This application is a continuation of U.S. Ser. No. 08/461,887, filed Jun. 5, 1995, now abandoned, which was a divisional of U.S. Ser. No. 08/258,654, filed Jun. 10, 1994, now U.S. Pat. No. 5,804,107, both of said applications being entitled "Consolidated Contact Lens Molding."

1. FIELD OF THE INVENTION

The present invention relates generally to the field of manufacturing ophthalmic lenses, especially molded, hydrophilic contact lenses, and more specifically, to a high speed, automated contact lens molding system for automatically producing ophthalmic lenses.

2. DESCRIPTION OF THE PRIOR ART

The direct molding of hydrogel contact lenses is disclosed in U.S. Pat. No. 4,495,313 to Larsen, U.S. Pat. No. 4,565,348 to Larsen, U.S. Pat. No. 4,640,489 to Larsen et al., U.S. Pat. No. 4,680,336 to Larsen et al., U.S. Pat. No. 4,889,664 to Larsen et al., and U.S. Pat. No. 5,039,459 to Larsen et al., all of which are assigned to the assignee of the present invention. These references disclose a contact lens production process wherein each lens is formed by sandwiching a monomer between back curve (upper) and front curve (lower) mold sections carried in a 2×4 mold array. The monomer is polymerized, thus forming a lens, which is then removed from the mold sections and further treated in a hydration bath and packaged for consumer use. Hydration and release from the mold of this type of lens is disclosed in U.S. Pat. No. 5,094,609 to Larsen, and U.S. Pat. No. 5,080,839 to Larsen, both of which are assigned to the assignee of the present invention.

At the present time, partially automated and semi-automated processes are used in the production of soft contact lenses, however, high production rates are not achievable, partly due to the strict process controls and tight tolerances necessary in the production of high quality contact lenses.

Typically, the molds for these lenses are formed, generally by injection molding, from a suitable thermoplastic, and the molds, usually in frames associating a number of such molds with support structure are shipped from a remote molding facility and stored for use in a production facility for manufacturing contact lens blanks.

It is known that the use of lens molds maintained under normal atmospheric conditions leads to inhibition of, and thus incomplete and non-homogenous curing of the reactive monomer composition at the surface of the lens, which in turn can adversely alter physical properties of the lens. This phenomenon has been traced to the presence of oxygen molecules in and on the lens mold surface, which is due to its inherent capability of the preferred polystyrene molding material to sorb quantities of oxygen. During molding, this oxygen can be released to the polymerization interface with the reactive monomer composition in amounts which exceed acceptable maximums as determined by empirical testing. More specifically, the oxygen copolymerizes rapidly with the reactive monomer but the polymerization chain thus formed is readily terminated, the result being a decrease in rate of monomer reaction, the kinetic chain length, and the polymer molecular weight. The criticality of oxygen level and the difficulty of implementing effective control protocols may be appreciated by recognizing that the level of oxygen at the reactive monomer/mold interface must be controlled to approximately 300 times less than the concentration of oxygen in air ($3 \times 10^{-3}$ moles/liter).

This recognized problem has been addressed in the art by careful but time consuming and laborious preconditioning of the molds utilizing chambers evacuated to approximately 1 torr and maintained in this condition for a period of not less than 6–12 hours. Any interruption of the work cycle such as might be caused by a power interruption requires reinitiation of the conditioning treatment.

Even brief exposure of the molds to air after degassing, as in normal manufacturing handling is detrimental; it has been learned that even a one minute exposure to air results in sufficient absorption of oxygen to require 5 hours degassing to reacquire an acceptable condition. Accordingly, a degassing operation immediately proximate the manufacturing line, particularly for large volume transfers of molds with different exposure times was deemed impractical, and no real improvement over the present system.

The problem is complicated by the fact that the front and back curves of the juxtaposed mold sections exhibit different thicknesses, leading to potentially different exposure of the reactive monomer composition to oxygen across the surfaces of varying cross-sections which could result in distortion of the lens and degradation of its optical properties. Thus, the concentration distribution of oxygen in the respective mold sections or halves remains symmetrical for short degas times, but becomes progressively less symmetrical for longer degas times, and the anomaly can cause uneven cure and different properties between the front and rear surface. For example, the convex male mold may be degassed within about 2 hours, whereas the concave female mold may not be entirely degassed even after 10 hours.

The commercial demand for soft contact lenses has dictated the development of continuous or at least semicontinuous manufacturing lines. The criticality of manufacturing specifications in turn demands automated handling of the lens manufacturing operation.

Another problem specific to the production process used to produce contact lenses in accordance with the teachings of the foregoing patents is that the mold portions are surrounded by a flange, and the monomer or monomer mixture is supplied in excess to front mold curve prior to the mating of the mold halves. After the mold halves are placed together to define the mold cavity, the mold is weighted and the excess monomer or monomer mixture is expelled from the mold cavity into the space between the flanges. Upon polymerization, this excess monomer or monomer mixture forms a waste by product known in the art as a HEMA ring (when hydroxyethylmethacrylate monomer is used) which must be removed to avoid contaminating the production line or the packaged lenses.

In these prior art processes, corona discharge devices are at times utilized to create an adhesion zone on the underside of the back curve mold half, to thereby cause the HEMA ring to preferentially adhere to the back curve at the time the mold haves are separated.

The prior art process for separating the mold halves and removing the lens consists of preheating, heating, prying and removal. Hot air provides the heating, mechanical leverage the prying, and the removal of the HEMA ring is manual. Heating the mold by convection is not an efficient heat transfer technique. From the time a mold array enters the heating apparatus until the back curve mold half is completely removed requires on the order of one minute.

The present method for removing the lens is to apply heat to the back curve mold half by means of a heated air stream. The heating is done in two stages: a preheat stage and a heat/pry stage. In the heat/pry stage, the mold is clamped in place and pry fingers are inserted under one side of the back curve of the mold, and an upward pry force is applied during the heating cycle. When the required temperature has been reached, the back curve mold portion breaks free and one end is lifted by the pry finger and the mold half is removed. The remaining mold and lens is then removed from the heating and prying station, where remnants of the HEMA ring are removed manually. The temperature gradient achieved in the convection heating of the lens is relatively small, since the time it takes to heat the back curve mold half enables significant conductive heating of the lens, thereby decreasing the gradient, and making separation of the molds difficult. Adding more heat to the lens mold at separation only causes the back curve mold to soften and impair efficient mechanical removal. Finally, manual removal of the remnants of the HEMA ring is labor intensive and costly.

While the aforesaid production processes have some efficacy in the production of soft contact lenses they suffer a number of disadvantages which have hindered the development of a high speed automated production line. When mold frames are demolded in large batch processes, a power outage at the wrong time can effectively shut the entire production line down for many hours after restoration of power, while a batch of frames is degassed and readied for production. In the alternative, expensive control systems are required to protect partially degassed frames during a power outage.

Further, the use of large mold arrays can cause registration problems for precision automated machinery if the polystyrene frame is distorted in any way.

SUMMARY OF THE INVENTION

The invention involves the improved manufacture of lens blanks for soft contact lenses and more particularly to subsystem stations, operations, procedures and protocols implemented in a continuous or at least semi-continuous automated manufacturing, line to provide high speed, high volume production with a reduced number of defective lenses or lenses of impaired physical or optical characteristics.

The invention includes a method implemented by associated apparatus according to a protocol to control oxygen levels at the interface between the lens mold blank and the reactive monomer composition within levels for reliable production of lenses of acceptable optical quality under optimum manufacturing conditions, thereby substantially reducing defect levels.

It is therefore an object of the present invention to greatly minimize the exposure of the monomer or monomer mixture to atmospheric conditions, particularly oxygen, and to reduce the amount of dissolved oxygen in the monomer or monomer mixture used to produce the lenses.

It is also an object of the present invention to incorporate a completely automated production line system for automatically transporting contact lens mold portions throughout the contact lens filling, precuring, polymerizing, and demolding stations in a fast, efficient and precise manner.

Another object of the present invention is to provide a high speed apparatus for removing fragile front and back curve mold halves from a mold in which those articles are made, and then transporting those halves to and depositing those halves in a high speed, automated manufacturing system, in a low $O_2$ environment.

A further object of this invention is to transport polystyrene mold halves from a mold in which those halves are made, and into a low oxygen environment of an automated contact lens molding system, in less than 15 seconds.

These and other, objectives are attained with an apparatus for removing and transporting the mold halves from a mold, in which they are molded in an essentially oxygen free environment and transferred to the automated production line by robotic apparatus generally comprising first, second, and third robots or assemblies. The first assembly removes the mold halves from the mold and transports them to a first location, the second assembly receives the mold halves from the first assembly and transports them to a second location, and the third assembly receives the mold articles from the second assembly and transports the articles to a third location on pallets for entry into the automated line, while protecting the optical surface and where required, flipping the curve, for most efficient down stream processing.

It is still another object of the present invention to incorporate in an automated contact lens production line facility, an automated pallet system wherein a carrier pallet is provided that can receive both front curve lens mold portions and back curve lens mold portions prior to the formation of a lens mold assembly.

Specifically, the contact lens pallet system comprises a pallet for carrying and protecting the optical surface of one or more contact lens mold assemblies throughout an automated contact lens production line, the pallet having one or more first recesses formed in a surface thereof for receiving an individual contact lens mold assembly, the contact lens mold assembly comprising a first front curve mold half and a complementary second back curve mold half.

It is an object of the present invention to provide an apparatus for filling and assembling mold halves for a contact lens which includes a first automated station for receiving a plurality of front curve contact lens mold halves, carried in a unique pallet carrier, which are then filled with a predetermined amount of a polymerizable monomer or monomer mixture. The apparatus also includes a second automated station which provides a coating of surfactant on a portion of the front curve lens mold part to provide for preferential adhesion of any excess hydrogel to a back curve mold part. The apparatus further includes a third automated station for sequentially receiving a plurality of back curve mold parts, removing the bask curve mold parts from the carrier pallet, and then receiving and registering the back curve mold parts with a plurality of front curve mold parts which were previously filled with the polymerizable monomer or monomer mixture. A vacuum is first drawn about the mold parts, and then the back curve is assembled with the front curve and weighted or clamped to displace any excess monomer from the mold cavity and to firmly seat the back curve mold part against a parting edge formed on the front curve mold part. The assembly is accomplished under vacuum to speed the assembly of the mold and to avoid the formation of gas bubbles from any gasses that might otherwise be trapped between the mold parts at the time of mold assembly.

It is also an object of the present invention to provide an apparatus and a method for precuring a polymerizable monomer or monomer mixture to form a soft contact lens in a mold which enables a more uniform cure for the lens during the cure step, and which reduces "puddling" or cavitation of the lens from the mold during cure. The mold halves are transported from the mold filling and mold assembly station to a precure station, where they are clamped together under predetermined pressure for a predetermined period of time in a low oxygen environment. The second or convex mold half is thinner than the first or concave mold halves to enable mold compliance during cure as the monomer or monomer mixture is polymerized. The clamping pressure aligns flanges formed on the first and second mold half to ensure that the flanges are parallel and that the respective curves of the molds are aligned. The clamping pressure also seats the back curve mold half against an annular edge formed on the front mold half to essentially sever any excess monomer from the monomer contained within the mold cavity, thus ensuring the best possible lens edge quality.

After a predetermined clamping period, the monomer or monomer mixture is exposed to actinic radiation, such as a UV light source, to partially cure the monomer or monomer mixture to a gel state. After a second predetermined period of exposure under clamping pressure, the clamping action and the UV radiation are removed, and the partially precured gel like lens is then transported in the mold through an extended curing station for complete polymerization and cure.

It is also an object of the present invention to provide methods and apparatuses that can easily and repeatably separate the contact lens mold portions having a contact lens formed therebetween without damaging the lens.

It is a further object of the present invention to provide a method and apparatus for separating a back curve mold from a front curve mold wherein a significant temperature gradient is created between the back curve mold and the contact lens contained in a cavity formed between the two mold portions.

It is another object of the invention to create this temperature gradient without excessive environmental heating or waste of energy through the use of laser beams or high energy steam nozzles.

It is another object of the present invention to provide an automated means to mechanically and reliably pry the mold halves apart in a consistent and reliable manner to thereby enhance the production of defect free lenses, and minimize the tearing of the lens or the breakage of the lens mold parts.

It is another object of the present invention to provide a method of controlling which mold half the lens sticks to by controlling the temperature gradient and pressure applied to the assembled mold during lens demolding.

Further benefits and advantages of the invention will become apparent from a consideration of the following detailed description given with reference to the accompanying drawings, which specify and show preferred embodiments of the invention.

Aspects and preferred features of the contact lens manufacturing system in part described and claimed herein are detailed in copending and commonly assigned application Ser. No. 08/257,802 of Martin et al. for "Low Oxygen Molding of Soft Contact Lenses", refiled as Ser. No. 08/812,817, now U.S. Pat. No. 5,753,150; application Ser. No. 08/257,801 of Walker et al. for "Laser Demolding Apparatus and Method", now abandoned; application Ser. No. 08/257,786, now Ser. No. 08/729,711 of Wang et al. for "Contact Lens Production Line Pallet System", now U.S. Pat. No. 5,744,357; application Ser. No. 08/258,267 of Lust et al. for "Apparatus for Removing and Transporting Articles from Molds", refiled as Ser. No. 08/757,154, now U.S. Pat. No. 5,681,138; application Ser. No. 08/257,785 of Lust et al. for "Mold Halves and Molding Assembly for Making Contact Lenses", now U.S. Pat. No. 5,540,410; application Ser. No. 08/258,264 of Martin et al. for "Method and Apparatus for Contact Lens Mold Filling and Assembly", now U.S. Pat. No. 5,656,208; application Ser. No. 08/258,265 of Kindt-Larsen et al. for "Mold Separation and Apparatus", now U.S. Pat. No. 5,850,107; application Ser. No. 08/257,792 of Martin et al. for "Mold Clamping and Precure of a Polymerizable Hydrogel", refiled as Ser. No. 08/968,670, now U.S. Pat. No. 5,914,074; application Ser. No. 08/258,263 of Kindt-Larsen et al. for "Method and Apparatus for Applying a Surfactant to Mold Surfaces", now U.S. Pat. No. 5,542,978; application Ser. No. 08/257,799 of Martin et al. for "Ultraviolet Cycling Oven for Polymerization of Contact Lenses", now U.S. Pat. No. 5,597,519; application Ser. No. 08/258,557 of Martin et al. for "Automated Apparatus and Method for Preparing Contact Lenses for Inspection and Packaging", now U.S. Pat. No. 5,578,331; and U.S. Pat. No. 5,294,379 of Ross et al. for "Laser Assisted Demolding of Ophthalmic Lenses", the disclosures of which are incorporated herein by reference.

BRIEF DESCRIPTION OF THE DRAWINGS

The foregoing objects and advantages of the present invention for a contact lens production line pallet system may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 3 and 3(a) are respectively, a top or planar view and an elevation or side view of one embodiment of a first (female) or front curve mold half molded pursuant to the present invention;

FIG. 3(b) is an enlarged detail of a portion of FIG. 3(a).

FIGS. 4 and 4(a) are respectively a top or planar view and an elevation or side view of one embodiment of a second (male) or back curve mold half molded pursuant to the present invention;

FIG. 8(d) is a simplified plan view of a fourth section of the automated line for molding contact lenses, which illustrates the demolding station for the lenses.

FIG. 10(a) is a diagrammatic illustration of a front curve mold half being filled with monomer pursuant to the present invention;

FIG. 10(b) is a diagrammatic illustration of the application of a mold release surfactant to a portion of the front curve mold half;

FIG. 10(c) is a diagrammatic illustration of the transfer of the back curve mold half pursuant to the method of the present invention;

FIG. 10(d) is a diagrammatic illustration of the mold assembly and clamping step used in the method of the present invention.

FIG. 10(e) is a diagrammatic flow chart of the method of filling and assembling the mold halves of the present invention.

FIG. 11 is a partially cross-sectioned side view of the filling module used for depositing a predetermined amount of monomer or monomer mixture in each of the mold cavities.

FIG. 14(a) is a diagrammatic side view of the exterior of the assembly module of the present invention;

FIG. 14(b) is a partially cross-sectioned side view of the assembly module illustrated in FIG. 8(a).

FIG. 16 is a diagrammatic and partially cross-sectioned illustration of the assembly station of the present invention illustrating the vacuum supply lines for the reciprocating assembly station.

FIG. 17 is a partially cut away elevation view of one of the embodiments for precuring a polymerizable monomer or monomer mixture to form a soft contact lens.

FIG. 18(a) is a diagrammatic illustration of one embodiment of the present invention which uses an air driven clamp for clamping the mold halves together;

FIG. 18(b) is a diagrammatic illustration of a second embodiment of the present invention which uses a spring driven clamp for clamping the mold halves together.

FIG. 24 is a diagrammatic and isometric view of one embodiment of the demolding apparatus used to demold the mold assembly in the laser demolding embodiment of the present invention.

FIG. 25 is a schematic diagram of an optical train used in a laser embodiment of the invention.

FIGS. 27(a)–(c) are, respectively, a first elevation view, a top or plan view and a side elevation view of the laser demolding apparatus of the present invention.

FIG. 29 is a diagrammatic side view showing generally two sets of pry fingers that separate to lift a back curve lens mold from a front curve lens mold.

FIGS. 30(a)–(d) illustrate in detail the sequence of steps for separating a back curve mold half from a front curve mold half of a plurality of contact lens molds in a second embodiment of the demolding station of the present invention; wherein FIG. 30(a) illustrates the device with the steam nozzles engaging the mold parts and the pry fingers engaging the mold flanges;

FIG. 30(b) illustrates the retraction of the steam nozzles, and engagement of the suction cup assembly;

FIG. 30(c) illustrates the upward pry motion of the assembly to remove the back curve mold part from the front curve mold and molded lens;

FIG. 30(d) illustrates the retraction of the pry fingers to allow removal of the back curve mold parts by the suction assembly, and advancement of the pallet containing the partially demolded lenses.

FIG. 31 is a partial plan view of the demolding assembly illustrating two sets of pry fingers for each of the pallets conveyed on a pair of conveyors.

DESCRIPTION OF THE PREFERRED EMBODIMENT

Figure 1:
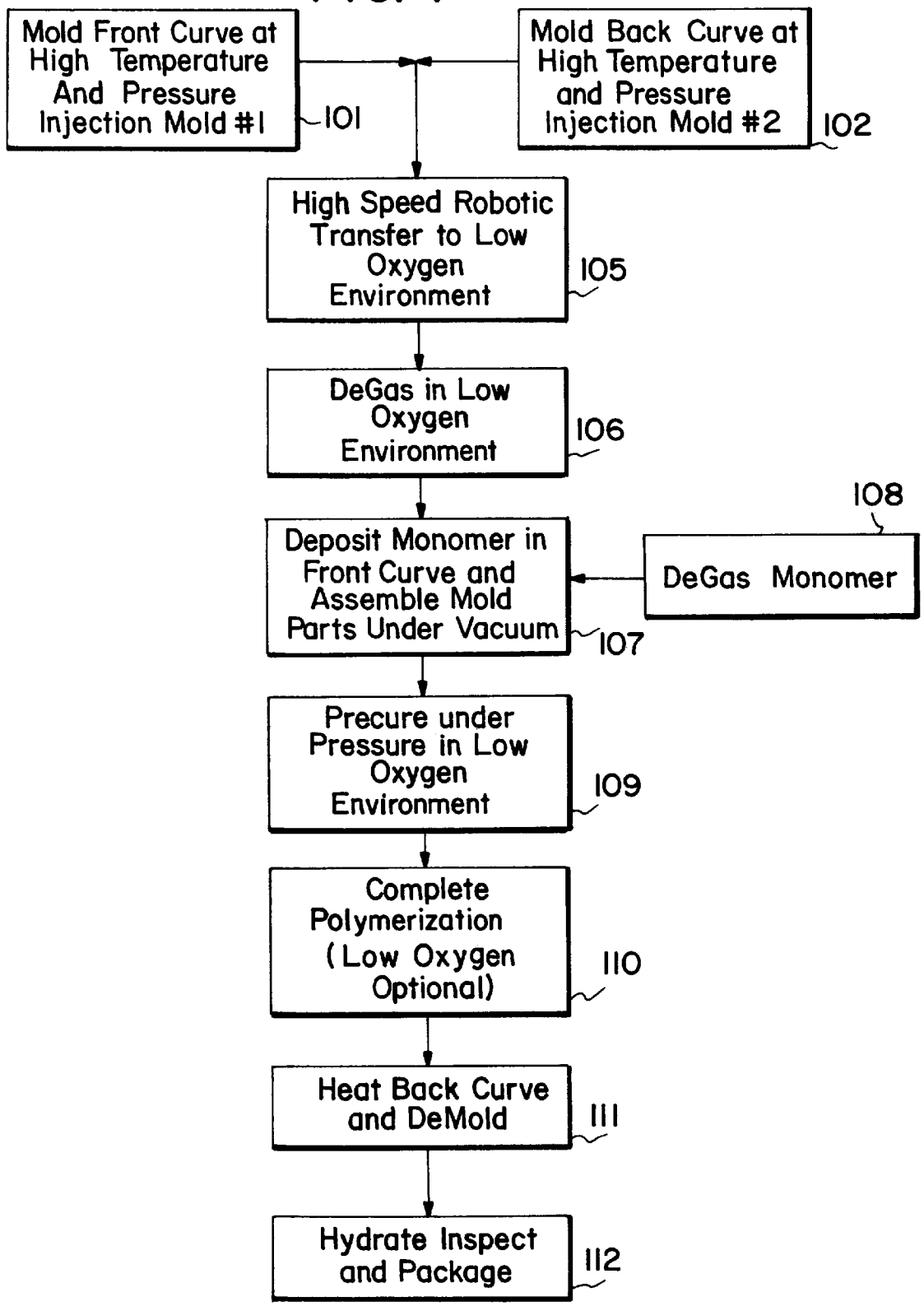
FIG. 1 is a flow diagram of the continuous process for contact lens production, including molding, treatment and handling of the molds and contact lenses in a low oxygen environment.

In accordance with the present invention, lens mold blank preparation is integrated with lens blank manufacture to minimize the time of exposure of lens blank molds to oxygen prior to implementation of the curing stage. Given that even a one minute delay between filling (introduction of the reactive monomer composition to the cavity of the concave lens mold section) and curing would require five hours of degas to achieve a target minimum of $1 \times 10^{-8}$ moles/cm$^3$ concentration of oxygen at the reactive monomer/mold interface, the facility of in line preparation of the lens mold blanks will be appreciated.

Reduction in oxygen levels is thus achieved not by degas alone, as practiced in the prior method, but in the high temperature conditions obtained in the molding equipment, and the fresh molding of a fully degassed mold blank which is as soon as possible blanketed in an inert gas such as nitrogen for further handling through filling, precure and final cure.

It has been determined that a key parameter in controlling oxygen levels at the mold interface is the diffusivity of oxygen into and from the mold surface in response to ambient conditions, and thereafter to and into the mold/reactive monomer composition. Molded lens molds readily accept via adsorption and absorption mechanisms an unacceptably high level of retained but migratable oxygen relative to the sensitivity of the reactive monomer composition, particularly in the case of the preferred polystyrene mold component. For the purpose of this application, both adsorption and absorption mechanisms are summarized by the use of the term absorption. The migration of oxygen responds to concentration such that when a mold is subjected to a vacuum, it will migrate at applicable diffusion rates to the lesser concentration, in this instance the vacuum. Naturally, the surface of the mold will be the last portion to fully degas, leading to the unacceptably long degas times for conditioning pretreatment. For similar reasons, readsorption of oxygen will occur at the surface, and reequilibration to the interior will again be controlled by diffusion rates in the mold material, hence any exposure to the atmosphere will rapidly result in unacceptably high levels of oxygen at the mold interface, which only relatively extensive conditioning treatment will resolve, as a portion of the surface situated oxygen will diffuse to the oxygen poor interior, and then must be reacquired to the surface prior to elimination to the vacuum, or inert gas medium.

The recognition that diffusion of sorbed oxygen from the interior of the lens mold could lead to disruption of lens quality even where surfaces had been swept of residual oxygen, thus lead to a further modification of processes for the handling of lens mold for and through the molding process. Specifically, every exposure of the lens mold to the atmosphere could be expected to lead to further sorption of oxygen which would diffuse in part to the interior of the part. In consequence, surface flushing with nitrogen alone, without diffusion time, would not be sufficient to avoid molding problems derivative from the presence of oxygen, as in an oxygen starved inert atmosphere, the oxygen stored in the interior of the lens mold would readily and relatively rapidly desorb to the surface. Then, once the mold was filled with reactive monomer, no amount of flushing would resolve the problem.

It was then realized that for every atmospheric exposure, the lens mold would optimally be wholly degassed, hence only by minimizing the time of such exposures, and holding the lens mold under nitrogen for a time to permit essentially complete degassing could the problem be resolved satisfactorily. After an exposure of from about 1 to about 5 minutes to nitrogen, usually within three minutes, the oxygen level at the surface is within tolerance limits, and usually is essentially zero within instrument capability. According to the invention, the injection molding operations previously performed off-site are physically integrated into the contact lens manufacturing line. With the high temperature and pressure of the mold equipment, the initially high oxygen levels on the pelletized feed are efficiently cleared and the fresh surfaces formed in the molding process are readily and preferentially purged of residual oxygen. The pelletized feed may also be degassed with nitrogen in the hopper of the injection mold.

While the preferred mold material is polystyrene, the molds can be made from any thermoplastic material which is suitable for mass production which can be molded to an optical quality surface, which is transparent to the radiation used for polymerization and which has mechanical properties which will allow the mold to maintain its critical dimensions under the process conditions employed in the process discussed in detail below. Examples of suitable thermoplastic materials include polyolefins such as low, medium, and high density polyethylene, polypropylene, including copolymers thereof; poly-4-methylpentene; and polystyrene. Other suitable materials are polyacetal resins, polyacrylethers, polyarylether sulfones, nylon 6, nylon 66 and nylon 11. Thermoplastic polyesters and various fluorinated materials such as the fluorinated ethylene propylene copolymers and ethylene fluoroethylene copolymers may also be utilized.

It has been found that with the need for a high quality, stable mold and especially for the use of a plurality of molds in high volume operations the choice of material for the molds is significant. In the present invention the quality of production is not assured by individual inspecting and sorting each lens for power and curvature. Instead the quality is assured by keeping the dimensions of each individual mold member within very tight tolerances and processing molds in particular sequential steps to give all lenses equal treatment. Since polyethylene and polypropylene partly crystallize during cooling from the melt there is a relatively large shrinkage giving dimensional changes difficult to control. Thus, it further has been found that the most preferred material for the molds used in the present process is polystyrene which does not crystallize, has low shrinkage, and can be injection molded at relatively low temperatures to surfaces of optical quality. It will be understood that other thermoplastics, including those mentioned above, may be used provided they have these same properties. Certain copolymers or blend of polyolefins that exhibit these desirable characteristics are also suitable for the present purposes as are polystyrene copolymers and blends having such characteristics, as described more fully in U.S. Pat. No. 4,565,348.

For efficiency, ease of operation, and cycle times, injection molding devices are preferred. The cycle time for purposes of an automated operation is minimized, wherein average material throughput is as little as 3 to 12 seconds and preferably 6 seconds is achieved under the inventive conditions described in U.S. application Ser. No. 08/257,785 of Lust et al, now U.S. Pat. No. 5,540,410, during which the material is heated to a thermoplastic condition, extruded into the molds and ejected or removed from the mold. However, the maximum manifold temperature of 270–280° C. is achieved only for a fraction of the material throughput time, and the mold temperature is 215–220° C., hence it was surprising that the injection mold operation was found capable of delivering essentially fully degassed mold sections in each cycle.

Unlike prior practice as described in U.S. Pat. No. 4,565,348, the mold is designed to produce fully formed lens mold parts directly, that is without associated support structure such as a frame; there is in consequence no need to dissociate the part from unneeded polymer material on demolding, and the lens mold parts may be directly collected by automated robotic means for delivery to the transport means. In any given cycle, any number of mold parts may be prepared but for convenience of handling, typically 8 lens mold parts of concave or convex configuration are prepared in a given cycle and transferred by automated robotic means to a pallet of aluminum or stainless steel in which they are received and supported in a regular spatial array adapted for further operations.

Figure 2:
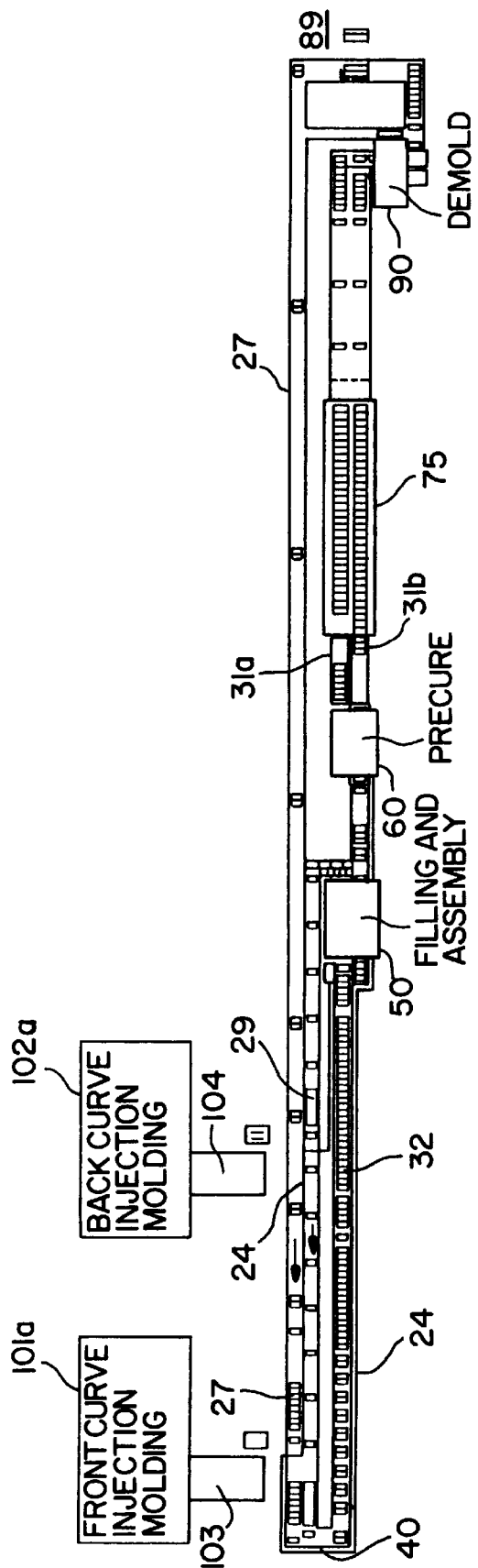
FIG. 2 is a top elevational planar view of the production line system constructed according to the present invention.

As illustrated in FIGS. 1 and 2 injection molds #1 and #2, shown at steps 101 and 102 in the flow diagram of FIG. 1, mold respectively front curve and back curve lens mold parts or sections, in matched sets; they may be located in tandem as shown in FIG. 2 or to shorten exposure to the atmosphere still further, they may be located in a common plane intersecting a bifurcated transport line, even perpendicularly oriented thereto in the same plane.

Robotic means 103,104 are provided adjacent the mold registry and engagement station for receiving concave and convex lens molds respectively and transferring said mold part to a low oxygen environment at a high production cycle rate, as noted at step 105.

In the course of or following complete degassing of the lens mold sections as indicated at 106 in FIG. 1, the pallets containing concave and convex lens mold sections are ordered into interleaved relation and degassed on enclosed infeed conveyor such that automated equipment may effect their operative interengagement into molding relation.

The sequencing conveyor 32 including the interleaving station 40 is enclosed and pressurized over its entire length with an inert gas, conveniently nitrogen. The amount of nitrogen is not critical, it being suitable to use just enough nitrogen pressure to effectively exclude the atmosphere under the operating conditions experienced. In the nitrogen tunnel surrounding sequencing conveyor 32 the freshly prepared lens mold blanks are degassed as indicated at step 106 in FIG. 1.

The concave lens molds are filled with the reactive monomer composition at step 107 and the concave and convex lens molds are placed into registry and urged into complementary molding relation. The filling and assembly zone 50 surrounds a portion of the conveying or transport means 32, which delivers to the zone pallets of concave and convex lens mold sections, respectively, and at the terminus of the zone carries pallets of paired and filled molds to the precure zone. The filling and assembly zone illustrated in FIG. 2 at 50 is defined by a geometrically appropriate, transparent enclosure, generally of rectangular cross-section, formed of any suitable thermoplastic or metal and thermoplastic construction.

As illustrated at 107 in FIG. 1, the concave lens mold sections are filled with degassed monomer composition from step 108, and then transported to an assembly module having a vacuum chamber formed intermittently within the nitrogen tunnel in which filled concave lens molds are engaged with convex mold sections in vertical alignment and in mating relation, such that the reactive monomer composition is trapped between the optical surfaces of the respective mold sections and at least partially sealed by the engagement of the parting edge formed peripherally in each of the lens mold sections. The vacuum is released and the mated mold is passed through nitrogen to the precure station, an integral part of the nitrogen tunnel.

As will hereinafter be explained in detail, the vacuum chamber is formed upon and about a single pallet by the periodic reciprocable motion of apparatus also comprising means for alignment of the seating of the convex mold sections upon the concave mold sections so their axes of rotation are collinear and their respective flanges are parallel. Upon sealing engagement with the pallet the thus formed chamber is evacuated in order to ensure that no gas bubbles are entrapped between and upon the respective optical molding surfaces. The degree of vacuum is selected for the purpose of speeding the assembly of mold parts and removing any gas bubbles at the monomer/mold interface that might otherwise be entrapped in the course of closure between the complementary mold sections.

Following assembly of the mold parts, the incipient lens monomer is precured at step 109 in the precure module 60 of the present invention. The process of the precure involves clamping the mold halves in registration and then precuring the monomer or monomer mixture to a gel like state.

Following precure, the polymerization of the monomer or monomer mixture is completed in curing tunnel 75 as indicated at step 110 as will be hereinafter explained in detail.

Following complete polymerization, the lenses are demolded by heating the back curve mold and then prying from the front curve and mold in the demold assembly 90 as indicated at step 111. Finally, the lens is hydrated, inspected and packaged as indicated at step 112.

Thus, the invention permits the generation of high optical quality soft contact lenses in volume and at high speed, with a low defect count.

Referring to FIGS. 1 and 2, the first and second injection molds 101(a) and 102(a) are continuously cycled to periodically produce (generally, from 3 to 12 seconds, and preferably, about 6 seconds) sets of concave and convex lens mold parts or sections which are collected from molds at the end of each cycle. In the geometric configuration obtaining, (and preferred for better manipulative exchange) the mold upon opening for demolding present the finished lens mold parts in or close to the vertical plane, generally −5 to 10° from the vertical. As illustrated in FIG. 2 and noted at step 105 in FIG. 1, a plurality of fingers of the articulated robotic means 103, 104 gently engage and receive the set of molds and while maintaining same in essentially the same spatial relation, rotates them from a plane generally perpendicular to the transport line through 90° to a parallel plane above the transport means while simultaneously or sequentially rotating toward and engaging the horizontal plane of the transport line, and releases the mold parts into registry with carrier pallets on conveyor means indicated generally at 27,29 in FIG. 2.

The robotic transporting assemblies generally depicted at 103,104 in FIG. 2, deposit the back curve mold parts directly on a production line pallet that has been momentarily paused by a clamping means.

As will be hereinafter explained with reference to FIG. 8(a), the front curve mold parts or halves are removed form the injection mold 10(a) in an inverted orientation to avoid any possible contact with the optical surface of the mold half. The front curve halves are then inverted by another robotic transfer device and deposited on a stationary pallet therebelow.

After receiving the sets of mold parts, the pallets are advanced by the belt conveyors 27,29, in the direction indicated by the arrows in FIG. 2 into a low oxygen environment, generally indicated by housing means 24. Housing means 24 is pressurized with $N_2$ as indicated, and may optionally be equipped with air lock means at each entry and egress point of the low oxygen environment.

FIGS. 3 and 3(a) illustrate respectively top elevational and side views of one embodiment of a first or front mold half 10 useful in the production of a contact lens by the polymerization of a monomer or monomer mixture in a mold assembly composed of two complementary front and base mold halves. The front mold half 10 is preferably formed of polystyrene but could be any suitable thermoplastic polymer such as mentioned hereinabove which is sufficiently transparent to ultraviolet or visible light to allow irradiation therethrough with light to promote the subsequent polymerization of a soft contact lens. Alternatively, other forms of radiant energy could be used providing the front mold half is transparent to that form of energy. A suitable thermoplastic such as polystyrene also has other desirable qualities such as being moldable to surfaces of optical quality at relatively low temperatures, having excellent flow characteristics and remaining amorphous during molding, not crystallizing, and having minimal shrinkage during cooling.

The front mold half 10 defines a central curved section with an optical quality concave surface 15, which has a circular circumferential parting edge 14 extending therearound. The parting edge 14, shown in enlarged detail in FIG. 3(b), is desirable to form a sharp and uniform plastic radius parting line (edge) for the subsequently molded soft contact lens. A generally parallel convex surface 16 is spaced from the concave surface 15, and an annular essentially uniplanar flange 18 is formed extending radially outwardly from the surfaces 15 and 16 in a plane normal (perpendicular) to the axis (of rotation) of the concave surface 15. The concave surface 15 has the dimensions of the front curve (power curve) of a contact lens to be produced by the front mold half, and is sufficiently smooth such that the surface of a contact lens formed by polymerization of a polymerizable composition in contact with the surface is of optically acceptable quality. The front mold half is designed with a thinness (typically 0.8 mm) and rigidity effective to transmit heat therethrough rapidly and to withstand prying forces applied to separate the mold half from the mold assembly during demolding.

The front mold half or curve thickness was reduced from 1.5 mm in prior designs to 0.8 mm. This has a direct impact on cycle time reduction.

FIGS. 4 and 4(a) illustrate respectively top elevational and side views of one embodiment of a second, or back curve mold half 30. The back curve mold half is designed with all of the same design considerations mentioned hereinabove with respect to the front curve mold half 10.

The back curve mold half 30 is also preferably formed of polystyrene but could be any suitable thermoplastic such as those mentioned hereinabove which is transparent to visible or ultraviolet light. The back curve mold half 30 defines a central curved section with an optical quality convex surface. 33, a generally parallel concave surface 34 spaced from the convex surface 33, and an annular essentially uniplanar flange 36 formed extending radially outwardly from the surfaces 33 and 34 in a plane normal to the axis (of rotation) of concave surface 34. The convex surface 33 has the dimensions of the rear curve (which rests upon the cornea of the eye) of a contact lens to be produced by the base mold half, and is sufficiently smooth such that the surface of a contact lens formed by polymerization of a polymerizable composition in contact with the surface is of optically acceptable quality. The base mold half is designed with a thinness (typically 0.6 mm) to transmit heat therethrough rapidly and rigidity effective to withstand prying forces applied to separate the mold half from the mold assembly during demolding.

The base curve is designed with a base curve sag of 5.6 mm (see FIG. 4(a) for the predetermined sag, dimension "Y"). The base curve sag and thickness of 0.6 mm serves two purposes:

1. The base curve sag results in a gap of 1.5 mm–3.0 mm between the assembled base curve and front curve, which assists in mechanically removing the base curve from the front curve matrix after polymerization which forms a contact lens.
2. With a part thickness on the order of 0.6 mm, the base curve reduces the occurrence of weld lines on the distal side of the flange (where two melt flows converge) which could detrimentally cause a fracture line on the base curve.

The mold halves 10,30 define generally triangular tabs 26,37 integral with the flange which project from one side of the flange. The tab 37 extends to the injection hot tip which supplies molten thermoplastic to the mold, and also defines therein an angled (e.g., 45°) web sections 22,38 for smoothing the flow of the polymer wave front and thus to avoid jetting, sink marks, weld lines and other undesirable flows which would impair the optical quality of the mold half. The mold halves 10,30 also define a small circular projections 25,35 which serve as traps in the molding process to immobilize small plugs of colder polymers that may form at the injection hot tip between cycles.

The monomer and monomer mixtures to which this process may be directed include copolymers based on 2-hydroxyethylmethacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., which include anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens. The mold assembly of the present invention described herein may be used to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by visible light, ultraviolet light, electron beam or a radioactive source may also be employed to catalyze the polymerization reaction, optionally with the addition of a polymerization initiator. Representative initiators include camphorquinone, ethyl-4-(N,N-dimethylamino) benzoate, and 4-(2-hydroxyethoxy)phenyl-2-hydroxyl2-propyl ketone.

Polymerization of the monomer or monomer mixture in the mold assembly is preferably carried out by exposing the composition to polymerization initiating conditions. The preferred technique is to include in the composition, initiators which work upon exposure to ultraviolet radiation; and exposing the composition to ultraviolet radiation of an intensity and duration effective to initiate polymerization and to allow it to proceed. For this reason, the mold halves are preferably transparent to ultraviolet radiation. After the precure step, the monomer is again exposed to ultraviolet radiation in a cure step in which the polymerization is permitted to proceed to completion. The required duration of the remainder of the reaction can readily be ascertained experimentally for any polymerizable composition.

As indicated at step 108 in FIG. 1, the monomer or monomer mixture is degassed prior to the filling of the front curve mold half in order to remove dissolved gases. $O_2$ is removed because of its deleterious effect on polymerization as noted above. Other gases, including $N_2$, are removed, to avoid the formation of gas bubbles when the monomer is expelled from the relatively high pressure of the pump line which supplies the fill nozzle, to encounter the atmospheric or subatmospheric $N_2$ pressure of the filling and assembly chambers.

Figure 9:
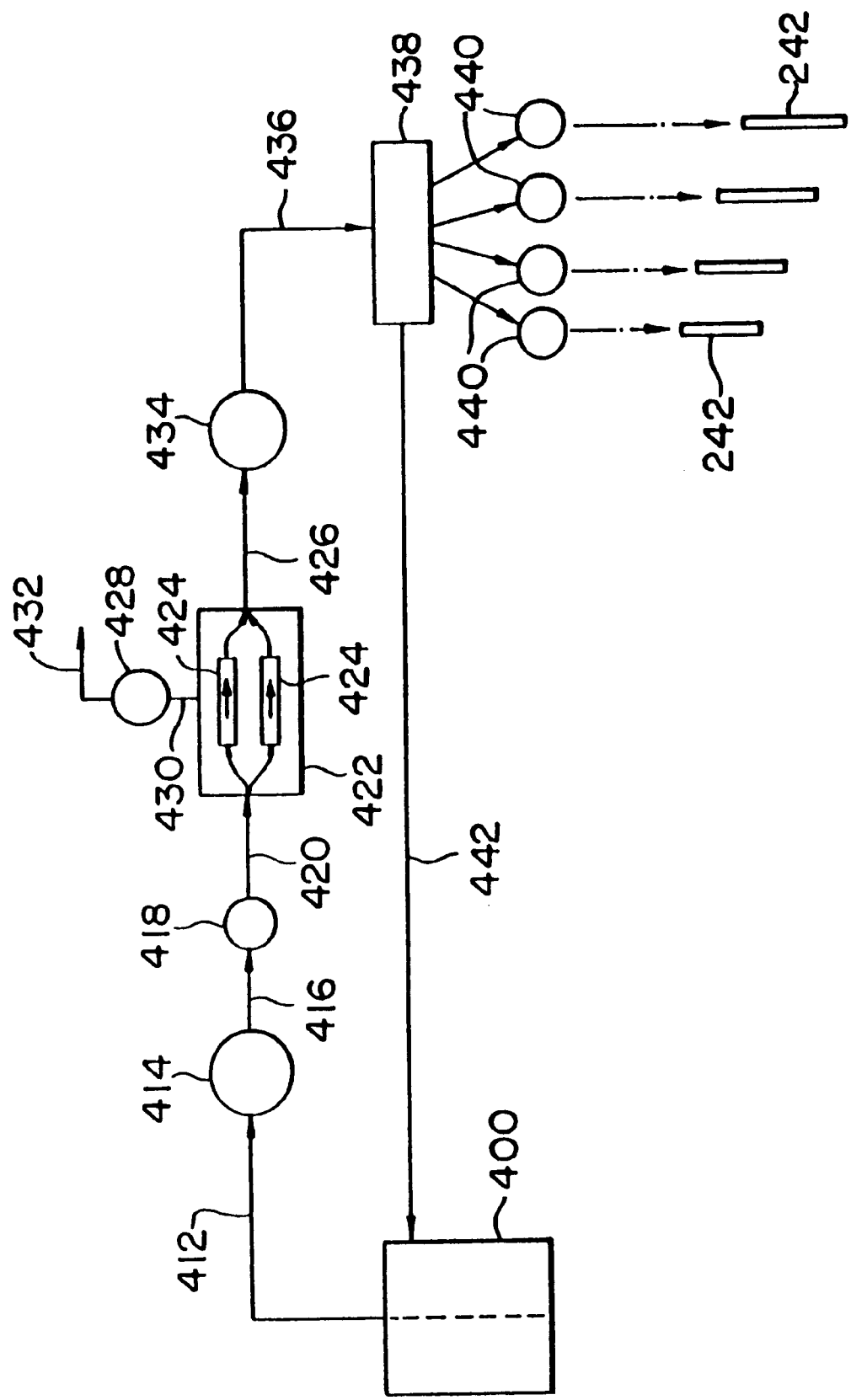
FIG. 9 is a simplified diagrammatic view of a monomer degassing and pumping system utilized in the present invention.

As illustrated in FIG. 9 the polymerizable monomer or monomer mixture is provided in containers 400, typically 15 liters in volume. The container is connected to the monomer degassing system by means of line 412. Suction is developed by pump 414 to draw the monomer from the drum 400, through line 412, to pump 414, and out the pump discharge 416. While going through discharge line 416, the monomer passes through filter 418 in order to remove any extraneous particulate contaminants that may be present in the monomer.

The monomer is then provided to the inlet 420 of the degas unit 422. Within the degas unit, the monomer is divided among a plurality of tubes 424, and then recombined into a degas unit discharge 426. The degas unit is operated under a low ambient pressure, typically around 4 torr which is provided by vacuum pump 428. This vacuum pump is attached to the degas unit 422 by line 430 and discharges the excess air from the degas unit by way of line 432. The tubing members 424 are formed preferably of a gas permeable tubing such as STHT tubing produced by Sanitec, Inc. of Andover, N.J. from Q74780 Medical Grade Silicon Rubber manufactured by Dow Corning of Midland, Mich. While two tubes are illustrated in FIG. 9, it is understood that a plurality of tubes, typically 10 tubes are provided for the degas unit 422.

After the monomer exit the degas unit 422 by discharge line 426, it passes through an oxygen monitor 434. This monitor measures the residual oxygen within the monomer to insure that the degas unit is functioning properly. If the oxygen content of the monomer is indicated as being to high, operation of the production line can be halted until the problem is corrected in order to avoid the production of defective lenses.

Once oxygen monitor 434 has determined that the oxygen content of the monomer is sufficiently low, the monomer passes through line 436 into manifold 438. The manifold is used as a common source to supply a plurality of precision dose pumps 440 used to fill the individual contact lens mold at the monomer filling and assembly dosing station 50. The pumps 440 used to pump the processed monomer delivered to manifold 438 are pumps made by the IVEK Corporation, North Springfield, Vt. These pumps provide precision doses of degassed monomer to the mold cavities 15 via nozzles 242. A return line 442 keep the monomer of the front curves 10 circulating when not pumped by pumps 440.

Figure 7A:
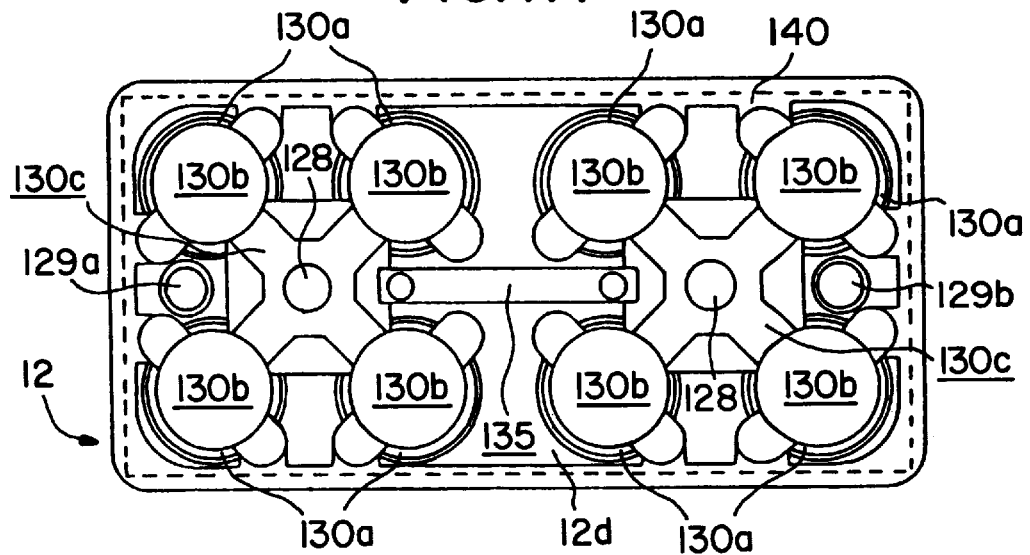
FIG. 7(a) is a top plan view of a production line pallet carrier, used to transport a plurality of contact lens molds throughout the contact lens production facility.
Figure 7B:
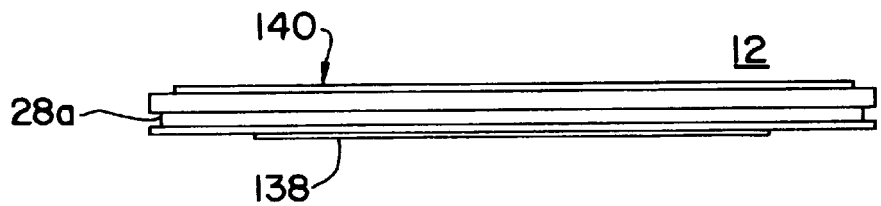
FIG. 7(b) is a side elevational view of the production line pallet carrier illustrated in FIG. 7(a)
Figure 7C:
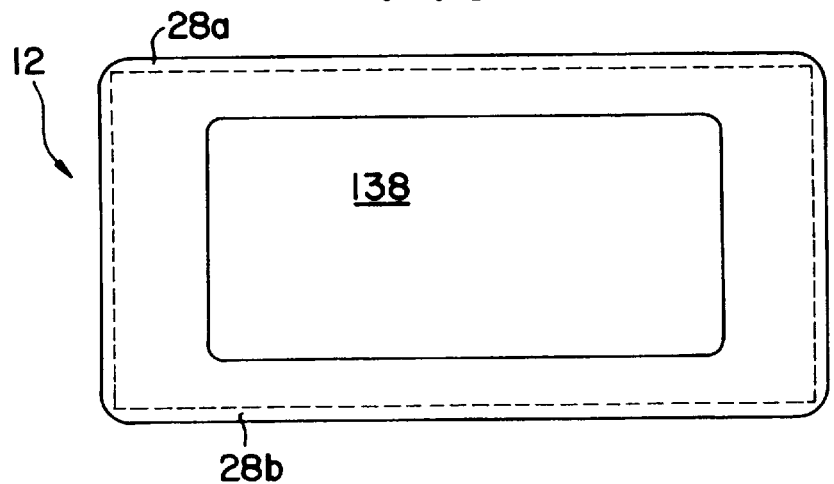
FIG. 7(c) is a bottom plan view of the production line pallet carrier illustrated in FIG. 7(a).

A top view of a production line pallet 12 for carrying production lens mold halves is shown illustrated in FIG. 7(a), with a side view illustrated in FIG. 7(b) and a bottom view illustrated in FIG. 7(c). It should be understood that all pallets 12 are interchangeable in that they may accommodate either front curve or back curve contact lens mold halves. In the preferred embodiment shown in FIG. 7(a), the production line pallet 12 is formed of aluminum and may be 60 mm in width and 120 mm in length. In another embodiment, the pallet 12 may be formed of stainless steel and may be 80 mm in width and 160 mm in length.

Each pallet 12 contains a plurality of recesses for receiving a respective contact lens mold assembly 39 comprising a complimentary front 10 and back 30 curve mold halves which define the shape of the final desired lens. One such mold assembly 39 is shown seated within a recess 130(b) of the pallet in FIG. 5. The contact lenses are formed by placing an amount of polymerizable monomer or monomer mixture, generally on the order of about 60 $\mu$l, in each front curve (concave) mold half seated within a pallet recess 130(b) at the filling and mold assembly apparatus 50. The desired amount depends on the dimensions (i.e., the diameter and thickness) of the desired lens, taking into account the generation of by-products upon polymerization and the exchange of water for those by-products and diluent, if any, following polymerization. Then, the back curve (convex) mold half 30 is placed onto the polymerizable composition 11 with the first and second mold halves aligned so that their axes of rotation are collinear and the respective flanges 18,36 are parallel. The mold halves are transported in an annular recess 130(a) which receives and supports the annular flange 18 of the front curve mold half. In addition to the recesses 130(a) and (b), the pallets 12 also have a plurality of oriented recesses 130(c) which receive the triangular tab portions 26 of the seated front curve mold half 10 to provide a predefined angular position thereof. The recesses 130(a) are designed to prevent movement of the normally seated mold half within each recess up to within ±0.1 mm. The triangular tab 37 of the second or back curve mold half 30 overlies front curve tab 26 to enable a collinear axis of rotation with respect to the two mold halves, if desired.

As illustrated in FIGS. 7(a)–7(c), pallet 12 of the present invention is designed to ensure that a tight vacuum seal may be created with the surface of the pallet during the monomer deposition and contact lens mold assembly phases of the production line facility. As will be explained in further detail below, blind locating bushings 129(a) and 129(b) are located at opposite ends of the pallet 12 to enable precise positioning of the pallet within the various assemblies of the production line. These locating bushings enable a precise registration of the pallet throughout the various assemblies of the contact lens production facility, and, thereby assist in the alignment of a tight vacuum seal to be created at the peripheral upper surface 140 of the pallet prior to assembling the mold halves. As shown in FIG. 7(a), proximate the center of each pallet 12(a) is a unique bar code identifier 135 for handling, tracking, and quality control purposes.

As further shown in FIGS. 7(b) and 7(c), the outer peripheral edges of the pallet 12 define a notch or indentation 28(a),(b) for engaging a complementary guide rail or shoulder for enabling precise registration of the pallet at the demolding apparatus, as will be explained in greater detail below. Additionally, the pallet 12 includes blind holes 128(a) and 128(b) wherein an optic bore scope or similar viewing device may be inserted to enable real time viewing of the contact lens production process at the surface of the pallet.

Figure 8A:
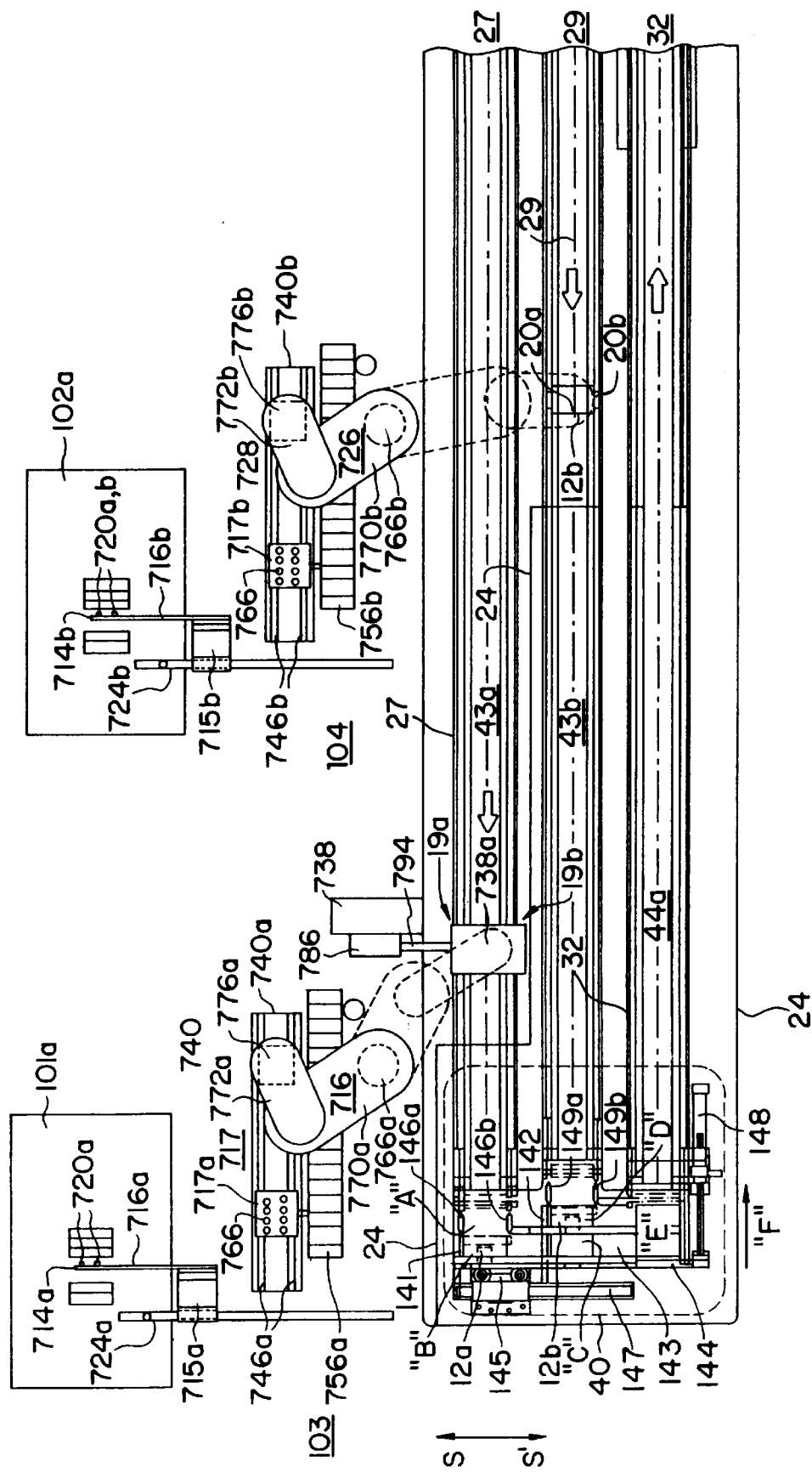
FIG. 8(a) is a simplified plan view of the first section of an automated line for the molding of contact lenses, and includes diagrammatic plan views of the injection apparatus and robotic material handling devices used to prepare and transfer mold halves for the lenses to be molded.

FIG. 8(a) illustrates in detail the robotic transporting assemblies 103,104 of FIG. 2 for rapidly transporting respective front curve and back curve mold portions from respective injection molds 101(a) and 102(a) to respective pallets 12(a) and 12(b). A detailed description of the mold cavities of injection mold assemblies 101(a) and 102(a) may be found in the aforementioned co-pending patent application U.S. Ser. No. 08/257,794 "Mold Insert. Design to Achieve Short Mold Cycle Time", now U.S. Pat. No. 5,545,366 assigned to the same assignee as the instant invention. A detailed description of each transporting assembly 103 and 104 may be found in co-pending patent application U.S. Ser. No. 08/258,267 entitled "Apparatus for Removing and Transporting Articles from Molds", refiled as Ser. No. 08/757,154, now U.S. Pat. No. 5,681,138, assigned to the same assignee as the instant invention.

Generally, robotic transporting assembly 103 is provided with a first robotic assembly 715 for removing front curve lens molds from injection mold assembly 101(a), and transporting the mold to a first location; assembly 717 is provided for receiving the front curve lens molds from assembly 715 and transporting the molds from the first location to a second location, and robotic assembly 716 is provided for receiving the front curve lens molds from assembly 717 and transporting those molds from the second location to an inverting hand 738(a) of inverting assembly 738 that inverts the orientation of the front curve molds carried by the robot 716. This inversion is necessary because the robotic assembly 716 is handling the front curve molds by their non-optical (convex) side and the front curve molds must therefore be inverted to enable the non-optical surface of each mold to be placed in the pallet 12(a) (under inverting hand 738(a)) that has been momentarily paused to receive the front curve lens molds.

The robotic transfer assemblies 103,104 are more fully described with respect to FIG. 8(a) as follows. Support subassemblies 716(a),(b) of robotic assembly 715(a),(b) are connected to hands 714(a),(b) to support the hands and to move the hands between molds 101(a),102(a) and the first location, which preferably is directly above transfer platforms 717(a),(b) of the second robotic assembly 717,728.

Preferably, support frames 724(a),(b) are located adjacent molds 101(a),102(a) and support subassemblies 716(a),(b) are supported on frame 724(a),(b) for sliding movement toward and away from molds 101(a),102(a). As the assemblies 15(a),(b) slide along frames 724(a),(b), hands 714(a),(b) move with the assemblies toward and away from molds 101(a),102(a).

More specifically, arms 716(a),(b) are slidably mounted on frames 724(a),(b), to extend outward from these frames, and are pivotally mounted on assemblies 715(a),(b) while hands 714(a),(b) are rigidly connected to the outward ends of arms 716(a),(b) for movement therewith. With this arrangement, arms 716(a),(b) carry hands 714(a),(b) toward and away from molds 101(a),102(a), while allowing the hands to pivot between a substantially vertical orientation, as shown in FIG. 8(a), and a substantially horizontal orientation, to deposit the mold parts on carriers 717(a),(b).

Preferably, arms 716(a),(b) are high speed, low mass assemblies, and are able to move hands 714(a),(b) into molds 101(a),102(a), and remove articles therefrom, at a rate of once every 3 to 12 seconds and preferably every 6 seconds. Also, preferably the arm is constructed from a high strength, low mass material such as material sold under the trademark Kevlar.

Each of the hands 714(a),(b) are equipped with a plurality of hollow cylindrical bellows, two of which are illustrated on each hand at 720(a),(b). The bellows are connected to a vacuum manifold and vacuum line for engaging and securing the mold parts thereto as they are ejected.

As previously mentioned, second robotic assemblies 717, 728 receive articles from first robotic assemblies 715(a),(b), at the first location, and transport those articles to the second location; and, generally, second robotic assemblies 717,728 include support frames 740(a),(b), platforms 717(a),(b), and tread covered support lines 756(a),(b). Support frames 740(a),(b) have the general shape of an elongated cube or box and extend from a position located directly below the above-mentioned first location to a position directly below the above-mentioned second location. The top portion of frames 740(a),(b) form channels 746(a),(b) that longitudinally extend between the transverse ends of the support frame.

Transfer platforms 717(a),(b) are provided to receive articles from first assembly 715(a),715(b), specifically hands 714(a),(b) thereof, and to carry those articles on support frames 740(a),(b) for sliding or rolling movement therealong.

The upper section of transfer platforms 717(a),(b) include or form a multitude of receptacles 766 for receiving and holding mold halves received from hand members 714(a), (b). Preferably, receptacles 766 on transfer platforms 717(a),(b) are located so that when hands 714 of assemblies 15(a),15(b) are positioned directly above transfer platforms 742(a),(b), each of the bellows 720 of hands 714(a),(b) are aligned with a respective one of the receptacles 726 of platforms 717(a),(b).

A moving means is provided to move the transfer platforms 717(a),(b) along frames 740(a),(b), and preferably the moving means includes a ball screw and motor mounted within support frames 740(a),(b) and coupled to the platforms 717(a),(b) by brackets. Treads 756(a),(b) protect and route the electrical vacuum and pneumatic support for the transfer platforms 717(a),(b). The tread protectors 756(a), (b) are located adjacent support frames 740(a),(b) and are supported for movement between extended and retracted positions.

A pair of third robotic assemblies 716,726 are illustrated and are provided to receive articles from second assemblies 717,728, to releasably hold those articles and to carry the articles to a third location. Support column 766(a),(b) supports robotic assemblies 716,726 for movement between the second and third locations. More specifically, support columns 766(a),(b) are supported and extends upward between the above-mentioned second and third locations. First arms 770(a),(b) of robotic assemblies 716,726 are supported by support columns 766(a),(b) for pivotal movement, and this first arm extends outward from the support column; and second arms 772(a),(b) are supported by first arms 770(a), (b) for pivotal movement on one end of arms 772(a),(b) and extend outward therefrom.

Preferably, a third vertical arm is provided for each robotic assembly that is extensible, and this arm is extended and retracted to lower and raise hands 776(a),(b) indicated by dotted lines in FIG. 8(a). Any suitable means may be used to extend and to retract the third arm; and, for instance, a hydraulic cylinder or screw motor may be mounted in the robotic assembly, with hands 776(a),(b) connected to a lower end of the hydraulic cylinder or screw motor.

Hands 776(a),(b) are provided for receiving and releasably holding the mold halves, and preferably these hands also include a plurality of bellows for gripping the mold halves.

In the operation of the robotic assemblies 716,726, arms 770(a),(b) are pivoted about column 766(a),(b) and arms 772(a),(b) are pivoted on arms 770(a),(b) to the position shown in FIG. 8(a), where the arms and hands 776(a),(b) are directly above the second extended position of transfer platforms 717(a),(b). Hands 776(a),(b) are then lowered toward or into engagement with transfer platforms 717(a), (b) and the mold halves are transferred from transfer platforms 717(a),(b) to hands 776(a),(b) and the hands are then raised, clearing the hands from the transfer platforms 717 (a),(b). Arms 770(a),(b) are then pivoted about columns 766(a),(b), clockwise as viewed in FIG. 8(a), and, simultaneously, arms 772(a),(b) are pivoted on arms 770(a), (b), counterclockwise as viewed in FIG. 8(a), until hands 716(a),(b) are located directly above the position at which the mold halves are to.be deposited. The vertical arms mounted on the second arms 772(a),(b) are then extended to lower hands 776(a),(b), and the mold halves may be transferred from hand 776(a) to pallet 738(a) of inverter 738 or from hand 776(b) directly on a pallet 12(b) carried on conveyor 29.

To elaborate, when robotic transport assembly 103 carries mold halves, preferably all physical contact between the elements of robotic assembly 103 and the mold half is on the sides of the mold that are opposite the optical surfaces of those mold sections. In this way, there is no physical contact between any part of robotic assembly 103 and the surfaces of the mold that directly engage the hydrophilic material used to form the contact lens molded between the mold halves. Thus, when assembly 103 carries mold half away from injection mold 101(a), the mold half is inverted; while when assembly 104 carries a mold half away from injection mold 102(a), the mold is in its position and ready for deposit on a carrier pallet. Thus, when robotic assembly 103 carries mold halves away from injection mold 101(a), the mold half is not in the proper orientation for transfer to pallet 12(a), and the mold half must be inverted in order to orient it properly for transfer to pallet 12(a). The preferred embodiment of inverter assembly 738 is provided to do this.

As mentioned above, inverter assembly 738 includes hand 738(a) and support subassembly 786. Preferably, hand 738 (a) includes a base and bellows to receive mold halves from the third robotic assembly 716, specifically hands 776(a) thereof, and to hold those articles while they are inverted for transfer to pallet 12(a).

Support subassembly 786 is provided to move hand 738(a) of assembly 738 between third and fourth locations, and in the preferred embodiment, support subassembly 786 is used to pivot and to reciprocate hand 738(a). With the embodiment of subassembly 738 illustrated in the drawings, arm 794 extends outward from subassembly 786, and hand 738(a) is rigidly connected to an outward or second end of arm 794 for pivotal movement therewith. Preferably, hand 738(a) is pivoted substantially 180°, from a position in which the bellows on the hand extend directly upward to a position in which these bellows extend directly downward. After receipt of the mold halves from hand 776(a), the inverter assembly 738 reciprocates hand 738(a) downwardly and then releases the mold halves onto a pallet 12(a) that has been temporarily paused by clamping means 19(a),19(b) as will hereinafter be explained.

Each of the pallets is momentarily paused on conveyor belts 27,29 at the time of transfer of the molds. In the preferred embodiment shown in FIG. 8(a), and in elevation in FIG. 6, a clamping mechanism 19 comprising a pair of clamping jaws 19(a),(b) are located at opposite sides of the conveyor 27 to timely clamp an empty pallet 12(a) and halt the motion so that the front curve mold halves may be positioned on the pallet by inverting head 738(a), while a pair of clamping jaws 20(a),(b) are located to timely clamp an empty pallet 12(b) to halt its motion on conveyor 29 while the back curve mold halves are positioned on the pallet by robot assembly 726.

The front and back curve mold halves are also transferred from their respective injection mold assemblies 10l(a),102 (a) to a low oxygen, and preferably, a nitrogen environment maintained around portions of the front curve conveyor 27, back curve conveyor 29, and a sequencing conveyor 32 by housing 24. This inert environment is accomplished by enclosing each conveyor in an atmosphere of pressurized nitrogen gas. As will be explained below, the handling of the pallets and the contact lens mold assemblies throughout the various stations of the production line facility are conducted in an inert, and preferably a nitrogen gas to provide a low oxygen environment for all of the component pars prior to polymerization. While it is possible to enclose injection mold assemblies 101(a),102(a) and robotic transport assemblies 103,104 within a nitrogen enclosure, it has been found that the use of the high speed robotic assemblies illustrated in FIG. 8(a), a transfer can be accomplished in under 15 seconds, with a mold cycle time of 6 seconds. The 15 second exposure to atmospheric oxygen requires only a 3 minute residence time under $N_2$ to degas $O_2$ adsorbed during the 15 seconds. A 3 minute buffer on sequencing conveyor 32 also ensures an adequate supply of molds for the assembly line. Opening the injection mold devices 101(a),102(a) to atmospheric cooling alleviates substantial cooling problems that would otherwise be encountered by running the molding machines in an enclosed environment.

The operation of the clamping mechanisms 19 and 20 will now be described in view of FIG. 6. It should be mentioned that the operation of all clamping mechanisms hereinafter disclosed, is essentially the same as the following description of the preferred embodiment. Specifically, the clamping mechanism 19 consists of one or more pneumatic cylinders 21 that operates to push lower ends 44(a),(b) of clamping jaws 19(a),(b) so the jaws pivot about associated clamping shafts 42(a),(b) to close in and enable respective fixed clamping blocks 19(c),(d) to grip pallet 12(a) (shown in phantom lines in FIG. 6) that is positioned in alignment with the jaws 19(*a*),(*b*). As illustrated in the FIG. 6, the clamping blocks 19(*c*),(*d*) of clamping jaws 19(*a*),(*b*) are located just above and at opposite sides of the conveyor 27 while the pneumatic cylinder 21 is mounted below the conveyor 27.

Figure 6:
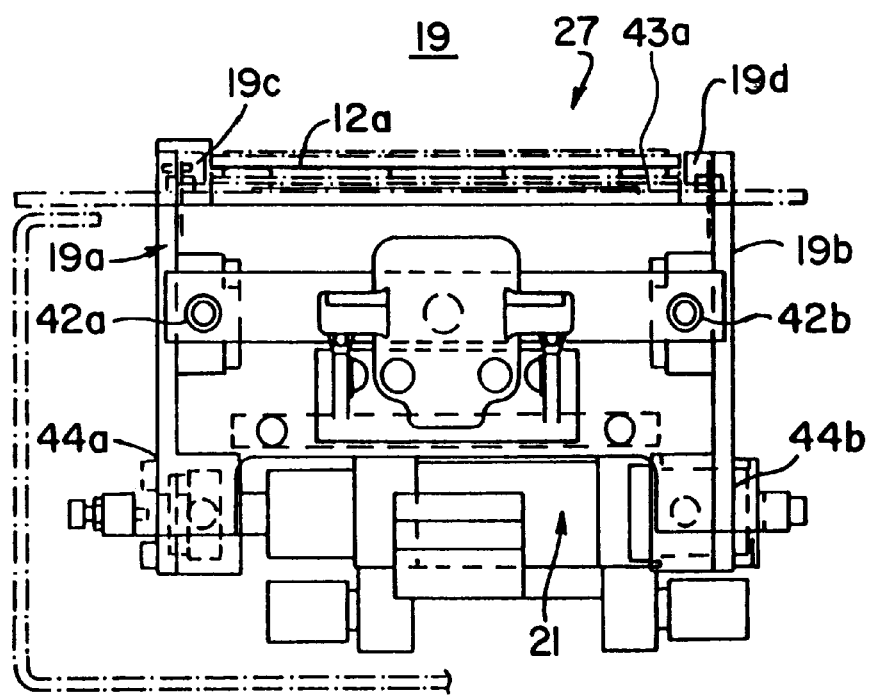
FIG. 6 is a cross-sectional view of a typical production line conveyor and a clamp apparatus used to pause pallet movement.

To transport the pallets, each supply conveyor 27,29 comprises a drive means in the form of a motor driven belts, one of which is illustrated in cross-section in FIG. 6(*a*) as 43(*a*), which are strong enough to support pallets 12(*a*),(*b*) supplied to the sequencing apparatus 40. As illustrated in FIGS. 7(*b*) and (*c*), a raised underside section 138 of each pallet 12(*a*),(*b*) may be coated with Nedox® or Tufram® so to enable sliding of the pallet when being held above a moving belt by clamping jaws 19,20 or pushed along slide plates at certain processing locations of the plant.

The pallet conveyors 27,29 and 32 include a drive means for each of the motor driven belts. The motor drive means to conveyor 32 enables the transport of thirty or more paired sets of pallets 12(*a*),12(*b*) carrying respective front and back curve lens mold portions to be smoothly and uniformly transported at a preferred rate of approximately 30 mm/sec until they are assembled for processing at the filling/mold assembly apparatus 50. In a similar fashion, suitable motors drive respective conveyor belts 43(*a*),43(*b*) carrying the respective pallets 12(*a*),12(*b*) so that they are smoothly and uniformly transported at a preferred rate of approximately 75 mm/sec until their motion is terminated at the ends of each conveyor for sequencing as will be explained in further detail below. Additionally, idler rollers and tensioner roller may be provided for adjusting the tension of the belts of conveyors 27,29 and 32.

FIG. 6 illustrates a cross-sectional, front view of a conveyor assembly 27 shown carrying a pallet 12(*a*) on conveyor belt 43(*a*). It is understood that the view of FIG. 6 may apply to any of the other above-described conveyors 29 and 32 carrying pallets.

FIG. 8(*a*) illustrates the sequencing apparatus 40 (demarked by dotted lines in FIG. 8(*a*)) of pallet system comprising a double cross pusher which positions a pallet 12(*a*) from conveyor 27 (containing front curve contact lens mold portions) next to a pallet 12(*b*) from supply conveyor 29 (containing back curve contact lens mold portions) for conveyance along the sequencing conveyor 32. The sequencing apparatus 40 is located at the ends of each supply conveyor 27, 29 and comprises a first arm 141 and second arm 142 for simultaneously pushing pallets from respective supply conveyors 27 and 29 along track 143 for entry into the main sequencing conveyor 32. As illustrated in FIG. 8(*a*), the first arm 141 and second arm 142 are mounted in parallel on mounting means 145 that is slidable along track 147 in both directions as indicated by the double arrow in FIG. 8(*a*). A lifting means, which may be pneumatically operated, is provided for raising and lowering the first and second arms 141,142 in a vertical direction above the plane of a horizontally positioned pallet, as will be explained in further detail below. While the arms 141,142 are in a raised position, the mounting means 145 remains slidable along track 147 so that the first and second arms may be retracted while in their raised position and subsequently lowered after reaching their original positions.

In a first step of the sequencing process, the forward motion of a pallet 12(*a*) from conveyor 27 is terminated at a first position "A", just forward of the first arm 141, as shown in FIG. 8(*a*). Forward motion of the pallet 12(*a*) is terminated by a pair of upstream clamping jaws 146(*a*),(*b*), that, in a timed fashion, open and close to let one pallet align with the first pusher arm 141 of the double pusher. When jaws 146(*a*),(*b*) are closed, forward motion of the pallet is terminated and a plurality of pallets will accumulate behind the clamped pallet. At the appropriate time, one pallet may be released by opening the clamping jaws 146(*a*),(*b*) so that the forward motion of the accumulating pallets on conveyor 27 will push the first lead pallet to a second position indicated as "B" in FIG. 8(*a*), also in alignment with the first pusher arm 141. The jaws 146(*a*),(*b*) may be immediately closed to clamp the next of the accumulated pallets to prevent their forward motion. The opening and closing of the clamping jaws 146(*a*),(*b*) may be appropriately timed to enable pallets to be sequentially input to the pusher in an orderly fashion.

After appropriate sensing, and, as controlled by a computer or a programmable logic controller, the arms 141,142 of double cross pusher 40 are caused to slide along track 147 in the first direction from S to S' indicated by the double headed arrow S–S' in FIG. 8(*a*) at so that first arm 141 pushes pallet 12(*a*) to a second position that is located just forward of second arm 142 position and indicated by arrow "C" in FIG. 8(*a*). It is understood that during initialization of the sequencer, the second arm 142 did not push a pallet since none were positioned for movement in front of second arm. The lifting means is then commanded to raise the first and second arms 141,142 so that the mounting means and the arms may be retracted along track 147 and subsequently lowered back at their original position as shown in FIG. 8(*a*).

The following description demarcates where steady state sequencing operations begin. As shown in FIG. 8(*a*), after retracting first and second arms 141,142 to their original position, or, preferably, while the arms are in their raised position while being retracted, a new pallet 12(*a*) carrying front curve lens mold portions from conveyor 27 is positioned at the vacated first position (indicated by arrow "A") in the manner described above. Simultaneously therewith, the forward motion of a pallet 12(*b*) carrying back curve contact lens mold portions from back curve supply conveyor 29 is terminated at a position "D" as indicated in FIG. 8(*a*). The process for aligning a pallet 12(*b*) carrying back curve lens mold portions at position B is essentially similar as described above with respect to pallet 12(*a*). In a timed manner, clamping jaws 149(*a*),(*b*) close to clamp pallet 12(*b*), while the other pallets on conveyor 29 accumulate behind the clamped pallet. The jaws 149(*a*),(*b*) are subsequently opened to release the pallet so that the motion of the conveyor 29 pushes the pallet 12(*b*) in alignment with the second pusher arm 142. The jaws 149(*a*),(*b*) are immediately closed to clamp the next of the accumulated pallets to prevent its forward motion. Pallet 12(*b*) carrying back curve contact lens mold portions is now positioned at "D", immediately adjacent the previously positioned pallet 12(*a*) from the initial step, situated at position "C", with both in alignment with the second arm 142. After appropriate sensing, the arms 141,142 of the double cross pusher 40 are again caused to slide along track 147 from their original position in the direction indicated by the double headed arrow so that first arm 141 pushes a pallet 12(*a*) to the second position ("C") and the second arm 142 pushes the pair of pallets 12(*a*),12(*b*) from second position "C and D" to a third position indicated by "E" in FIG. 8(*a*). Finally, the pusher arms 141,142 are raised so that the mounting means 145 and the arms may be retracted along track 147 and lowered at their original position. While the first and second arms 141,142 are being retracted, a new set of pallets are being loaded at their respective positions. Specifically, a pallet 12(*a*) is loaded at position indicated as "B" (FIG. 8(*b*)) and a pallet 12(*b*) is loaded at position indicated as "D" adjacent the previously positioned pallet 12(*a*) and the sequence is repeated.

While the new set of pallets are being loaded at their respective positions, a third pusher arm 144 operable by pneumatic driving means 148 is activated to push the adjacently situated pair of pallets 12(*a*),12(*b*) in the direction indicated by arrow "F" in FIG. 8(*a*), for engagement with the drive belt 44(*a*) of sequencing conveyor 32. In steady state operation, the sequence of events described above is repeated so that pairs of pallets 12(*a*),12(*b*) are sequentially transported along sequencing conveyor 32 to the filling and mold assembly stations of the contact lens production facility.

The paired sets of pallets 12(*a*),12(*b*) carrying respective front curve and back curve lens molds reach a second sequencing apparatus 52 (illustrated in FIG. 8(*b*)) where their forward motion is diverted for input to the filling apparatus 50.

FIG. 8(*b*), which is a continuation of FIG. 8(*a*), illustrates the precision pallet handling apparatus 55 for transferring pallets from sequencing conveyor 32 to the filling apparatus 50. Specifically, the motion of each pallet 12(*a*),(*b*) carrying respective lens mold halves is terminated by a pair of upstream clamping jaws 153(*a*) and 153(*b*), in the manner as described above, at position indicated as "C" in front of pusher 154(*a*) of ram 154. When the motion of the first pallet is halted, the alternating series of pallets 12(*a*),(*b*) accumulate therebehind. The jaws 153(*a*),(*b*) are opened to enable one pallet, for e.g., pallet 12(*b*) carrying back curve lens mold halves, to align with pusher 154(*a*) of ram 154. Then, pusher 154(*a*) which in the preferred embodiment is driven by pneumatic cylinder unit 154, is timely activated to push the pallet 12(*b*) along slide plate 32(*a*) for a distance equivalent to the length of the pallet in the direction indicated by arrow "H". This process is repeated to bring a pallet 12(*a*) into engagement with pallet 12(*b*) and both are advanced in the direction of arrow "J" and to a position in alignment with ram head 157(*a*) of ram 157. The ram 157, which is servo motor driven is timely activated to first push the pallet 12(*b*) along track 32(*b*) in the direction indicated by arrow "J" for a distance approximately equal to the width of the pallet ±0.1 mm. This sequence is then repeated with pallet 12(*a*). This sequence of events herein described is continuously repeated to push a row of pallets and enable precision registration of pallets 12(*b*) and 12(*a*) when they alternately enter filling and dosing apparatus 53 of filling/mold assembly station 50.

FILLING AND ASSEMBLY STATIONS

The filling and assembly station, indicated generally at 50 in FIGS. 2 and 8(*b*) includes three separate stations, including a filling station 53, further described and illustrated in FIGS. 10(*a*), 11 and 15; a surfactant application station 54, illustrated and described with respect to FIGS. 10(*b*) and 12; and an assembly station 55, illustrated and described with respect to FIGS. 10(*c*), 10(*d*), 13, 14(*a*), 14(*b*) and 16.

As described briefly above and in further view of FIGS. 10(*a*) and 11, a predetermined amount of the degassed monomer or monomer mixture 11 is deposited in a front curve mold half by means of a precision dosing nozzle 242, which is part of the dosing or filling apparatus 53 of station 50. The monomer may be dosed in each of the front curve mold halves, carried in the alternating pallets, under vacuum to avoid the possibility of entrapping any gasses between the monomer and the front curve mold half. The polymerizable monomer mixture is first degassed, as described. previously, to insure that dissolved gasses are not present in the monomer inasmuch as dissolved gasses may well form bubbles as the monomer is released from the relatively high pressure of the dosing nozzle 242 to inert atmospheric, $N^2$ or vacuum conditions surrounding the front curve mold half 10. Additionally the oxygen content of the monomer solution is monitored prior to discharge in the front curve mold cavities.

Each of the nozzles 242 includes a teflon dosing tip with an O.D. of approximately 0.070" and an I.D. of approximately 0.040. Each tip is cut at approximately a 45° angle, and is positioned to be carried within 0.5 mm of the horizontal tangent of the front curve 31 surface 15 at the time of dosing.

As the monomer or monomer mixture is dosed, it pools upwardly around the tip, as illustrated in FIG. 11(*a*), so that the angle of the tip is covered. When the manifold assembly 251 is reciprocated upwardly, the pool of monomer wicks the nozzle tip, and draws any excess on the tip. This wicking action increases the accuracy of the dose, it pulls off potential drops of monomer and it avoids any agitation of the monomer that might result in bubble formation.

If drops of monomer form on the tip, there is the possibility of contamination of a passing pallet or the dosing station form an inadvertent drop. Individual drops of monomer, even when deposited into a mold cavity, or on top of the monomer pool, have been found to generate a "seed" site for a gas bubble. By wicking the tip with the monomer pool, this possibility is substantially eliminated.

In the preferred embodiment of the invention, approximately 60 µl of polymerizable monomer or monomer mixture is deposited in the front curve mold half to insure that the mold cavity is overdosed to avoid the possibility of incomplete molding. The excess monomer is removed from the mold cavity in the final step of the demolding of the front and back curve mold halves as an excess HEMA ring as will be hereinafter described. (When hydroxyethylmethacrylate is used, the excess monomer is referred to as a HEMA ring).

At station 53, as illustrated in FIG. 11, a plurality of monomer supply lines 241 are coupled to associated discharge nozzles 242, two of which are illustrated in FIG. 11 which are suspended directly over the path of the pallet 12(*a*) and the individual front curve molds 10. The dosing or filling station 53 includes a manifold block 251 for receiving each of the monomer discharge nozzles 242 and a vacuum seal 252 which may be used to cooperate with the outer perimeter 140 of pallet 12(*a*) to provide a sealed enclosure that may be evacuated with a vacuum pump so that the deposition of the monomer occurs in a vacuum, if desired. The manifold block assembly 251 reciprocates with respect to a fixed platform 253 on a pair of tubes or cylinders 254(*a*), 254(*b*) as will be hereinafter described with respect to FIG. 15. The dosing module 53 also includes a pair of bore scope tubes 255, 256 which enable inspection of the monomer dosing, if desired, through an optic bore scope 200, as illustrated in FIG. 15.

Figure 15:
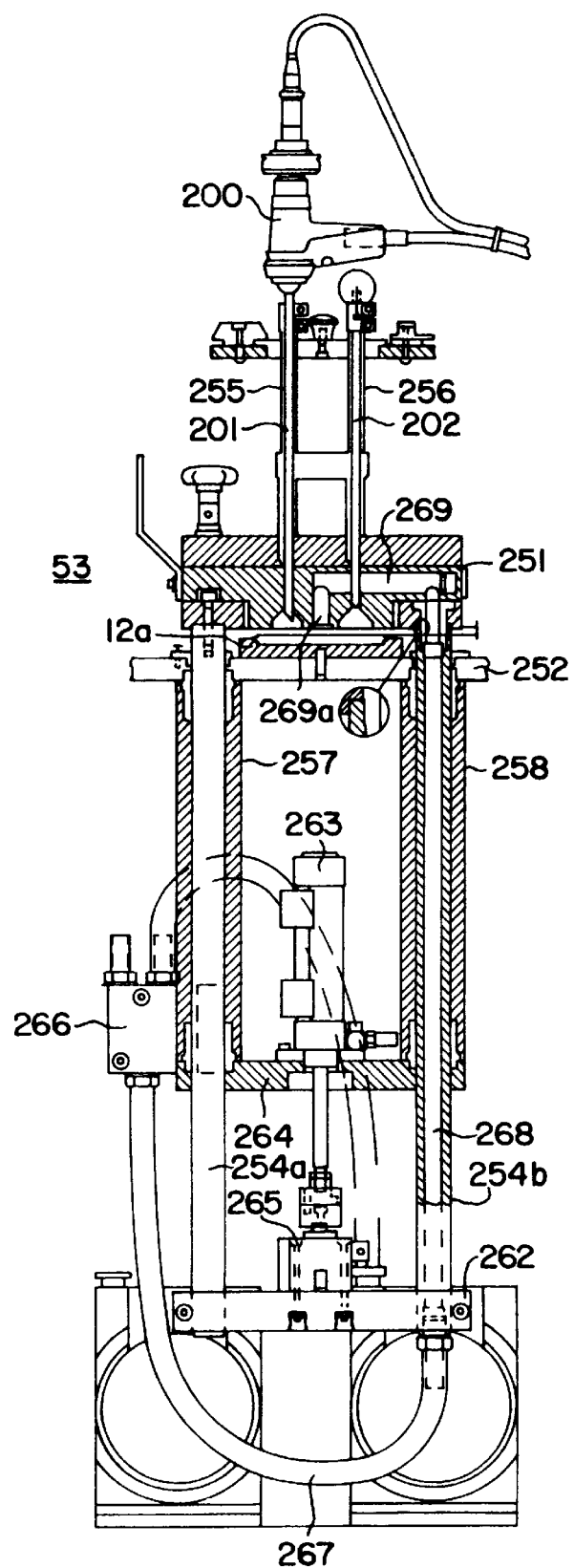
FIG. 15 is a diagrammatic and partially cross-sectioned illustration of the dosing or filling station of the present invention illustrating the vacuum interconnections to the reciprocating filling module.

As illustrated in FIG. 15, the entire deposition module 53 is reciprocated vertically with respect to a fixed support frame 252 and 264 by means of a short stroke pneumatic cylinder 265 mounted between frame 262 and drive rod 263(*a*) of pneumatic cylinder 263 which is fixably mounted to fixed frame 264. Vacuum is supplied through the filling or dosing station through manifold 266 and vacuum line 267 to an interior manifold 268 formed in one of the two reciprocating support tubes 254(*a*), 254(*b*). The tubes or cylinders 254(*a*), 254(*b*) reciprocate with fixed guide tubes 257,258. A vacuum plenum is also formed in the manifold block 251 by means of bore holes 269 and 269(*a*) which provide vacuum communication between the vacuum manifold 266 and the interior of the dosing station 53 defined by perimeter seal 252 and the pallet 12(*a*).

An optic bore scope 200 is illustrated in FIG. 15 with an optic probe 201 extending down into the blind holes 128 (a),(b) of pallet 12(a) and manifold block 251. A dummy or blind 202 is installed in the other bore scope tube 256 to seal access into the interior vacuum plenum of the assembly station 53 when a bore scope is not in use.

Figure 8B:
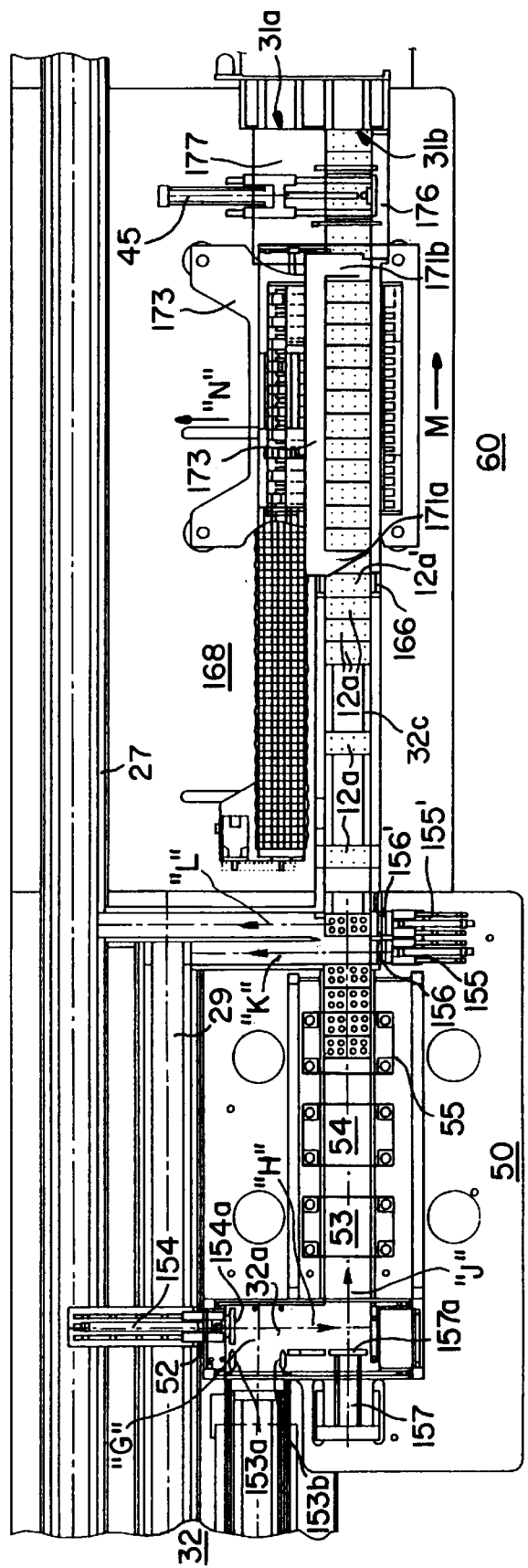
FIG. 8(b) is a simplified plan view of a second section of the automated line for molding contact lenses, which illustrates the filling and assembly stations and a precure station utilized in the practice of the present invention.

In operation, a pallet 12(a) is advanced into the dosing station 53 by means of the material handling ram 157 previously discussed with respect to FIG. 8(b). Once in position, the manifold assembly 251 is reciprocated downwardly by means of pneumatic cylinder 265. If vacuum dosing is desired, when the vacuum seal 252 on the manifold assembly 251 engages the pallet 12(a), the sensor assembly 265 may be triggered, thereby opening a valve to draw a vacuum in manifold 266, vacuum line 267, manifold 268 and plenum 269, 269(a). It should be noted that a vacuum is not required for filling or dosing of the mold cavities, but does avoid the possibility of $N_2$ gas being trapped between the monomer and the front curve mold half. It should also be noted that the ambient atmosphere surrounding pallet 12(a) is a low oxygen $N_2$ environment and evacuation of the chamber is an evacuation of the $N_2$ gas. After vacuum has been established within the dosing chamber, pumps 440 (illustrated in FIG. 9) are actuated to deliver a precise dose of 60 μl to each of the mold cavities illustrated in FIGS. 10(a) and 11.

After the monomer has been dosed into the individual mold cavities, the vacuum is broken in manifold 266 and the manifold assembly 251 is reciprocated upwardly by pneumatic drive means 265 to draw dosing nozzle 242 out of the monomer pool 11 and allow transport of the pallet 12(a) to the apparatus 54 which coats the mold flange 18 with a mold release surfactant. Pneumatic cylinder 263 may be used to lift the assembly manifold 251 to a high service position for cleaning and servicing.

SURFACTANT APPLICATION

Figure 12:
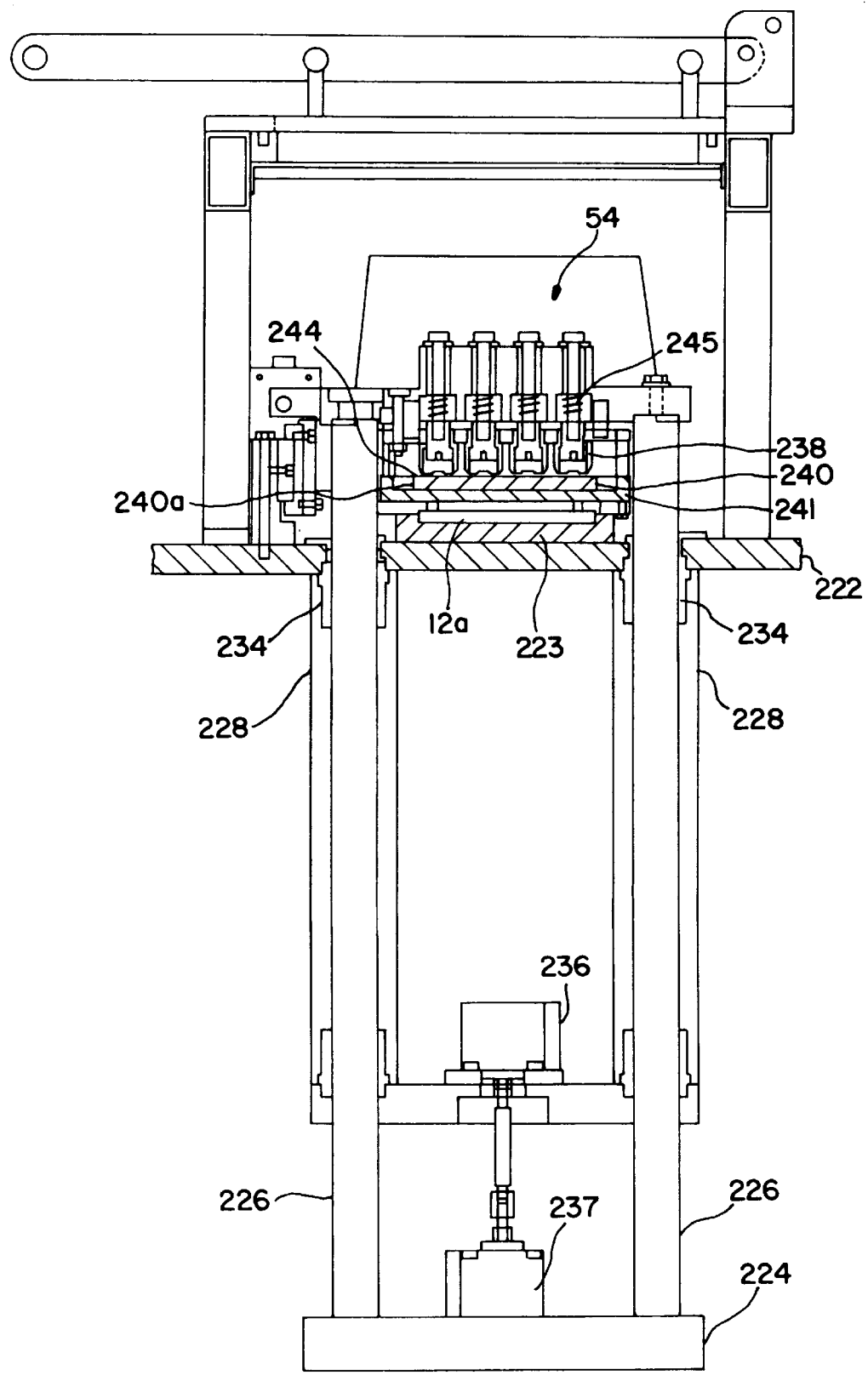
FIG. 12 is a partially cross-sectioned elevation view of a stamping station for the application of a surfactant to a stamping head and thereafter for the deposition of a film of the surfactant onto a surface portion of the front mold half.

As illustrated in FIG. 12, a surfactant is applied to the mold flange 18 by a stamping station 54 includes a frame structure 222 having a support member or base 224 on which there are positioned a plurality of spaced upright guide columns 226. These columns have slide members 228 thereon for supporting components for a stamping station 54 so as to be vertically displaceable along the guide members. The stamping station 54 is mounted for vertical reciprocation proximate the upper end of the columns through the intermediary of suitable guide bushings 234 and the slide members 228, and wherein the vertical displacement is implemented through suitable actuating or drive unit 237 which is not described in further detail herein, and which, if desired, may be operated from a suitable control and sensor unit 236 on base 224.

The stamping station 54 includes mounted thereon a plurality of stamps 238 each adapted to be moved in vertical reciprocatory movement in a coordinated manner in conjunction with the stamping station 54, wherein the number of stamps 238 is correlated with the number of front curves 18 located in the mold depressions 130(b) formed in the mold pallet 12(a). Each stamp 238 consists of a composition of about 90% urethane and 10% silicone in at least the portions thereof which are adapted to contact the flanges 18 of the front curves on the mold pallet 12(a).

Adapted to be positioned in spaced relationship below the lower end of each stamp 238 of the stamping station 53 when the latter is in a raised position, is a horizontally shiftable pad member 240. The pad member 240 is basically a cushion which is constituted of a suitable porous material, such as porous polyethylene having an average 10 micron pore size, and which is impregnated with a solution containing a surfactant, the latter of which may be present in a highly concentrated state. The lower surface of the stamping pad member 240 is supported on a base 240(a) consisting of a liquid-impervious material. The upper surface of the pad member 240 is covered by a filter 244, preferably of nylon, having a mesh size of 1.2 microns so as to act as a metering device and allow only relatively small quantity of surfactant to pass therethrough as the surfactant is wicked from the bottom of the pad member 240 to the top upon the pad member being pressingly contacted by the bottom ends of the stamping heads 238, as described hereinbelow.

The stamping pad member 240 is supported on a horizontally shiftable carriage structure 241 which is operable at a predetermined elevation below the lower ends of the stamps 238, so as to be horizontally movable into position below the stamps 238 between the upright guide columns 226 or, alternatively, moved outwardly thereof when not needed. The horizontal shifting motion may be imparted to the carriage 241 and, resultingly, to the pad member 240, by means of a suitable actuating cylinder which is operatively connected with the carriage 241.

The foregoing carriage 241 is located at an elevation or height above the mold pallet track 223, along which mold pallets 12(a) or 12(b) are adapted to be sequentially advanced into position below the stamping station 53 in order to enable the stamps 238 to apply a thin film or coating of surfactant to the surfaces 18(A) of the front curves positioned thereon before being transported further in connection with the forming of the contact lenses.

OPERATION OF THE SURFACTANT APPARATUS

In order to facilitate the deposition of a thin film layer of surfactant onto the surfaces 18 of the front curves on the mold pallet 12(a) which has been positioned below the stamping station 53, the stamping station is maintained in a fully raised position on guide columns 226. This is implemented by means of a lifting cylinder 237 acting on slide members 228 vertically movable along the guide columns 226. The extent of vertical movement may be controlled by a suitable control and sensor arrangement 236. The pad member 240 is interposed in spaced vertical relationship between a pallet 12(a) and the lower ends of the stamps 238 on the stamping station 53. The interposition of the pad member 240 is carried out by shifting the carriage 241 horizontally so as to locate the pad member 240 beneath the stamps 238. Thereafter, the stamping station 230 is actuated so as to cause the stamps 238 to be displaced downwardly into contact with the upper surface of the filter 244 on the pad member 240, whereby a small amount of surfactant is expelled upwardly through the nylon filter 244 to coat the lower downwardly facing surface of each stamp 238, forming a thin layer or coating of the surfactant thereon.

The surfactant with which the pad member 240 is impregnated may. be a solution with an almost 100% concentrated strength of surfactant dispersed therein so as to enable forming a layer thereof on the therewith contacting surfaces of the stamps 238. Preferably, the surfactant is constituted of Tween 80 (registered trademark); i.e. a Polysorbate 80. This is basically polyethylene oxide sorbitan mono-oleate or the like equivalent, and consists of an oleate ester of sorbitol and its anhydrides copolymerized with approximately 20 moles of ethylene oxide for each mole of sorbitol and sorbitol anhydrides.

In order to ensure that a uniform layer or very thin film of the surfactant is deposited on the surfaces 18 of each of the front curves which are located on the mold pallet 12(a), each stamp 238 is individually resiliently mounted through the provision of a suitable biasing spring 245, preferably such as encompassing coil springs which are supported in the stamping station 54, ensuring that notwithstanding manufacturing tolerances, a uniform pressure will be subsequently exerted by the stamps against all contacting flanges 18 on the front curves which are located on the mold pallet. Thereafter, upon the surfactant being wicked up through the pad, expelled through the nylon filter 244 and deposited on the lower surface of each stamp 238, the stamping station 54 and stamps 238 are raised vertically, and the stamping pad member 240 with its carriage 241 is moved horizontally out of the stamping station from its position between the guide columns 226, thereby opening the space between the stamps 238 and the therewith aligned front curves on mold pallet 12(a). Thereafter, the stamping station 54 is again shifted downwardly along the vertical guide columns 226 until the stamps 238 have their surfactant-wetted lower end surfaces contact the surfaces 18 on the front curves 10, thereby depositing a thin layer or film of the surfactant thereon, with such layer being at a uniform thickness on each respective front curve surface 18 due to the resilient biasing forces being exerted by each of the springs 245 acting on the individual stamps 238.

Thereafter, the stamping station 54 is again moved vertically upwardly along guide columns 226, and a subsequent molding pallet 12(b) mounting back curves 30 is advanced through the stamping station of the apparatus. This time period enables stamps 238 to be recoated with surfactant from the shifting stamp pad member 240.

The molding pallet 12(a) which has the front curve surface thereon already treated with the surfactant is advanced out of the stamping station so as to be mated with base curves 30. The process may then be repeated with the subsequently introduced front curves 10 on mold pallets 12(a) in the same continuous manner.

The foregoing structure enables the deposition of a thin and uniform layer or film of the surfactant onto specified surfaces 18 of the front curves 10 so as to enable easier subsequent separation of the base curves 30 therefrom and removal of the HEMA-based ring material with the back curve 30. This avoids the step of manually removing the remnants of the HEMA rings, excessed during the molding of the hydrophilic polymer contact lenses, and avoids contamination of the final package or the production line equipment that results from inadvertent error inherent in manual operations.

Figure 5:
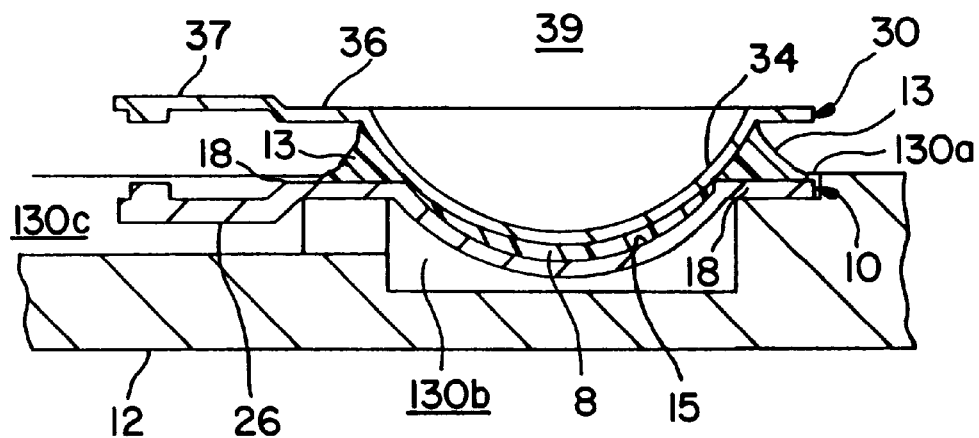
FIG. 5 is an enlarged cross-sectional view of a pair of assembled mold halves supported and registered in a pallet cavity.

As illustrated in FIG. 5, a complimentary pair of front and back 30 curve mold halves define the mold cavity and the shape of the final desired lens 8. After the dosing step in the filling apparatus 53, in which the front concave mold half 10 is substantially filled with a polymerization mixture 11, the concave front mold half 10 is covered with the back curve mold half 30 under a vacuum to ensure that no air bubbles are trapped between the mold halves. The back curve mold half is then brought to rest on the circumferential edge 14 of the concave front mold half to sever the incipient lens from the excess monomer, to ensure that the resultant lenses are properly aligned and without distortion, and to form a mold assembly 39 which includes both mold halves and the incipient lens 101. The provision of tabs 26 and 37 extending from respective sides of each front and back curve mold halves are preferably positioned one over the other as shown in FIG. 5 during the mold assembly, to facilitate handling thereof, and to facilitate the prying apart of the halves after the polymerization. The tabs may also be used to provide torric orientation of the lens, since the orientation of tab 26 on the front curve mold half is fixed by recess 130(c), while the tab 37 may be subsequently aligned to provide torric differentiation in the optical characteristics of the lens.

The excess monomer or monomer mixture displaced from the mold cavity 101 forms a HEMA ring 13, which preferentially adheres to the underside of flange 36 of back curve mold half 30 by reason of the surfactant coating on flange 18 of the front curve mold half 10.

MOLD ASSEMBLY APPARATUS

The operation of the assembly station of the present invention will be explained with reference to FIGS. 10(c), 10(d), 13, 14(a), 14(b) and 16 wherein FIG. 14(a) represents an external elevation view of the assembly module 55 and FIG. 14(b) represents a partially cross-sectioned view of the assembly module 55 that is sectioned along two separate axes from section line A–A' for the purposes of illustration.

Figure 13:
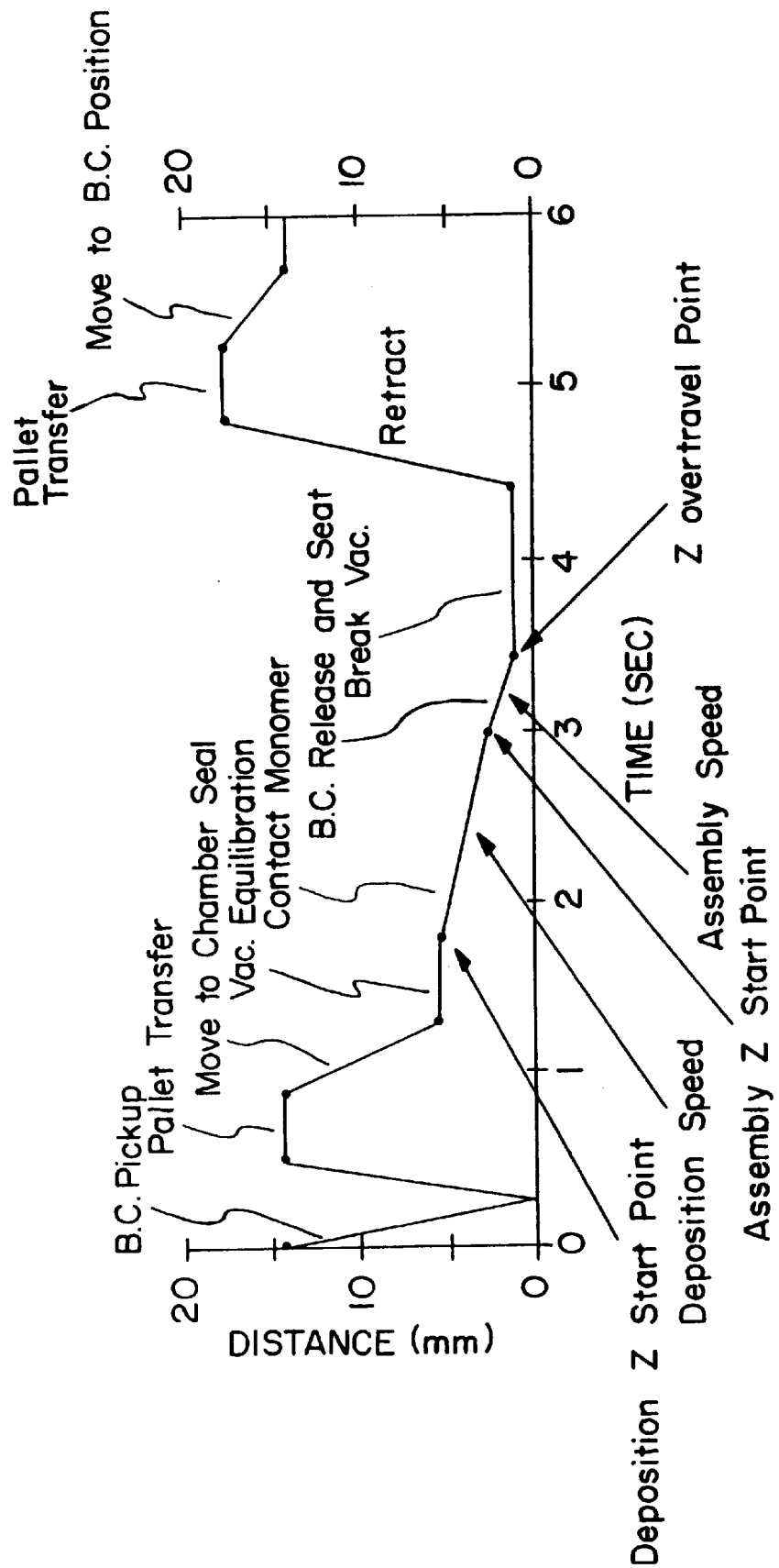
FIG. 13 is a diagrammatic time line illustration of the assembly step of the present invention.

The assembly of the mold halves is also described in the chart illustrated in FIG. 13 in which the position of a reciprocating assembly piston 271 is plotted as a function of time. As illustrated at the zero start point, the reciprocating piston 271 begins to descend for the back curve pick up, and reaches and secures the back curve 30 in approximately 0.25 seconds. The piston 271 is then reciprocated upwardly to its upper position 14 mm above pallet 12(b) in approximately 0.25 seconds. Then, the pallets are advanced wherein the back curve mold half pallet 126 is removed and the front curve mold half pallet 12(a) is inserted, which transfer takes approximately 0.5 seconds. While the pallets are being transferred, a vacuum chamber begins its descent towards the front curve mold pallet 12(a) and contacts the mold pallet to establish a seal between the chamber and the pallet as will be hereinafter more fully described with respect to FIG. 14(b). A seal is established at approximately 1.25 seconds after the zero point, and the nitrogen in the chamber is then evacuated until a vacuum equilibrium is reached at approximately 1.75 seconds.

It should be noted that the reciprocating piston 271 is carried within the vacuum chamber so that as the vacuum chamber descends and seals to the pallet, the reciprocating piston 271 and the back curve mold half 30 have been partially lowered to approximately 5 mm above the front curve mold half. At 1.75 seconds, the reciprocating piston 271 begins independent downward travel and contacts the pool of monomer 11 at approximately 2.5 seconds after the zero point. Downward travel of the reciprocating piston continues and at approximately 3 seconds, the back curve mold half is firmly seated on the parting edge 14 of the front curve mold half indicating formal assembly. Shortly thereafter, the vacuum in vacuum passageway 294 is broken, but the reciprocating piston 271 maintains a downward force on the back curve mold half while the remainder of the assembly module continues a downward travel to thereby establish an independent floating clamping of the back curve mold half 30 against the porting edge 14 of front curve mold half 10. As will be hereinafter explained, this clamping or "over travel" step is optional. At approximately 3.4 seconds, the vacuum is broken in the vacuum chamber surrounding the mold assemblies and at approximately 4.4 seconds the reciprocating piston 271, the vacuum chamber and the assembly module 55 begin to retract. At 4.75 seconds, the pallet 12(a) containing the assembled mold halves is transferred out of the assembly station, and a new pallet 12(b)

containing the back curve mold halves is inserted under the assembly module 55. At approximately 5 seconds, the reciprocating piston 271 is then moved to its back curve pick up position, and at 6 seconds, the assembly beings anew at the zero start point.

The assembly station 55 includes 4 reciprocal pistons 271, two of which are illustrated in the left section of A–A' of FIG. 14(b) with hack curves attached thereto and two of which are partially visible in the right hand section of A–A' of FIG. 14(b) without back curves. It should be understood that reciprocating pistons are used for the pallets having 8 sets of front and back curve mold halves. The reciprocating pistons 271 are mounted for reciprocation within the vacuum housing 272 and are both carried by and may float within the primary housing 273. Each of the three members 271, 272 and 273 reciprocate at various times, both with respect to each other and with respect to the pallet 12(b) and the pallet 12(a) containing front mold curves.

With reference, to FIGS. 14(b) and 16, the vacuum manifold housing 272 and the primary housing 273 are mounted for reciprocal movement on cylinders or tubes 274,275 and reciprocate with respect to stationary frame member 276 in response to servo motor 277 which raises and lowers a reciprocating support platform 278. Drive motor 277 is fixably attached to frame member 276 by means of guide tubes 279 and 280 and cross-member 281. Thus, the stationary frame member 276, guide tubes 279,280 and cross-member 281 provide a box frame that is stationary with respect to the reciprocating members of the apparatus. Pallet guide rails 282 are also provided for each pallet 12(a),(b) entering the assembly stations which are advanced by means of the material handling pusher 157 previously described and illustrated with respect to FIG. 8(b). Guide rails 282 are also fixed with respect to the stationary fixed platform 276.

As illustrated in FIG. 14(b), the vacuum manifold housing 272 and the primary housing 273 reciprocate with respect to each other with the vacuum manifold housing 272 being biased downwardly by a pair of spring members 283,284 positioned on opposite sides of the respective housings. The vacuum manifold housing 272 is secured to the primary housing 273 by virtue of a pair of bolts 285,286, one of which is illustrated in cross-section in FIG. 14(b) at 285, which are free to reciprocate upwardly into recesses such as recess 287 formed in the primary housing. Likewise, the reciprocating pistons 271 and reciprocating manifold members 288,289 also provide reciprocating guides and support between the two housing members 272,273.

A pair of bore scope housings 290 and 291 provide access for a bore scope 200 and an optic probe 201 which may be inserted into the assembly cavity for viewing or quality control purposes. When not in use, the bore hole housings 290,291 are closed by a blind 202 in order to allow a vacuum to be drawn within the assembly housing.

In operation, a pallet 12(b) containing mold half back curves is advanced under the reciprocating pistons 271 as illustrated in FIG. 10(c). When the pallet 12(b) is in position, the assembly module 55 is reciprocated downwardly by pneumatic drive motor 277 and cross-member 278 and the reciprocating tubes 274,275 to draw both the vacuum manifold housing and the primary housing downwardly. The vacuum manifold housing 272 is biased in its downward position by means of springs 283,284 and the individual reciprocating pistons 271 are biased downwardly by virtue of their mounting within the vacuum manifold housing 272, and by virtue of air pressure maintained within the pneumatic cylinder 293 mounted in upper portion of the primary housing 273. Within approximately 0.25 seconds, the reciprocating pistons 271 have engaged the back curve mold halves 30 on pallet 12(b) and a vacuum is drawn through vacuum manifold in reciprocating piston 271, which has radial bores 294 (FIG. 10(c)) which communicate with an annular chamber 295 formed in the vacuum manifold housing 272, two of which are illustrated in FIGS. 14(b) and 16. Each of these annular chamber passageways 295 is interconnected to each other and a common plenum (not shown) that extends across all 4 annular manifolds 295 on one side of the vacuum manifold housing 272.

A pair of reciprocating vacuum manifolds 288,289 connect the vacuum manifold 272 with the primary manifold 273, with one of the tubes 288, illustrated in cross-section in FIG. 14(b). The vacuum manifold 288 reciprocates in bore 298, while vacuum manifold 289 reciprocates in a similar bore (not shown). These reciprocating manifolds are essentially identical, except that they supply vacuum at two different pressures to two different parts of the assembly module.

As the assembly module reaches its lower most point of travel, each of the back curves 30 is removed from the back curve mold pallet 12(b) by the vacuum drawn in the reciprocating pistons 271. The entire assembly module 55 is then reciprocated upwards in approximately 0.25 seconds to enable transport of the empty pallet 12(b) along conveyor 32(b) out of the assembly module and the insertion of a new pallet 12(a) that is filled with front curve mold halves, each one of which has been dosed with a monomer at the filling module 53. Pallet 12(a) is advanced into position as illustrated in FIG. 10(d) but is registered in precise position by means of tapered registration pins 306,307 which cooperate with the blind registration holes 129(a),129(b) formed on pallets 12, as illustrated in FIG. 7(a). The taper on pin 306 is sufficient to register the pallet within ±0.1 mm for the purposes of precision assembly of the mold halves.

The assembly cycle begins by reciprocating both the vacuum manifold housing 272 and the primary housing 273 downwardly until a perimeter seal 310 contacts the outer perimeter 140 of the pallet 12(a). As contact is made with the perimeter seal, a vacuum switch is actuated by means of a proximity switch adjacent to reciprocating cross-head 278 which actuates a second vacuum source which draws a vacuum through vacuum tube 311 and the interior of reciprocating drive tube 274 to evacuate the chamber formed between the vacuum manifold housing 272 and the platform 276.

It should be noted that the vacuum drawn in the two reciprocating drive tubes 274,275 is slightly different, with the vacuum drawn in the tube 275 being slightly greater than that drawn in tube 274 in order to insure that the back, curves are retained on the reciprocating pistons 271 prior to their deposition on the monomer and the front curve mold half. In the preferred embodiment, the pressure drawn in the vacuum manifold around the pallet 12(a) is on the range of 5 to 7 millibars while the vacuum drawn within the reciprocating pistons 271 is on the order of 3 to 5 millibars.

After the vacuum has been established in the vacuum manifold housing 272, the vacuum manifold housing ceases to reciprocate and remains stationary with respect to the pallet 12(a). However, the upper or primary housing 273 continues to reciprocate downwardly enabling the back curves to contact the monomer and slowly displace it outwardly to fill the mold cavity as the two mold halves are assembled. The vacuum maintained around the housing enables the assembly of the two curves in a more rapid and expeditious manner than if assembled under ambient N$_2$ pressure. When assembled under vacuum, the deposition speed may reach as high as 5 mm per second, whereas without vacuum, any speed greater than 1 mm per second may result in undue agitation of the monomer and the creation of bubbles which affect and impair the quality of the resultant lens. Thus, an assembly step which requires 6 to 9 seconds in atmospheric pressure can be accomplished in 1 to 2 seconds. Further, if a vacuum is not drawn, it is possible for nitrogen to be trapped between the mold halves or between the monomer and the back curve thereby creating another bubble or puddle which will result in rejection of that lens.

Independent travel of the two manifolds 272,273 is provided since the vacuum manifold housing 272 no longer reciprocates downwardly after it is seated on pallet 12(a). However, the upper primary housing continues to reciprocate downwardly depositing the back curve mold half, and continuing on to thereby completely compress springs 283 and 284. As these spring members are compressed, the reciprocating pistons 271 float between pneumatic cylinders 293 which have been pressurized to a predetermined pressure and the back curve mold half 30. Thus, the final clamping pressure on the back curve mold member is determined by the air pressure maintained in pneumatic cylinders 293, and not by spring members 283,284, or the pressure generated by drive motor 277. This enables independent reciprocal movement or floating movement of each of the reciprocal pistons 271, while enabling all of the pistons to be pressurized to a common predetermined value. Thus, misalignment of a single mold part will not destroy the entire batch of mold assemblies on pallet 12(a).

The clamping pressure firmly seats the back curve mold half 30 on the front curve mold half and seats the convex portion 33(a) of the mold 30 against the parting edge 14 formed on the front curve mold half 10 thereby severing the monomer in the lens blank 8 from the monomer in the HEMA ring 13. After the mold halves have been seated, the vacuum in each of the reciprocating pistons 271 is first broken by opening a valve in vacuum line in 304. Shortly thereafter, and after an optional predetermined clamping period and a predetermined clamping pressure, the vacuum between the vacuum manifold housing and the pallet 12(a) is broken by opening a valve in vacuum line 311. Typically the period is 0.5 to 3 seconds, but preferably is 1.5 seconds. The clamping pressure may range from 0.5 to 2 Kg/per lens but preferably is 1 Kg/per lens. Thereafter, drive motor 277 is actuated and the entire assembly module 59 is raised upwardly and reset for a new back curve pickup and a new cycle of operation. In the event the optional clamping movement is not provided, the resilient biased pistons 271 may be fixably mounted in vacuum manifold 272 and reciprocates downwardly to seat the back curve well into the monomer, but 0.1–0.2 mm from sealing engagement with the parting ring 14. In this embodiment the optional clamping step may also be provided in the precure step. When seated in this manner under vacuum conditions, with a completely filled mold cavity sealing the mold halves together, atmospheric pressure will "clamp" the mold halves together at 14.7 psi when the vacuum in the vacuum manifold 72 is broken.

As illustrated in FIG. 8(b), after exiting the mold assembly module 55 of apparatus 50, the pallets 12(b) that had transported the back curve lens mold portions are empty and are recirculated back to the supply conveyor 29 to pick-up a new set of back curve lens molds from the injection mold 102(a). To accomplish this, ram assembly having a reciprocating ram head 156 is enabled to push the empty pallet 12(b) from the exit of module 55 in the direction indicated by arrow "K" where the back curve supply conveyor 29 picks up the pallet 12(b) for recirculation at the back curve lens mold pick up point. Additionally, as shown in FIG. 8(b), a second reciprocating ram 155' and ram head 156' is provided to push, in the direction indicated by arrow "L", a pallet 12(a) containing front curve lens molds back to the front curve supply conveyor 27. This is done only if the line quality control system indicates that a pallet 12(a) contains a lens mold assembly having mold halves that are misaligned, that are not seated correctly in a pallet recess or are out of specification in some manner. Detection of errors may occur at a variety of locations in the production line, including or at the filling and mold assembly stations and the pallets are flagged by control means (not shown) so they may be rejected by ram 155' for recirculation. The contact lens production line facility includes a suction vent apparatus for removing the mold assemblies from the rejected pallet 12(a) while being recirculated back to or while on front curve supply conveyor 27.

As shown in FIG. 8(b), the individual pallets 12(a) containing the eight contact lens mold assemblies leave the filling/mold assembly apparatus 50 on conveyor 32(c) at a rate of 12 mm/sec before entering the precure assembly 60 where the front and back curve mold halves are then clamped together in the precure step.

As will be explained below, while the mold halves are clamped under pressure, the polymerization mixture is then exposed to actinic light, preferably from a UV lamp. Typically the mold halves are clamped for approximately 40 seconds with 30 seconds of actinic radiation. At the completion of the precure step, the polymerization mixture has formed a partially polymerized gel, with polymerization initiated throughout the mixture. Following the precure step, the monomer/solvent mixture is then cured in the UV oven apparatus 75 whereby polymerization is completed in the monomer(s). This irradiation with actinic visible or ultraviolet radiation produces a polymer/solvent mixture in the shape of the final desired hydrogel lens.

In the preferred embodiment of the present invention, two separate devices are illustrated for transport of the pallets 12(a) within the precure apparatus 60.

Figure 19:
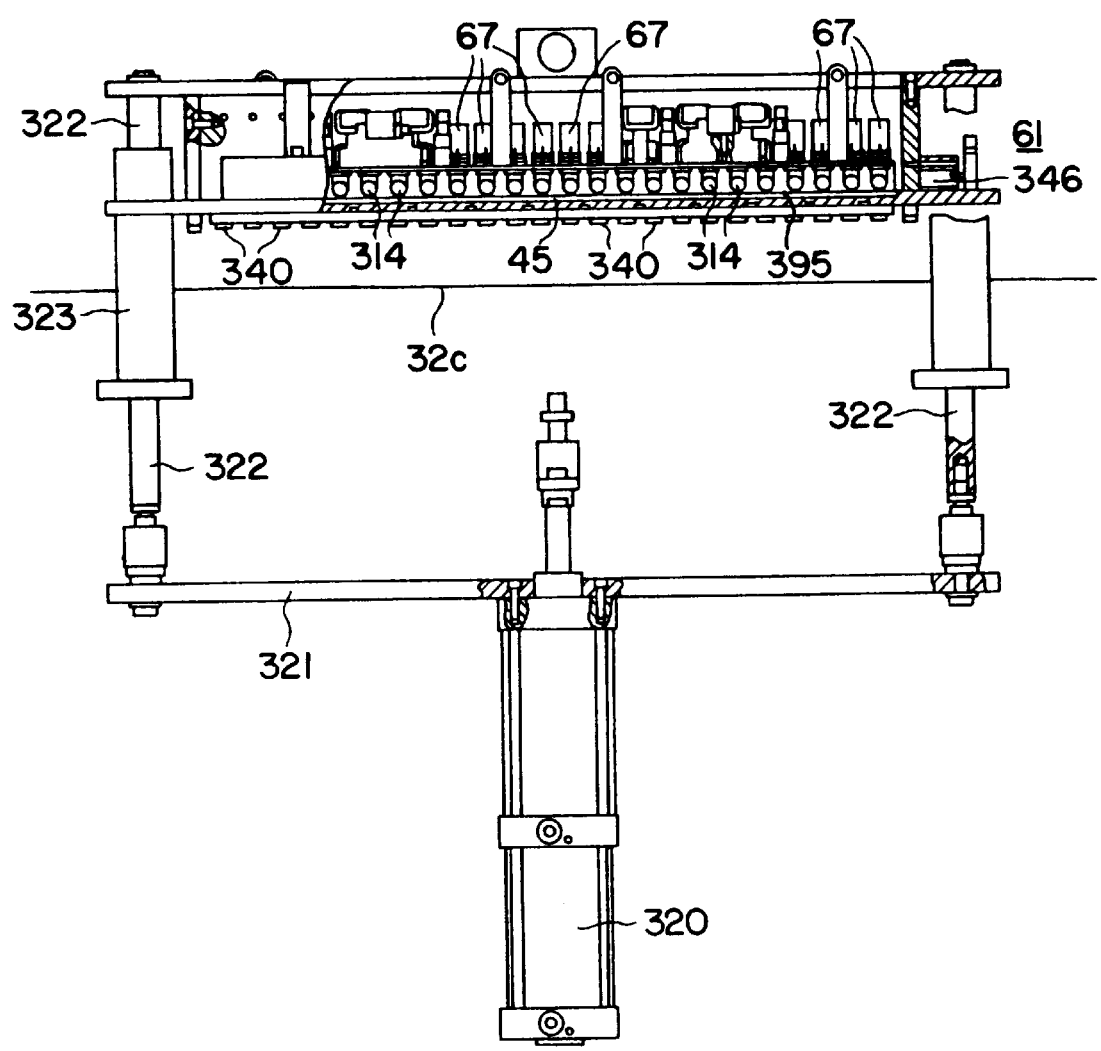
FIG. 19 is a partially cross-sectioned elevation view of a reciprocating portion of one embodiment of the present invention suitable for precuring a polymerizable monomer or monomer mixture to form a contact lens.
Figure 20:
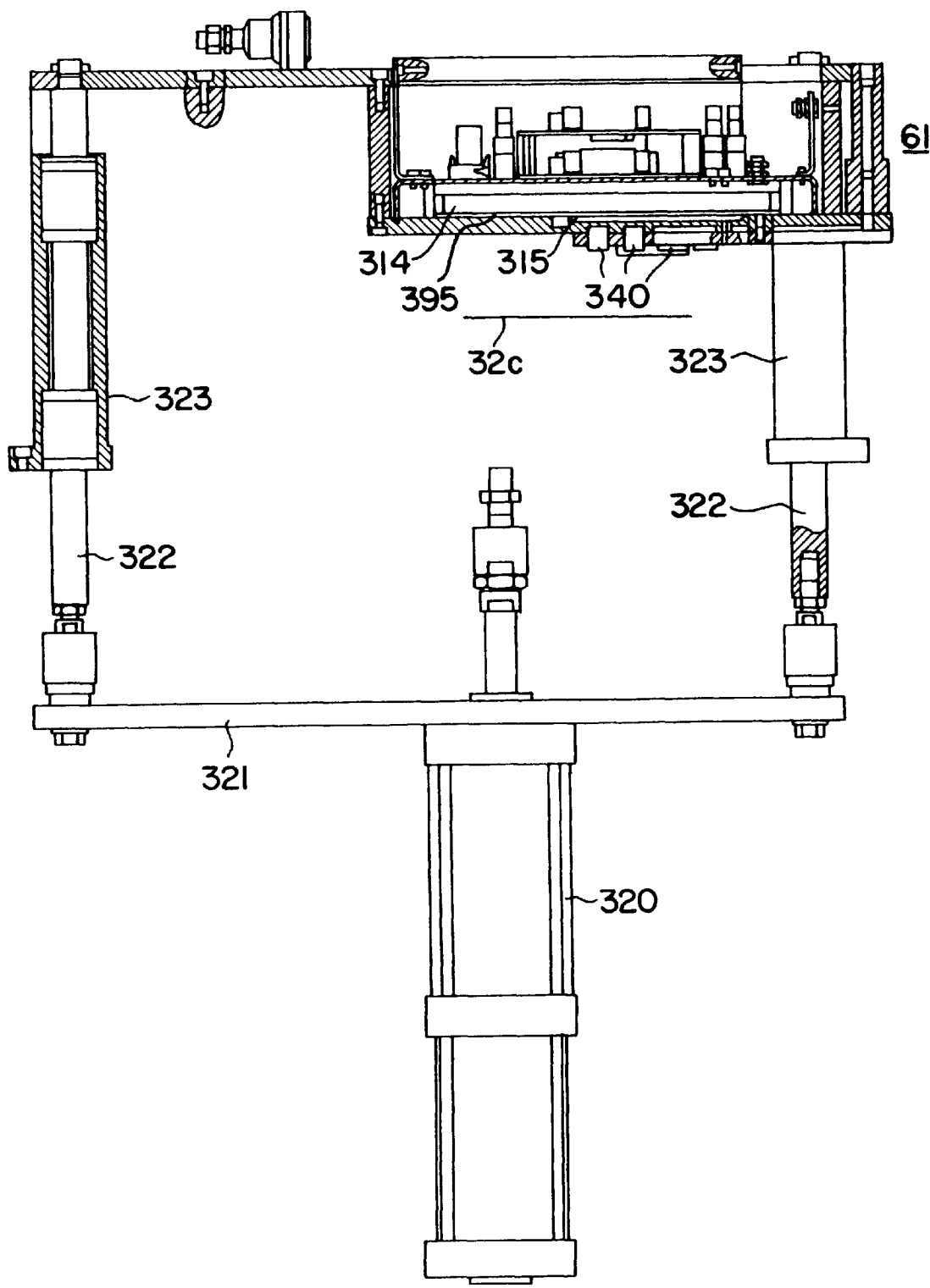
FIG. 20 is an end elevational view of the apparatus illustrated in FIG. 19.
Figure 21:
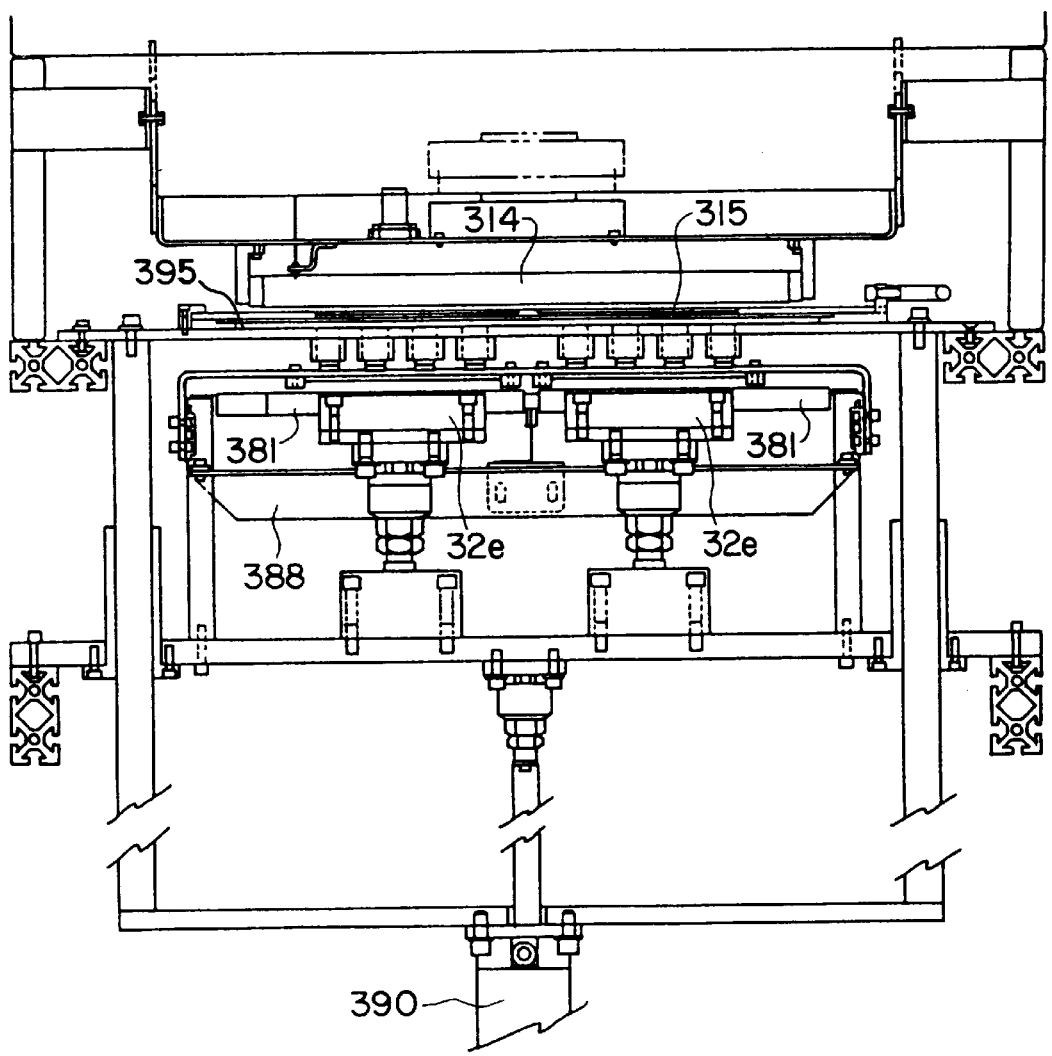
FIG. 21 is an elevational end view of a second embodiment of the present invention used to precure a polymerizable monomer or monomer mixture to form a soft contact lens.
Figure 22:
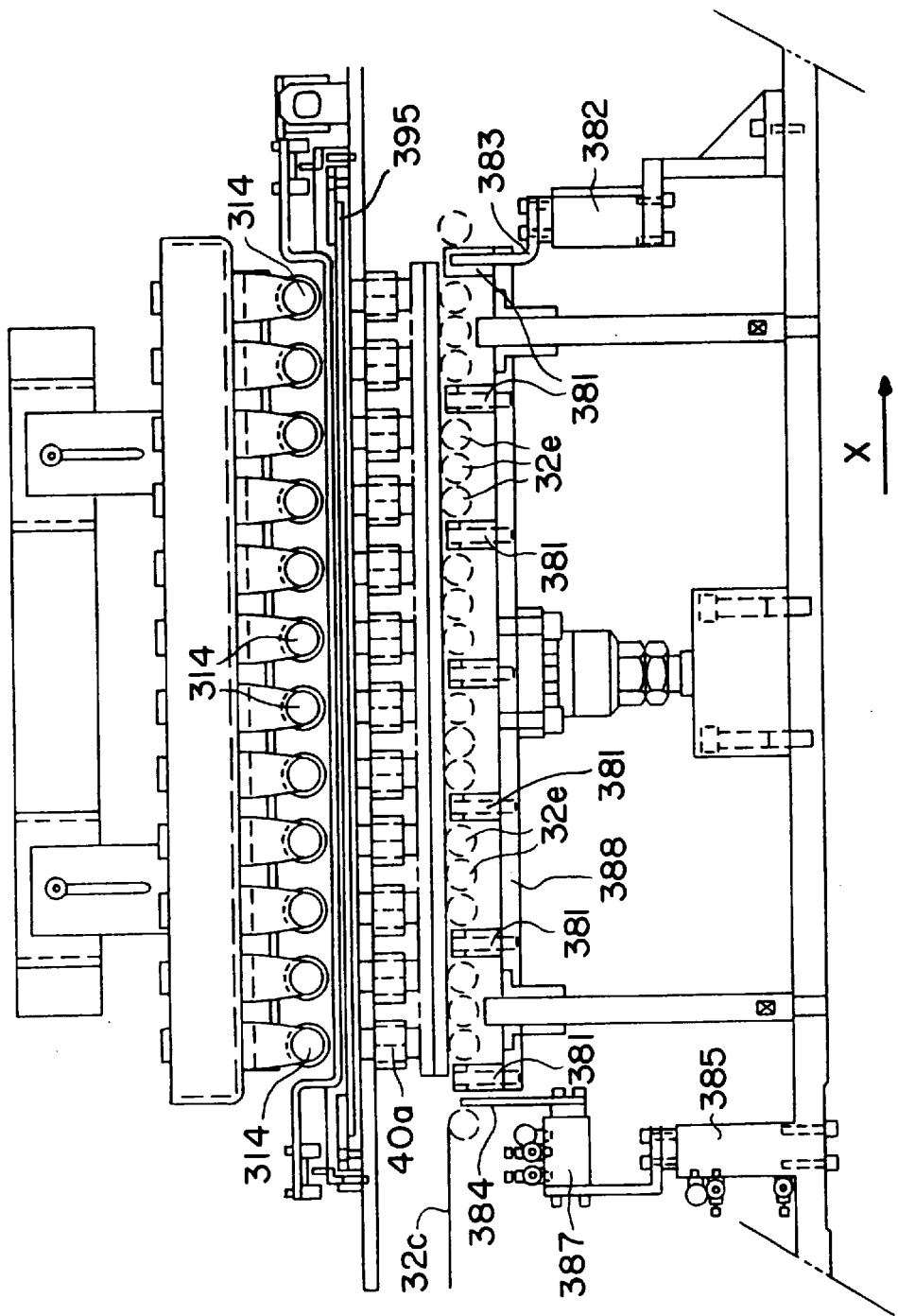
FIG. 22 is an elevational side view of the apparatus illustrated in FIG. 21.

A first transport mechanism is described with respect to FIG. 8(b), 17, 19 and 20 while a completely different mechanism is illustrated in FIGS. 21 and 22. The method employed by each is essentially the same, in terms of the clamping action and actinic exposure and differs only in the apparatus used to effect the handling of the pallets.

As illustrated in FIG. 8(b), the conveyor 32(c) delivers pallets 12(a) containing a plurality of molds to an accumulating section generally indicated as 168 which assembles a plurality of pallets for a batch operation at the precure assembly 60. Accumulator section 168 includes a holding mechanism 166 that is timed by a control means (not shown) to halt a lead pallet in place on the conveyor 32(c) and enable a predetermined number of subsequent pallets to assemble behind the halted lead pallet to enable batch processing at the precure apparatus. In the preferred embodiment, twelve pallets are accumulated enabling up to ninety-six (96) mold assemblies to be processed at the precure apparatus 60 in a batch mode for an extended period of time of 30 to 60 seconds while continuously receiving new pallets from the production line at the rate of 1 every 6 to 12 seconds.

As shown in FIG. 8(b), lead pallet 12(a') is halted behind holding mechanism 166 while the rest of the pallets accumulate therebehind. Up to twelve pallets are being processed in the mold clamping and precure assembly 60 while the new set of pallets are being accumulated in accumulating section 166, thus, assuring a continuous flow of pallets into the precure assembly.

After accumulating up to twelve pallets in accumulating section 168, holding mechanism 166 is retracted and the batch pusher arm 173 is extended to align the twelve pallets on the conveyor 32(c) conveniently within arms 171(a),171(b). It is understood that a suitable track mechanism 175 and driving means (not shown) is provided for enabling bi-directional and orthogonal horizontal movement of batch pusher arm 173. Once the 12 pallets are aligned between arms 171(a),(b) of batch pusher arm 173, the pusher arm is driven in the horizontal direction indicated by arrow "M" as shown in FIG. 8(b). The previous set of twelve pallets that had been undergoing mold clamping and precure are simultaneously pushed out of the precure assembly 60 by the arm 171(b) of batch pusher 173 as the new sets of pallets are brought in by the batch pusher 173. In the partially exposed view of the UV polymerization oven in FIG. 8(b), six (6) of the previous set of pallets have been pushed onto a conveyor 31(b) in the curing apparatus 75 thus, dividing the set into two batches of six pallets each for UV polymerization as described hereinbelow.

As shown in FIG. 8(b) after a new batch of twelve pallets are brought into precure apparatus 60 for mold clamping and precure, the batch pusher arm 171(b) is retracted back in the direction of arrow "N" and the batch ram assembly 176 of batch switching apparatus 45 is simultaneously extended to push the other six pallets of the previous batch to an entry area 177 where the six pallets will be pushed on to a second conveyor 31(a) for transport into the UV cycling polymerization apparatus 75.

FIG. 17 illustrates a side elevation view of one embodiment of the precure apparatus 60. As illustrated in FIG. 17, the precure apparatus receives a plurality of pallets having a plurality of contact lens molds therein, from the infeed conveyor 32(c). The infeed conveyor 32(c) delivers the pallets 12(a) and mold assemblies 39 to the precure station in an optional low oxygen environment, which environment may be accomplished by pressurizing an enclosure 326 with nitrogen gas. Prior to polymerization, the monomer is susceptible to oxidation from oxygen which results in degradation of the resultant lens.

The precure assembly 61 of the precure apparatus 60 is partially visible in the breakaway portion of FIG. 17 and more fully illustrated in FIGS. 19 and 20. As explained in further detail in co-pending patent application U.S. Ser. No. 08/257,792, refiled as Ser. No. 08/968,670, now U.S. Pat. No. 5,914,074, entitled "Mold Clamping and Precure of a Polymerizable-Hydrogel" assigned to the same assignee as the instant invention, the assembly is raised and lowered into engagement with pallets containing contact lens molds by virtue of a pneumatic cylinder 320 which raises and lowers an intermediate support beam 321 and reciprocating shaft members 322 which are journaled for reciprocating support in member 323. After the precure operation, the pallets are discharged through a nitrogen ventilation and lock mechanism 324 for subsequent cure by heat and cycled actinic radiation in the UV polymerization apparatus 75 as will be explained in further detail below.

FIGS. 18(a) and 18(b) are diagrammatic representations of alternate embodiments of the precure apparatus 60. Each embodiment of assembly 61 includes multiple vertical reciprocal movements for an optional clamping step, a first one of which is illustrated in FIG. 18(a) in response to movement from air cylinder 320 and reciprocating beam 321. As the precure apparatus is lowered along the axis illustrated by arrow "A", a plurality of annular clamping means 340 will engage the upper annular flange 36 of each of the mold assemblies carried within pallets 12(a). The plurality of annular clamping means 340 are mounted on and travel with a reciprocating platform 61 of the apparatus, and are resiliently mounted therein for a second parallel reciprocal movement along the directions of arrow "B" illustrated in FIG. 18(a).

In the practice of the invention, the clamping force may be generated by atmospheric pressure, on the outside of mold halves assembled under vacuum, by an "over travel" clamping apparatus as previously described with respect to assembly module 55, by the optional clamping apparatus in the precure station 60, or by all of the foregoing, in combination.

As illustrated in FIG. 18(a), the optional clamping means 340 are biased within frame 352 by springs 312 (illustrated diagrammatically) which may be an air spring 312(a) (FIG. 18(a)) or a helical spring 312(b) (FIG. 18(b)) or may be generated by the physical mass of the clamping member. As the apparatus is lowered, the clamping means 340 will engage and clamp the first and second mold halves together with a force determined by the spring means 312. When air springs are used, the force will be determined by the amount of air pressure provided to the air chamber 312(a) by air pressure means 72. While clamping means 340 have been illustrated as two annular members in FIGS. 18(a) and 18(b) for illustrative purposes, it is understood that in the embodiment illustrated in FIGS. 17, 19, 20, 21 and 22 there are 96 individual annular clamping means, with an individual clamping means for each of the mold assemblies 39.

Positioned above the clamping means are a plurality of actinic light sources 314 which may be UV lamps. A pyrex glass plate 395 separates the precure area from the actinic light sources 314. This glass plate enables cooling of the actinic light sources 314, while maintaining the mold assemblies at a temperature ranging from ambient to 50° C. It also protects the actinic light sources 314 from emissions from the monomers. After the clamping means has engaged the mold halves to clamp them together, a shutter mechanism 315 is opened by an air cylinder to enable the actinic light source 314 to initiate polymerization of the polymerizable composition in each of the mold assemblies 39. Shutter 315 has a plurality of openings 313 defined therein and is reciprocal along the X axis (indicated by arrow "C" in FIG. 18(a)) in order to open and close exposure passage ways 347. The embodiment of FIG. 18(b) is essentially similar to the embodiment of 18(a) with respect to the location of light source 314 and shutter 315, and the way they expose the mold assemblies to actinic radiation.

The operation of the precure apparatus 69 is set by a control circuit, indicated at 310, which controls the duration of the clamping period by the length of time air cylinder 320(a) is activated to its reciprocal down position. The control circuit also controls the amount of radiation received by the molds controlling the duration of the exposure period through operation of shutter 315 and the air cylinder 346. The intensity may also be manually adjusted by raising or lowering the lamps 314 with respect to mold assemblies 39.

The amount of force applied by clamping means 340 may be varied from approximately 0.5 Kgf to 2.0 Kgf per lens or mold assembly 39, by pneumatic controller 372, and is applied to keep the flange 36 of the back curve mold half parallel to the flange 18 of the front curve mold half for the duration of the exposure. The clamping weight is applied for 10 to 60 seconds, but typically for a period of 40 seconds. After approximately 10 seconds of weight, actinic radiation from UV lamps 314 is applied to the assembled mola and the polymerizable monomer or monomer mixture. Typically, the intensity of the UV light source is 2–4 mW/cm$^2$, and this intensity of light is applied for 10 to 50 seconds, but in the preferred embodiment, is applied for 30 seconds. It should also be understood, that in a batch mode, the cure could proceed to completion, to eliminate the cure ovens 75. It is understood that different intensities and exposure times could be used, including pulsed and cycled high intensity UV on the order of 10 to 150 mW/cm$^2$ with exposure times running from 5 to 60 seconds.

At the end of the radiation period, the shutter 315 is closed by reciprocating it to the right as illustrated in FIG. 18(*a*) and the weight is removed by energizing cylinder 320 to lift the precure assembly 61 upwardly by means of push rods 322. As the assembly 61 is lifted, the clamping means 340 will be lifted clear of the molds and pallets to enable the batch pusher arm 173 transport them out of the precure means as described above to conveyors 31(*a*),(*b*) for transport through the cure ovens. During the precure time, the temperature in the system may be varied from ambient to 50° C.

At the conclusion of the precure process, the monomer has gone through initiation and some degree of polymerization. The resultant lens is in a gel state with some areas of the lens that have the least thickness, i.e., the edge, having a higher degree of polymerization than the body. The clamping and precure of the edge, under pressure, results in a cleaner and more evenly defined edge for the final lens product.

FIGS. 17, 18(*a*) and 21, 22 depicts a second embodiment for the batch handling of pallets 12(*a*) at the precure station. As described above with respect to FIGS. 17, 18(*a*) and 19, 20, the first embodiment reciprocated the UV lamps and clamping members into and out of engagement with the mold assemblies 39 and pallets 12(*a*) carried by conveyor means 32(*c*). In the embodiment illustrated in FIGS. 18(*b*) and 21, 22, the UV lamps are stationary, and the pallets 12(*a*) are lifted from a roller conveyor 32(*e*) into engagement with the clamping means for the precure period. Additionally, in the first embodiment, the conveyor system splits the line into two lines 31(*a*),(*b*) following precure, while in the following precure embodiment, two separate lines have already been formed.

The clamping means utilized by the embodiment illustrated in FIGS. 18(*b*) and 21, 22 utilizes the clamping means 340 previously described with respect to FIG. 18(*b*). In this second embodiment, a plurality of clamping means 340 are mounted above a roller conveyor 32(*e*) illustrated in side view in FIG. 18(*a*) by rollers 32(*e*). A plurality of lifting standards 381 are positioned between groups of rollers 32(*e*) on centers approximate the width of the pallets 12(*a*). In FIG. 22, a first row of pallets 12(*a*) is depicted resting on rollers 32(*e*) with adjoining edges of each of the pallets aligned along the top of the lifting standards 381.

The pallets 12(*a*) are aligned in position by means of stop means 383 which is lifted by air cylinder 382 during the loading of the precure apparatus. During loading of the device, the stop means 383 is reciprocated upwardly, and the requisite number of pallets 12(*a*) are advanced into the precure apparatus. When 6 pallets in each row have been advanced, a second stop means 384 is lifted by air cylinder 385 to define a limit on X axis travel as illustrated in FIG. 22. A separate air cylinder 387 is used in cooperation with stop means 384 to align the adjoining edges of the pallets 12(*a*) above the centers of the lifting standards 381. After the pallets have been aligned, the lifting standards 381 are reciprocated upwardly by means of intermediate support frame 388 and a pneumatic motor generally indicated as 390.

The pallets arc reciprocated upwardly to the position illustrated at 12(a') in FIG. 18(*a*), in which position they engage the clamping member 340 as previously described. Each of the clamping members 340 also include a separate independent and resilient spring 312(*b*), as described in aforementioned co-pending patent application Ser. No. 08/257,792, refiled as Ser. No. 08/968,670, entitled "Mold Clamping and Precure of a Polymerizable Hydrogel", now U.S. Pat. No. 5,914,074, for driving clamping member 340 and the upper mold half 30 (back curve) against the lower mold half 10 (front curve) during the precure period.

After the pallets and mold halves have been raised by air cylinder 390 and the first and second mold halves clamped together by means of clamping means 340, a reciprocating shutter 315(*a*) is shifted as illustrated in FIG. 18(*a*) to align a plurality of openings therein with the central openings formed in the clamping means 340 and thereby enable exposure of the monomer in the mold halves by means of actinic light sources 314 as described generally above with respect to FIG. 18(*a*). A pyrex glass plate 395 separates the actinic light sources from the precure area. The clamping period and the amount of exposure to radiation are controlled by a control means in the manner previously described.

Following the precure of the monomer in mold assembly 39, the pallets 12(*a*) are reciprocated downwardly to the roller conveyor illustrated in FIG. 17 as 32(*e*) and advanced by incoming pallets 174 to subsequent conveyors 31(*a*),(*b*). The individual pallets 12(*a*) containing the eight contact lens mold assemblies then enter the UV-cure and polymerization assembly 75 on two tracks 31(*a*),31(*b*) as shown in FIG. 2. In the UV-polymerization assembly 75, the pallets are conveyed at a rate of approximately 5.5 mm/sec.

LENS CURE

A preferred apparatus for carrying out the present invention, as illustrated in FIGS. 8(*c*) and 23, includes a pair of conveyor means 31(*a*),31(*b*) for moving pallets 12(*a*) containing the mold assemblies 39 in the direction of the arrow. Preferably, conveyor means 31(*a*),31(*b*) includes belts on which the carrier 12(*a*) carrying the mold assembly 39 (or mold assemblies) is carried. A convention control means (not depicted) such as a variable speed motor is connected to conveyors 31(*a*),31(*b*) to control the rate at which the conveyor means mover carrier 12(*a*) through the polymerization zone.

Reference numeral 330 denotes generally a housing for a source which emits ultraviolet radiation as described herein. The housing 330 is disposed over both conveyor means 31(*a*),31(*b*) so as to span the path of both conveyors leaving a space through which the conveyor carries carrier 12 and mold assembly 39 under the housing. Housing 330 can comprise one unitary section or can be composed of several discrete sections arrayed side by side, as shown as units 331 and 332 in FIG. 8(*c*).

Figure 23:
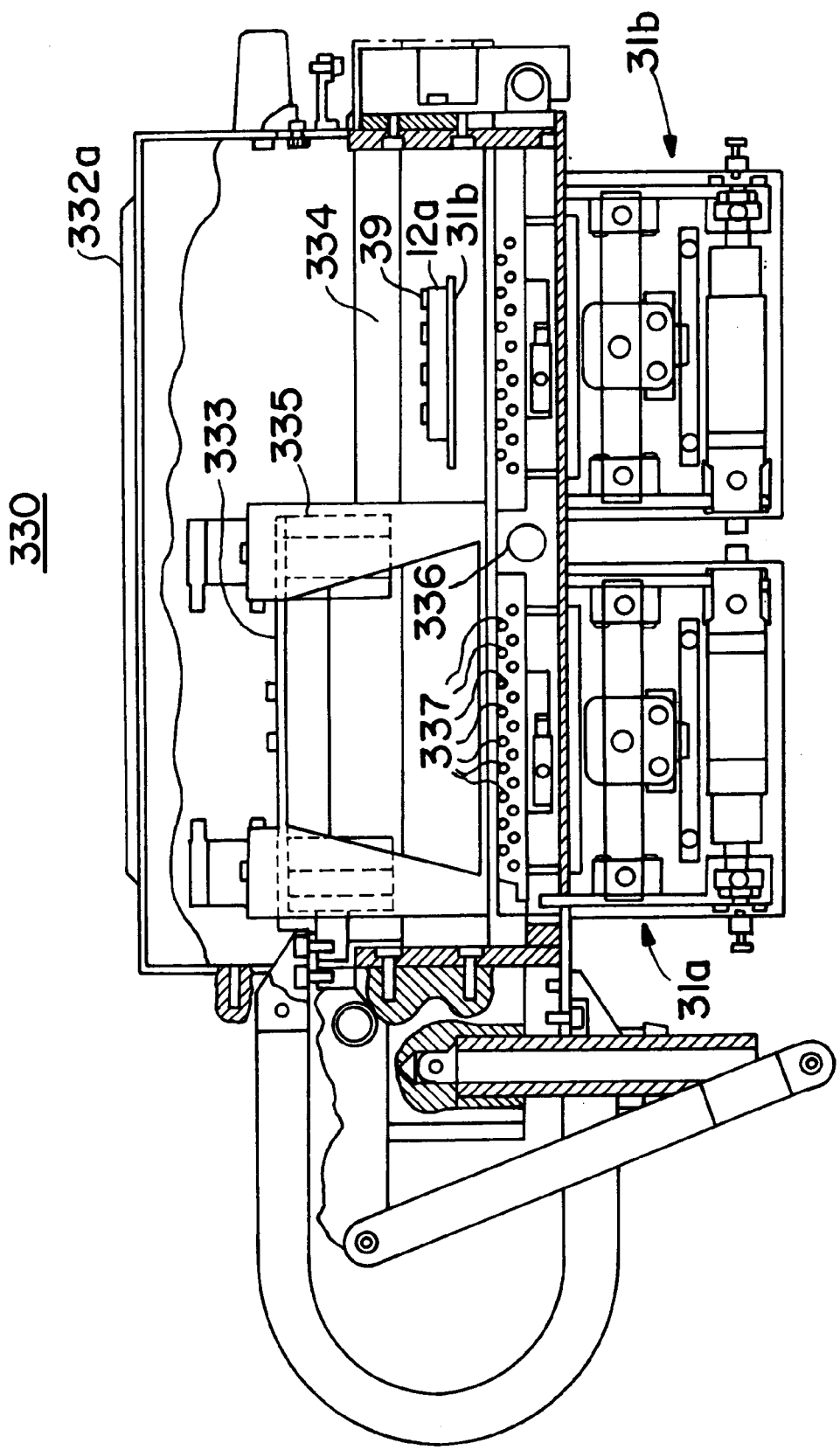
FIG. 23 is a partially cross-sectioned view of one of the polymerization or curing units illustrated in FIG. 8(c).
Figure 26A:
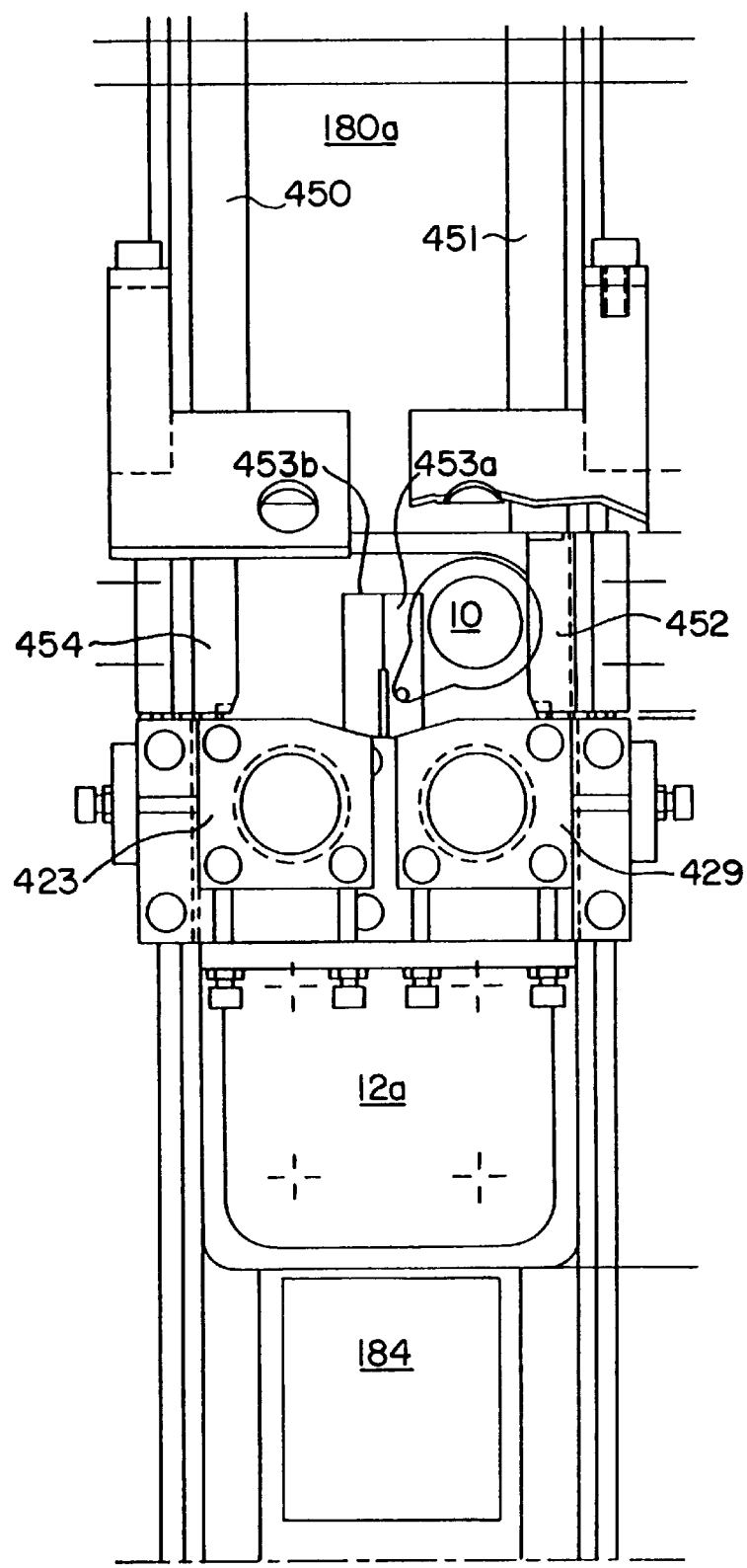
FIG. 26(a) is a planar view of the front curve retaining means used in the laser demolding embodiment of the present invention.
Figure 26B:
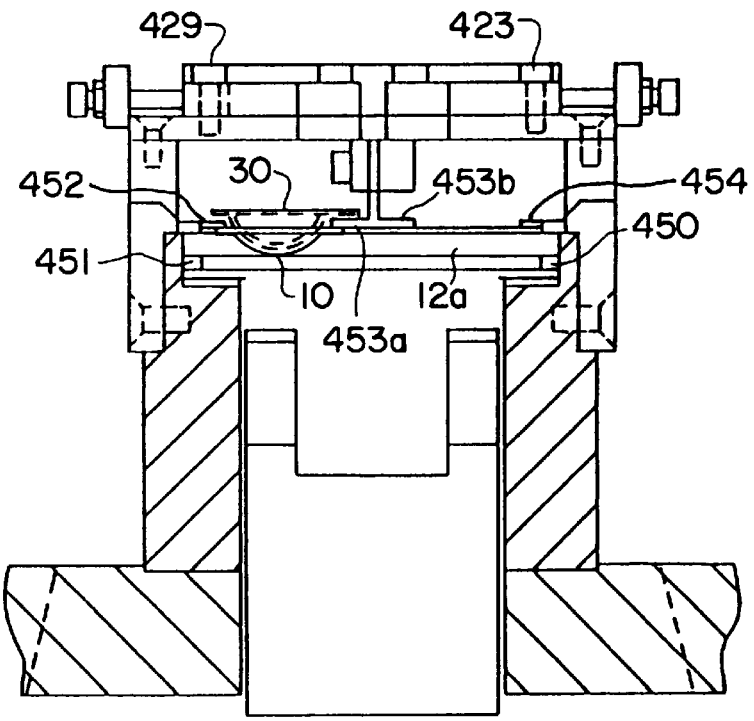
FIG. 26(b) is a partially cross-sectional view of a portion of the laser demolding embodiment illustrating the front curve retaining guides.

FIG. 23 shows generally, in vertical section, any of units 331,332 of FIG. 8(*c*). Each unit preferably has a flat horizontal surface 33 to which are affixed one or more elongated light bulbs 334 of the type commercially available for emitting ultraviolet radiation. FIG. 23 shows a single bulb, which is one of a multiplicity of bulbs, which is the preferred arrangement to use when several ranks of mold assemblies are disposed side-by-side on the conveyor. The bulbs are arrayed side by side, with their longitudinal axes parallel, and in the units indicated at 331 those axes are parallel to the direction of travel of the mold assembly and in the units indicated at 332, those axes are transverse to the direction of travel of the mold assemblies 39. The bulbs are mounted in standard electrical fixtures 335, which hold the bulbs in a horizontal plane parallel to the conveyor and the mold assemblies. Each of the ultraviolet bulbs 335 is connected to an electrical control means (not depicted) for supplying suitable electric current to the bulbs for actuating them to emit ultraviolet radiation.

The bulb or bulbs 335 under which the mold assemblies travel have the property that the intensity of the ultraviolet radiation (measured as, for instance, $Mw/cm^2$) is different at different points along the length (i.e., along the longitudinal axis) of the bulb. At the regions at each end of the bulb, the intensity is at or below a first intensity level which, at the given distance from the bulb to the mold assembly, is insufficient to cause initiation of polymerization of the polymerizable composition (which first intensity level may be zero). Between the ends of the bulb there is at least one region within which the intensity of the emitted ultraviolet radiation equals or exceeds the minimum level necessary, at the given distance from the bulb to the mold assembly, to initiate polymerization of the polymerizable composition. During operation, as the mold assembly passes along the length of the bulb, the intensity of the ultraviolet radiation that the mold assembly receives cycles at least once from an intensity level insufficient to initiate polymerization up to a intensity at which polymerization is initiated and back down to an intensity level insufficient to initiate polymerization.

Preferably, two or more such bulbs 335 are arrayed end to end in adjacent housings 331 over the path that the mold assemblies travel. Each bulb can then have at least one region emitting radiation of sufficient intensity to initiate polymerization and flanking regions of lesser intensity insufficient to initiate polymerization. In that way, even if each individual bulb has only one region intermediate its ends, which initiates polymerization, each cycle of increasing and decreasing intensity occurs at least two times, during the passage of a given mold assembly under the series of ultraviolet bulbs. It is preferred that three to six, more preferably five, bulbs be employed end to end so as to expose the polymerizable composition to three to six, preferably five, cycles of increasing and decreasing ultraviolet intensity.

In addition, a source of heat is provided which is effective to raise the temperature of the polymerizable composition to a temperature sufficient to assist the propagation of the polymerization and to counteract the tendency of the polymerizable composition to shrink during the period that it is exposed to the ultraviolet radiation. A preferred source of heat comprises a duct 336 which supplies warm air under the mold assembly as it passes under the ultraviolet bulbs. The warm air is exhausted through the opposite end of the housing, and maintained at a controlled temperature of 45° to 70°, with a preferred temperature that varies from housing to housing as will hereinafter be detailed. Adjustable air passage ways 337 enable precise adjustment of the air flow beneath the conveyors and pallets.

It has been discovered that through careful control of the parameters of this operation, as described herein, a superior fully polymerized contact lens can be produced which exhibits reproducible successful production within a relatively minor period of time. Without intending to be bound by any particular theory of operation, the observed performance of this system is consistent with the proposition that as the intensity of the ultraviolet radiation increases, polymerization is initiated at a number of different sites, and that thereafter decreasing the intensity of the ultraviolet radiation, coupled with exposure to an effective amount of heat, permits the initiated polymerization to propagate preferentially over the continued initiation of new polymerization. Then, as cycles of increasing and decreasing ultraviolet intensity are repeated, fresh initiation of polymerization occurs even as the previously initiated polymerization continues to propagate. In this way, careful control of the magnitudes of the low and high ultraviolet intensity levels, by selection of bulbs of appropriate-radiation intensities and by adjustment of the distance between the bulbs and the mold assemblies with the polymerizable compositions, and careful control of the rate of change of the ultraviolet intensity (by selection of the rate of movement of the mold assemblies past the bulbs and selection of the number of bulbs arrayed end to end and their lengths), produces a polymerized article in which there is no residual unpolymerized monomer remaining, while the overall distribution of polymer chain lengths provides a superior contact lens, and in which the polymerized article fills the mold cavity without any voids in the article or between the article and the inner surfaces of the cavity.

The method and means of the present invention are further illustrated in the following exemplification, in which the pallets 12(a) are fed from the precure apparatus 60 to a pair of conveyor belts 31(a),31(b) which travel the length of the polymerization apparatus.

Figure 8C:
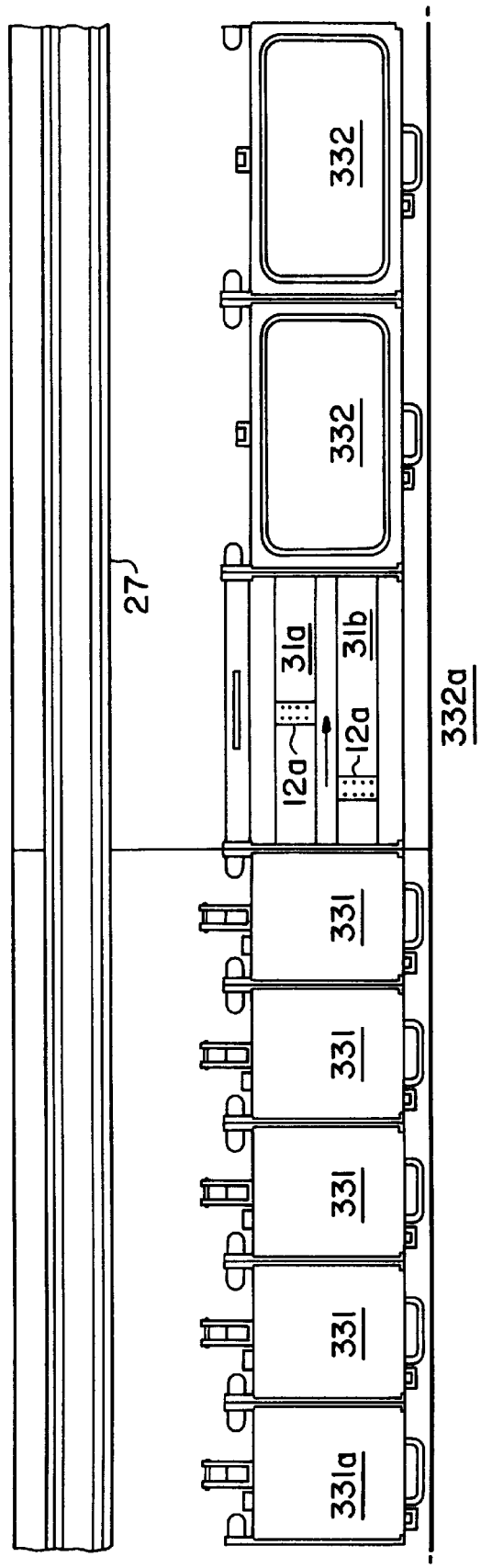
FIG. 8(c) is a simplified plan view of a third section of the automated line for molding contact lenses, which illustrates the curing ovens for the lenses.

The pallets move on conveyor belts which pass under a series of six smaller housings 331 and three longer housings 332 arrayed side by side as shown in FIG. 8(c) (only five smaller housings are illustrated in FIG. 8(c)), with each housing after the first holds filled with. ultraviolet-emitting bulbs. All bulbs are mounted to their respective housings to lie in the same plane. The vertical distance from the plane of the pallet to the plane of the bulbs, in the first housing that contains bulbs that the mold assemblies encounter, should be about 25 mm to about 80 mm. That vertical distance to the bulbs in the subsequently traversed housings should be about 50 to about 55 mm.

A duct similar to 336 blows heated air into each of the spaces under all six housings, including the first 331(a) that has no ultraviolet-emitting bulbs. The preferred temperatures to maintain around the pallet under each housing are about 49° C. to about 64° C. under the first two housings, and about 49° C. to about 59° C. under the other four.

The rate at which the pallet travels is preferably sufficient so that the total time that elapses from the moment that a given mold assembly first enters under the first housing until it emerges from under the last one is preferably about 300 to about 440 seconds.

By operating in this manner, the mold assembly is exposed to multiple cycles of increasing and decreasing ultraviolet radiation intensity. In each cycle, the intensity of the ultraviolet radiation ranges from about zero, up to about 3–3.5 $mW/cm^2$, and then back to about zero. Since the bulbs are of essentially identical length and the pallet moves at a constant speed, each cycle in the first six ovens lasts essentially the same length of time.

THE DEMOLDING STATION

After the polymerization process is completed, the two halves of the mold are separated during a demolding step leaving the contact lens in the first or front curve mold half 10, from which it is subsequently removed. It should be mentioned that the front and back curve mold halves are used for a single molding and then discarded or disposed of.

Figure 28:
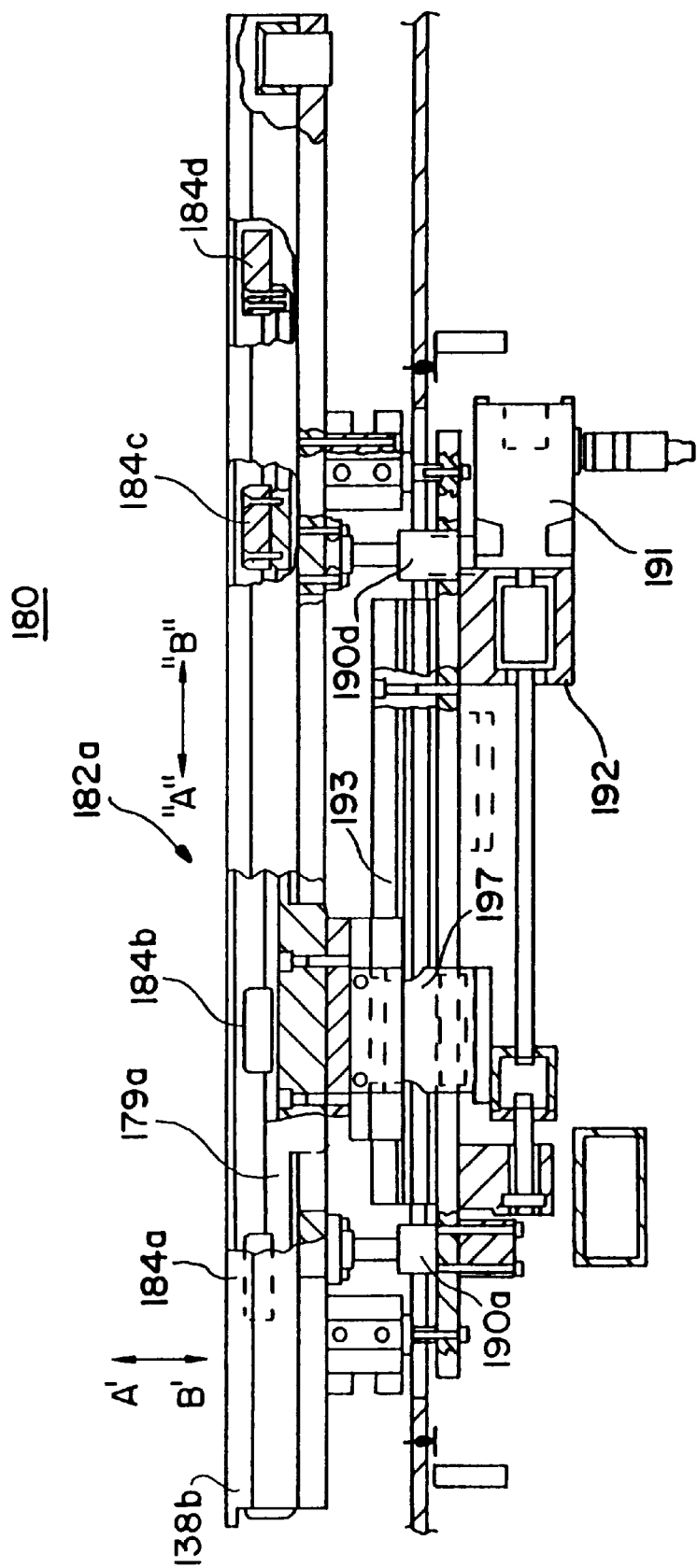
FIG. 28 is a partially cross-section elevation view of a walking beam transport means that may be used to provide precise positioning of the pallet of FIG. 7.

As illustrated in FIG. 8(d), the pallets containing the polymerized contact lenses in the mold assemblies exit the polymerization oven apparatus along two conveyors 31(a), 31(b), as described above, and enter into the demold assembly 90. The pallets are transferred from their conveyors and positioned along a respective transport carrier 182(a), 182(b) of dual walking beam conveyor 180 illustrated in FIG. 28. As illustrated in FIG. 28, transport carrier 182(a),182(b) comprises a plurality of respective spaced apart push blocks, such as the four labelled 184(a),(b),(c),(d), that move horizontally to precisely transport a pallet containing mold assemblies through the demold apparatus 90.

FIG. 28 illustrates a partially cut side view of dual walking beam 180 showing transport conveyor 182(a). As shown in the FIG. 28, the transport carrier beam 179(a) is mounted by suitable mounting means 197 on track 193 for horizontal reciprocating movement thereupon. Motor 191 and suitable drive linkages 192 are provided to precisely control the horizontal movement of the transport carrier beam 179(a) along the track 193 so as to enable push blocks to engage and advance the pallet along the carrier rails 183(a),(b). Additionally, as shown in FIG. 28, the carrier beam 179(a) is retractable in the vertical direction by a series of pneumatic cylinders, two of which 190(a), 190(d) are shown in the figure. The cylinders 190(a),(d) and motor 191 are precisely controlled by control means to simultaneously provide for the reciprocation and retraction of the transport carrier beam.

In the preferred embodiment described in detail above, the transport carriers of the dual walking beam carries the pallets containing contact lens mold assemblies through the demold apparatus where, preferably, the flange portions of the front curve and back curve mold halves are gripped and pulled away from each other, either in directly opposite directions or through an angle in a prying sort of motion.

Advantageously, the contact lens mold assembly is first heated moderately to facilitate separation of the polymerized article from the mold half surfaces. As explained in further detail in co-pending patent application U.S. Ser. No. 08/258,265, now U.S. Pat. No. 5,850,107 entitled "Mold Separation Apparatus" assigned to the same assignee as the instant invention, the demold apparatus 90 includes means for applying a precise amount of heat, which may be in the form of steam or laser energy, to the back curve lens mold portion of the contact lens mold assembly, prior to prying apart the back curve mold half from the front curve mold half by a set of pry fingers that are inserted within the gap formed between the overlying flange portions of each mold half of. the mold assembly.

To position a pallet 12(a) from conveyor 31(a) to transport beam 182(a) of dual walking beam 180, the pallet is first clamped by upstream clamping jaws 186(a),(b) as shown in FIG. 8(d). In a timed manner under control of suitable control means, the pallet is released and positioned on a pair of carrier guide tracks between a pair of push blocks, e.g., 184(a),184(b) of carrier 182 as shown in FIG. 28, for transport through the demolding apparatus 90. In a similar fashion, to transport a pallet 12(a) from conveyor 31(b) to transport beam 182(b) of dual walking beam 180, the pallet is first clamped by upstream clamping jaws 187(a),(b) (FIG. 8(d)), and then timely positioned on a second pair of carrier guide tracks between a pair of push blocks, similar to 184(a),184(b) of carrier 182 for precision transport through the demolding apparatus. The operation of transport carrier 182(a) of dual walking beam 180 will now be described in further detail with respect to FIG. 28. The transfer from, clamping means 186(a),(b) and 187(a),(b) to the dual walking beam is accomplished by a double armed push assembly 195 having a first arm 196 and a second arm 197. It operates in substantially the same way as the sequencing assembly 40 previously described with respect to FIG. 8(a).

As shown in FIG. 28, the transport carrier 182(a),(b) includes a reciprocating carrier beam 179(a),(b) having plurality of push blocks 184(a),(b),(c),(d), spaced equally apart on the respective carrier beams 179(a),(b) at a distance approximately equal to that of the length of a pallet. Each carrier beam 179(a),(b) is mounted for horizontal reciprocating movement in the directions indicated by the double-headed arrow "A–B" in FIG. 28 for advancing the pallets 12(a) along respective guide tracks through the demold apparatus, and, is additionally mounted for reciprocating movement in the vertical direction as indicated by double-headed arrow "A'–B'".

Each pallet guide track includes a pair of tracking guide rails or shoulders for mating with respective notches 28(a), (b) of the pallet as illustrated in FIG. 7(b) and 30. The paired set of shoulders and respective pallet notches 28(a),(b) keep the pallet precisely aligned as it is being advanced by carrier blocks 184 throughout the demold apparatus, and, further prevents any vertical movement of the pallet 12(a) when the mold assemblies 39 are demolded. The height of a push block, e.g., block 184(a), is such that it will engage the. edge of a pallet when the transport beam 179(a) is vertically reciprocated in the direction indicated by arrow "A'" when advancing the pallet through the demold apparatus 90, and, will disengage the edge of the pallet when carrier beam 179(a) is vertically retracted in the direction indicated by the arrow "B'".

As previously described above, with respect to FIG. 8(d), a pallet 12(a) is first positioned on the parallel set of tracks 183(a),(b) between the first two push blocks 184(a) and 184(b). To advance the pallet, the transport carrier beam 179(a) is driven forward in the direction indicated as "B" in FIG. 28, so that push blocks 184(a),(b) engage pallet 12(a) to advance its position along the guide tracks 183(a),(b) from its previous position, to a new incremented position. The amount of incremented advance varies with the type of demolding apparatus employed. When the laser demold apparatus (FIGS. 24–27) is employed, the pallets are incrementally advanced to advance an entire pallet length, and then a distance equal to the distance between centers of pairs of mold assemblies carried on pallet 12(a). This enables the laser demold apparatus to demold a pair of mold assemblies in each advance, and when the last pair is demolded, a new pallet is advanced into position.

When the steam demolding apparatus is employed (FIGS. 30–39) the pallets are sequentially advanced one pallet at a time inasmuch as the steam demolding apparatus demolds the entire pallet in one step. Immediately after advancing the pallet 12(a), the transport carrier beam 179(a) is retracted in a vertical direction beneath the plane of the carrier rails 183(a),(b) so that the carrier beam (and push blocks thereon) may reciprocate horizontally beneath the pallet to its original position in the direction "A" as indicated in FIG. 28.

After reciprocating horizontally to its original position, the carrier beam 179(a) (and push blocks 184(a),(b), . . . etc.) is extended vertically to its original position where the push blocks 184(a),(b) engage a newly registered pallet 12(a)

from conveyor 31(*a*), as previously described with respect to FIG. 8(*d*). Additionally, the first pallet 12(*a*) that had been advanced on carrier rails 183(*a*),(*b*) is now engaged between push blocks 184(*b*),(*c*). By continuous reciprocation of the transport carrier beam 179(*a*),(*b*) of dual walking beam 180, a precise and continuous flow of pallets through the mold separation apparatus 90 is assured.

LASER DEMOLDING

Heating the back curve lens mold creates differential expansion of the heated mold polymer relative to the cooler lens polymer which shifts one surface with respect to the other. The resultant shear force breaks the polymerized lens/polymer mold adhesion and assists in the separation of mold portions. The greater the temperature gradient between the surfaces of the mold portions, the greater the shearing force and the easier the mold portions separate. This effect is greatest when there is maximum thermal gradient. As time continues, heat is lost through conduction from the back mold portion into the lens polymer and the front mold portion, and then collectively into the surrounding environment. The heated back mold portion is, therefore, promptly removed so that very little energy is transferred to the polymer lens, avoiding the possibility of thermal decomposition of the lens.

The present invention discloses in two alternate embodiments, two different ways of heating the back curve and demolding the mold assembly. In the first of these two embodiments, heating the back curve may be accomplished by use of a source of electromagnetic radiation, preferably a carbon dioxide ($CO_2$) laser, applied to at least one of the mold portions. The laser is preferably of about 80 Watts at a wavelength of 10.6 $\mu$m. The exposure of the mold portion to the laser is between one half and one second.

In the case of lasers, both mid-infrared and UV, the laser energy is nearly 100% efficient because the polystyrene mold material is nearly 100% absorptive and only a tiny fraction of the incident radiation is reflected or scattered. In this way there is little or no energy lost to atmospheric absorption, so only the sample is heated.

Also, because of the absorptive nature of the mold material at these frequencies, most of the laser energy is absorbed within several wavelengths travel into the material. From that point. heat is transferred only by conduction from the surface. For that reason, on initial exposure to the laser beam, a huge thermal gradient is formed between the exposed exterior surface and the surface of the mold portion in contact with the lens.

The above objectives are attained.by use of a source of electromagnetic radiation, preferably a carbon dioxide ($CO_2$) laser, applied to at least one of the mold portions and may be split into two beams to simultaneously heat the back curve of two mold assemblies. It has been found through empirical testing that the laser is preferably of about 80 Watts per mold assembly at a wavelength of 10.6 $\mu$m. The exposure of the mold to the laser is between one half and one second.

Lasers of this power range are available both in flowing gas and sealed laser types. In the preferred embodiment of the laser demolding apparatus a Laser Photonics model 580 cw/pulse laser was integrated with an optical train as shown in FIG. 25.

Referring to FIG. 25, the input beam 400 is generated by a laser (not shown). The beam first travels through a plano convex lens 412 which causes the laser beam to converge. As is readily appreciated by one skilled in the art, zinc selenide is an appropriate material for construction of the lenses and other optical components in an optical train using laser light of the above specified wavelength.

As the beam further diverges it encounters integrator 418 which serves as an internal diffuser. The diffuser serves to scatter the laser light internally and provide for a more uniform beam. The beam as originally produced by the laser is typically not consistent across the beam in power distribution. Without a diffuser, this could lead to hot and cold spots on the incident object if a integrator is not used.

Undesirable characteristics can result from under- and over-exposure of the lens/mold combination to the laser energy. If the energy is non-uniform across the beam, both effects can be found on the same mold. Because a typical laser beam has a two dimensional Gaussian distribution of energy across the beam, the diffuser is necessary to square off the energy distribution.

After emerging from integrator 418, the beam is now uniform and weakly converging, and is made to be incident upon a beam splitter 420. The beam splitter passes half of the beam energy through the splitter and reflects the other half. The half of the beam 422 reflected by splitter 420. is reflected by mirrors 24 ultimately causing the beam to strike one lens/mold assembly 39(*a*). The other half of the beam 428 split by beam splitter 420, strikes mirror 430 and is reflected to the other lens/mold assembly 39(*b*).

In this preferred embodiment two mated mold portions containing a polymerized lens therebetween can be simultaneously heated by means of the apparatus.

Note that in this instance, the laser utilized between 150 and 200 Watts so that the laser power incident upon the mold pieces is the preferred, approximate 80 Watts.

Also shown in this arrangement is a helium-neon alignment laser 434 that is used to assure proper alignment of the optics in the system. The helium neon laser 434 produces a beam which is reflected by mirror 438 toward the path used by the main laser beam 400. At the intersection of the alignment laser beam with the path of the main laser beam, the alignment laser beam encounters beam splitter 439 which places the alignment laser beam in the same path as the main laser beam.

It was found that the preferred method for removing the back mold portion from the front mold portion after heating the back mold portion with the laser, was to apply a relative tensile force-between the mold portions. To apply this tensile force, the front curve mold half is held in place as illustrated in FIGS. 24(*b*), 26(*a*) and 26(*b*), wherein a pair of thin metal fingers. 452,453 are fixably mounted above track rails 450,451 and pallet 12(*a*) to secure the front curve mold half 10 to pallet 12(*a*) during the pry operation. Finger 453 is an inverted T shaped member and secures the front curve mold half 10 with one flange 453(*a*) of the inverted T, and will engage a second front curve mold half. (not shown in FIG. 26(*a*)) with a second flange 453(*b*). The second flange 453(*b*) cooperates with a third flange 454 to secure the second front curve mold half in position.

As pallet 12 is sequentially advanced through the laser demolder, the rails 452–454 sequentially engage each row of mold assemblies 39 to secure the front curve mold half. The back curve mold half flanges 36 are engaged by a pry fixture 448 (diagrammatically illustrated in FIG. 24), which engages both sides of flange 36 as the pallet 12 is advanced into position by the walking beam conveyor block 184. Pallet 12(*a*) is then stopped, while pry fixture 448 rotates about axis 456 in the direction of arrow "F" in FIG. 24 to apply a tensile force to the back curve mold half 30. The upper part of the pry fixture 448 is capable of rotation about axis 456 so that after exposure of the back curve mold portion 30 to the laser, the fingers 456,458 pry the back curve mold portion up. The entire assembly is then lifted approximately 10 mm as noted by arrows "B'–B"" in FIG. 24 to remove the back curve mold part completely. It has been found that when the metal fingers 456,458 were allowed to stop under the flange, and then tilted back approximately 18°, the overall quality of the lens removed, and the resultant yield was better than currently employed pry techniques which only lift from a single side, and do not control the axis of the pivot point.

It was determined that such above-described mechanical assistance was best supplied just after exposure to the radiation. Although no adverse effects would be contemplated if there was less time between exposure and mechanical removal, in practical terms the time between exposure and mold separation would be between about 0.2 and about 1.5 seconds.

Figure 27C:
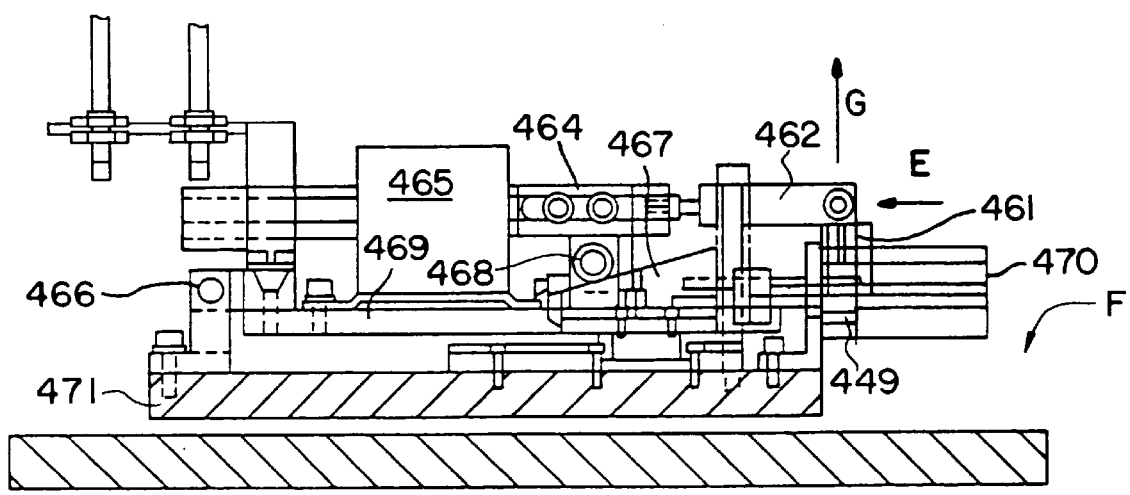

The preferred arrangement for demolding the back curve mold halves is more fully illustrated in FIGS. 27(a), 27(b) and 27(c) wherein FIG. 27(a) is an elevation view of the apparatus, FIG. 27(b) is a plan view taken along section line A–A' of FIG. 27(a) and FIG. 27(c) is an elevation side view taken along section B–B' of FIG. 27(a). As illustrated in FIG. 27(b), pallet 12(a) is on the second of a plurality of demolding cycles wherein laser beam 400 will deliver intense electromagnetic energy from beams 428 and 422 through laser masks 429 and 423 to the second row of mold assemblies in pallet 12(a). The first row of mold assemblies is being demolded by pry apparatus 448 as was previously illustrated and described with respect to FIG. 24. Pry apparatus 448 is rotated by shaft 449 within journal bearing 460 by a pair of links 461 and 462 which are illustrated in FIGS. 24 and 27(c). As illustrated in FIG. 27(c), link 462 is pulled in the direction of arrow "E" by a rack 464 which is driven by a pinion on a stepper motor 465. Stepper motor 465 thereby rotates shaft 449 in the direction indicated by the arrow "F" in FIG. 27(c) and FIG. 24 through approximately 18° of arc to separate the back curve mold half 30 from the front curve mold half 10.

After the pry mechanism 448 and shaft 456 have been rotated, the entire assembly (as mounted on platform 469) is lifted upwardly in the direction of arrow "G", about pivot point 466 by means of a slidable cam 467 which engages a roller cam follower 468 mounted on pivotable platform 469. Slidable cam 467 is advanced by a pneumatic or electric drive motor 470 to raise shaft 449 approximately 10 mm so that the attached pry apparatus 448 may be retracted for disposal of the back curve mold halves after they have been separated from the mold assembly.

Each of the aforementioned components are mounted on a movable platform 471 which is shiftable in both the X and Y direction in order to dispose of the separated back curve mold halves as will be hereinafter described. Once the pry mechanism 448 has separated the back curve mold halves, and the mechanism has been lifted free of pallet 12(a), platform 471 is shifted to the right in the X axis as illustrated by the arrow "H" in FIG. 27(a) by means of a pneumatic drive motor 472. Platform 471 is suspended from a stationary tower 473 and mounted for reciprocal movement along track 474 by means of a column tower 475. Platform 471 is shifted in the direction of arrow "H" in order to place the separated back curve mold halves over disposal receptacle 476. Simultaneously, a scrapper mechanism 477 is elevated by means of a pneumatic motor 478 to a position parallel with, and just below the surface of pry mechanism 448. The shiftable platform 471 is then shifted in the Y axis in the direction of arrow "J" in FIG. 27(b) to scrape the separated mold curve from the pry fixture 448 and cause them to thereby drop into the receptacle 476 and be vacuated by means of vacuum line 480. Platform 471 is shifted in the Y axis by means of pneumatic motor 481 which is fixably mounted to platform 471. Platform 471 is also mounted for reciprocal movement on tower 475 by means of rails 482, 483.

Platform 471 is then reciprocated back along the Y axes to its original position, and then along the X axes to its original position in directions opposite the arrows "J" and "H" illustrated in FIGS. 27(a) and 27(b). The slidable cam 467 is then withdrawn by drive motor 470 and the pry mechanism 448 is allowed to lower into position above pallet 12(a) while stepper motor 465 returns shaft 449 and the pry mechanism 448 to their original orientation. Laser 400 is then energized to heat the second row of mold assemblies in pallet 12(a), and pallet 12(a) is then advanced into a pry position by means of reciprocating block member 184. Pallet 12(a) is constrained through the demolding apparatus on conveyor 32(f) by means of rails 450 and 451 which prevent vertical movement and any pitch, yaw or roll of the pallet during the demolding operation.

STEAM DEMOLDING

The second of the two embodiments for heating the back curve and demolding the mold assembly uses steam as a high energy heat source. The mold separation apparatus of the second embodiment generally comprises two essentially identical steam discharge apparatuses and two associated demolding assemblies, shown as boundary box 90 in FIG. 8(d) for accomplishing the simultaneous demolding two parallel lines of a plurality of contact lens molds each containing an ophthalmic lens therein. The use of two parallel lines increases the throughput of the production line. The dual walking beam conveyors 180(a), 180(b) carry individual pallets, generally illustrated between blocks 184 (a), 184(b) for registration within each twelve of the demolding stations.

As illustrated in FIG. 8(d), the dual walking beam conveyors 180(a), 180(b) comprises a parallel set of tracks, each track including a pair of tracking ribs for mating with respective grooves 28(a) formed in the pallet 12. The paired set of ribs and respective interlocking grooves 28(a) keep the pallet aligned as it is being conveyed within the demolding apparatus, and, as will be explained in detail below, prevents any vertical movement of the pallet 12 relative to the conveyor. The blocks 184 provide suitable registration means for precisely locating the pallets along the conveyor path for the demolding step.

The demolding assemblies of the mold separation apparatus 90 each physically pry the back curve mold half 30 from the front curve half of each contact lens mold 11 to physically expose each contact lens situated in the lens mold for conveyance to a hydration station (illustrated schematically at 89 in FIG. 8(d)) for hydration of the lenses. The prying process occurs under carefully controlled conditions, as will be explained in detail below, so that the back curve half 30 will be separated from the front curve half 10 without destroying the integrity of the lens 8 formed in the lens mold as schematically illustrated in FIG. 29. To accomplish this, the mold separation apparatus first prepares the back curve half 30 of each lens mold assembly to enable quick and efficient removal from its respective front curve 10 by applying a predetermined amount of heat, preferably in the form of steam, to the back curve half surface.

FIGS. 30(a) through 30(d) illustrate figuratively and in partial cross-section, one demold assembly and a single track 180(a) having a pallet 12(a) of mold assemblies thereon. The demold assembly includes reciprocating beam 526 carrying a steam discharge apparatus 528 with eight steam discharge nozzles, two of which are illustrated as 527(a), 527(b). In the practice of the invention a separate demolded apparatus having a second set of nozzles is provided for the second conveyor track 180(b). The steam discharge assembly 528 includes eight steam head nozzles connected to a distribution manifold and a steam heat source (not shown), so that steam may be simultaneously applied to each of the mold assemblies on the pallet 12(a). To apply heat, the reciprocating beam 526 is lowered in the direction of arrow "A" in FIG. 30(a) so that the steam head nozzles precisely engage their respective mold assemblies for applying steam at a carefully controlled temperature and duration. FIG. 30(a) shows only two steam head nozzles 527(a),(b) in engagement with the mold assemblies on pallet 12(a).

Figure 32:
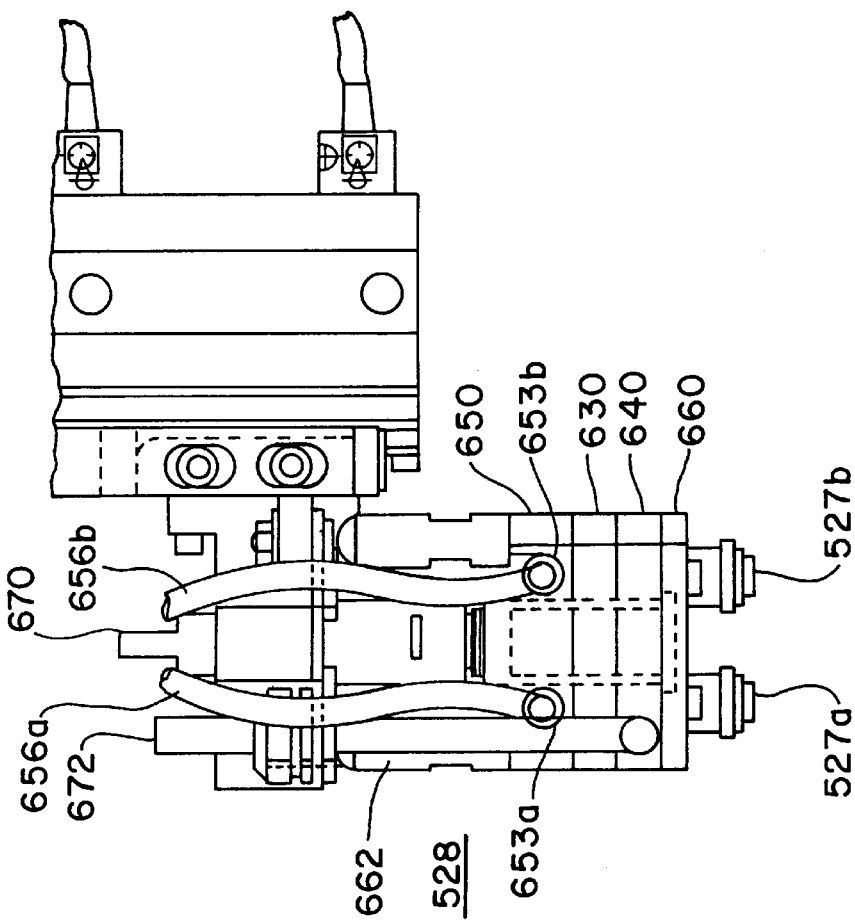
FIG. 32 is a detailed elevational view of a steam discharging apparatus that may be used with the present invention.

As shown in the general front plan view of FIG. 32, each steam discharging apparatus 528 generally comprises a plurality of.individual nozzle assemblies 527 each mounted in each apparatus 528 at fixed locations corresponding to the location of each lens mold assemblies seated in the pallet 12. Thus, in the preferred embodiment, there are eight (8) individual nozzle assemblies 527 positioned in each discharge apparatus.

Each steam discharge apparatus and the nozzle assemblies 527 therein are mounted for reciprocation on a first mounting platform 526 which moves in a plane transverse to conveyors 180(a),(b). The first mounting platform 526 is caused to vertically reciprocate between a first upper position illustrated in FIG. 30(d), for a duration of time to allow the pallet 12,carrying the lens mold assemblies to be registered beneath the steam discharge apparatus 528 and, a second lowered position illustrated in FIG. 30(a) whereby each nozzle assembly 527 is registered in sealing proximity with the surface 34 of the back curve mold portion 30 to direct steam at the surface. The mounting platform 526 is reciprocally driven by a plurality of screw/nut assemblies driven by a servo motor.

A detailed front elevational view of steam discharging apparatus 528 is illustrated in FIG. 32 and shows a cover assembly 650, a steam distribution manifold 630 located immediately beneath cover assembly 650 for distributing steam from each of two steam intakes to the eight individual steam nozzle assemblies 527, a condensate manifold 640 located immediately beneath steam distribution manifold 630 for removing and regulating the steam pressure applied to the back curve lens mold surface during steam impingement, and a retaining plate 660 for retaining the individual steam discharge nozzles 527 and two steam intake valves 666(b), 666(a) in the apparatus. The steam intake valve 676(b) (and 676(a)) communicates with steam intake pipe 670 via plenum 669 to provide pressurized steam to the steam distribution manifold 630. Additionally, a vacuum source (not shown) is connected via suitable piping 672 to the condensate manifold 640 at input 671 to evacuate the steam and to regulate the steam pressure applied to the back curve lens mold surface during steam discharge.

Figure 34:
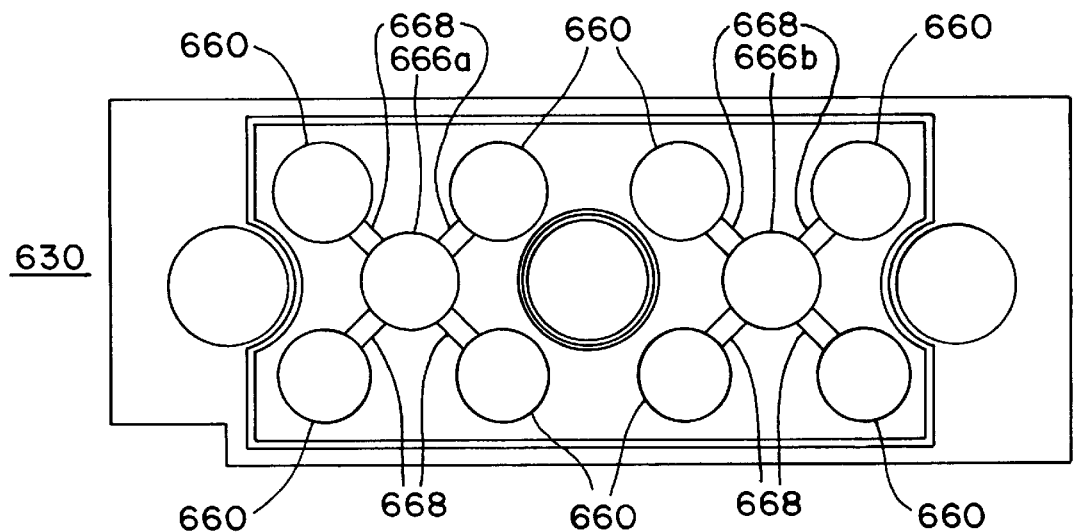
FIG. 34 is a top plan view of the steam discharge manifold of the apparatus illustrated in FIG. 32 for distributing steam to each of the nozzle assemblies of the steam discharging apparatus.

A top plan view of the steam distribution manifold 630 of steam discharge apparatus 528 is illustrated in FIG. 34. As shown in FIG. 34, the steam distribution manifold 630 is provided with a set of eight hollowed bores 660 that each seat a respective steam discharge nozzle assembly 527, and hollowed bores 666(a),(b) that seat respective steam intake valves 676(a), 676(b). Each bore 666(a),(b) is provided with four (4) conduits 668 that extend therefrom and communicate with a central axial bore of a respective individual steam discharge nozzle assembly 60 to provide steam to each nozzle as will be explained in detail below.

Figure 35:
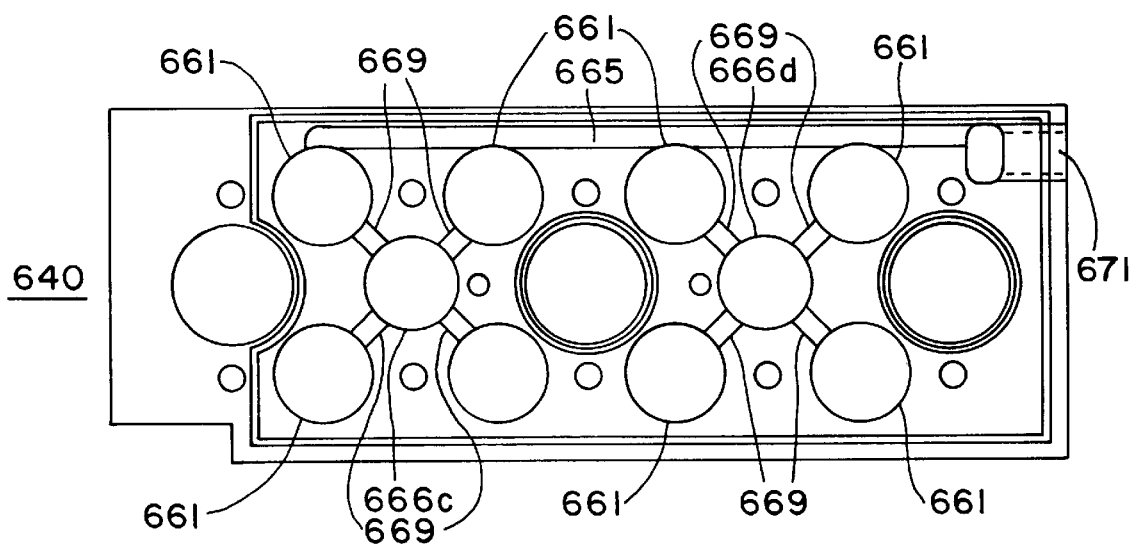
FIG. 35 is a top plan view of the condensate manifold of the apparatus illustrated in FIG. 32 for venting excess steam pressure during steam impingement to regulate the amount of steam discharged to the back curve lens mold surface.

A top plan view of the condensate manifold 640 of steam discharge apparatus 528 is illustrated in FIG. 35. As shown in FIG. 35, the condensate manifold 640 is also provided with a set of hollowed bores 661 each in axial alignment with the bores 660 of the steam discharge manifold, and bores 666(c),(d) in axial alignment with the bores 666(a),(b) of the steam discharge manifold for accommodating respective steam intake valves 676(a), 676(b). Each bore 666(c),(d) is provided with four (4) conduits 669 that extend therefrom and communicate with a hollowed annular ring of a respective individual steam discharge nozzle assembly 572 for removing steam, as will be explained in detail below. The condensate manifold 640 also defines a channel 665 that connects the vacuum source at input 671 with four of the hollowed bores 661 and the hollowed annular ring of a respective individual steam discharge nozzle assembly 527 when seated therein.

Figure 36:
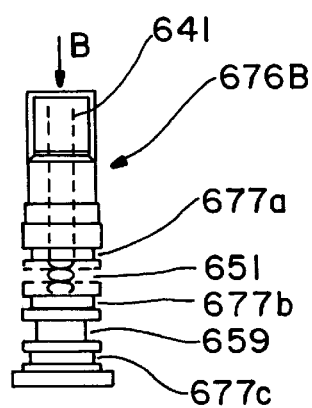
FIG. 36 is a detailed cross-sectional view of the steam intake valve of the steam discharge apparatus illustrated in FIG. 32.

A detailed cross-sectional view of the steam intake valve 676(b) (676(a)) is shown in FIG. 36. Steam at 100° C. is input from a suitable source, as indicated by the arrow "B" in FIG. 36, through central axial bore 641 and distributed to radial bores 651 that are radially aligned with conduits 668 of the steam distribution manifold 630 when the valve is seated therein. Thus, steam is distributed from radial bores 651 via the conduits 668 to each of the individual steam discharge nozzles 527. In an alternative embodiment, the radial bores 651 may be replaced with a hollowed annular bore 651 that communicates with the central bore 641 of the steam intake valve and each of the conduits 668 of the steam distribution manifold. Steam intake valve 676(b) (676(a)) is provided with a circumferential annular indent 659, such that, when the valve is seated within the discharge apparatus, the indent 659 is aligned with four of the bores 661 and channel 665 and each of the conduits 669 of the condensate manifold 640. When the vacuum is applied to input 671 to relieve the steam pressure within the manifold, the alignment of the piping 665, indent 659, and conduits 669 assures that the vacuum will be supplied to each of the discharge nozzle assemblies 527. A set of O-rings 677(a),(b),(c) surrounding the periphery of the steam intake nozzle 666(a) (666(b)) are provided and may be formed EDPM or other suitable polymer to provide an air-tight seal when seated within the respective manifolds of the discharge apparatus.

Figure 33:
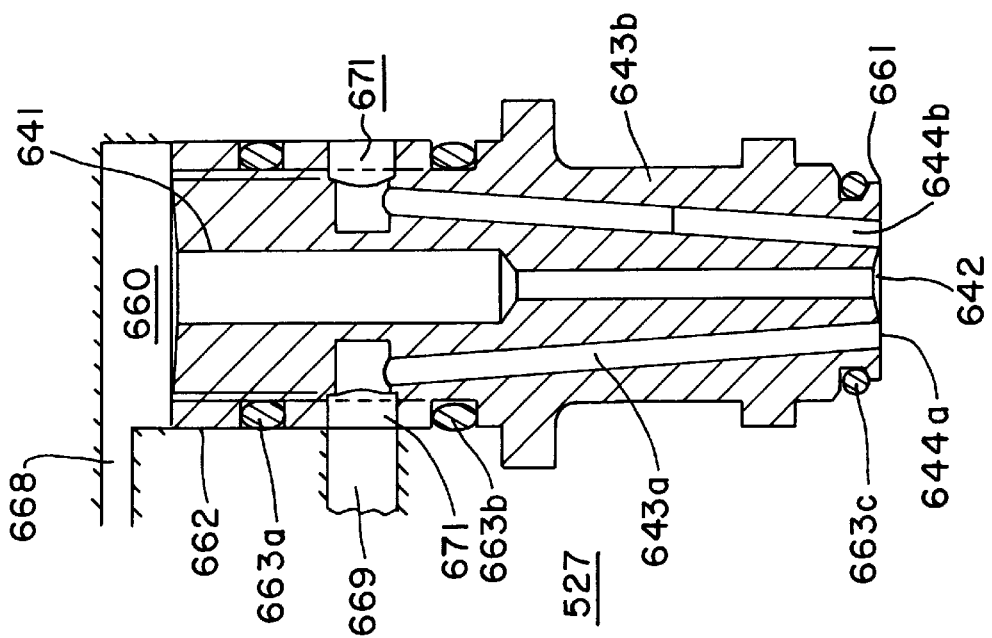
FIG. 33 is a detailed cross-sectional view of the nozzle for discharging steam against the back curve lens mold surface.

A detailed cross-sectional view of an individual nozzle assembly 527 is shown in FIG. 33. The nozzle 527 includes a central axial bore 641 that forms a discharge orifice 642 located at the bottom 661 of the nozzle for discharging steam received from the steam distribution manifold 630. As mentioned above with respect to FIG. 34, the central axial bore 641 of a respective individual steam discharge nozzle assembly 527 receives pressurized steam from a respective conduit 668 of the steam manifold 630. Surrounding the centralized bore 641 is a hollowed annular ring 671 having a plurality of bores 643 extending therefrom, two of which 643(a), 643(b) are shown in the view of FIG. 33, and which terminate in venting orifices 644(a), 644(b) located concentrically around discharge orifice 642. The annular ring 671 of each nozzle 527 communicates with bore 661 and a respective conduit 669 of the condensate manifold 640 so that the vacuum from the vacuum source will be supplied to the bores 643(a),(b) of the nozzle 527. During operation, the venting orifices 644(a),(b) will simultaneously exhaust the steam when steam is applied to the back curve lens mold surface through discharge orifice 642.

The physical dimensions of the nozzle assembly 527 are best illustrated in FIG. 33. It comprises essentially a cylindrical upper end 662 having the discharge steam input orifice at the top surface thereof. A cylindrical lower end 661 that is smaller in diameter that the upper end has the discharge orifice 642 and venting orifices 644(a),(b). The diameter of the nozzle lower end is configured so that the discharge 642 and venting orifices 644(a),(b) thereof protrude within the concave surface 34 of the back curve lens 30 as shown in FIG. 30(a) so as to direct steam directly at the back curve surface. The length of the nozzle that protrudes within the back curve 30 is approximately 1 mm–2.5 mm.

Also shown in FIG. 33, surrounding the periphery of the nozzle upper and lower ends, are O-rings 663(a),(b),(c) that may be formed of EDPM or other suitable polymer for providing an air tight seal when the nozzle 527 is situated within the hollowed bores of the steam and condensate manifolds 630,640 of the mounting head assembly 667(a), (b). As described in greater detail below, when the nozzle 527 is reciprocated to the back curve mold half 30, the O-ring 663(c) of the lower nozzle end 661 forms a seal with the outer surface 34 of the back curve 10, as illustrated in FIG. 30(a). The seal created between the O-ring 663(c) and the back curve mold creates a heating chamber between the nozzle and the back curve, and enables the steam discharged out of central discharge orifice 642 to be uniformly distributed along the outer surface 34 of the back curve mold 30 thereby ensuring an even temperature profile along that portion of the back curve lens mold surface 34 that is adjacent the contact lens. Thus, a uniform temperature gradient is created between the back curve lens mold surface 34 and the contact lens 101 to aid in the separation of the lens mold 30 from the contact lens 101 in the mold separation apparatus 90. Furthermore, the vacuum exhaust ports 644(a)–(d) and the O-rings 663(c) (and the seal created with the back curve lens mold surface) prevent water condensation from forming on the back curve mold surface. Preferably, steam at 100° C., is discharged for approximately 2–4 seconds with the venting orifices 664(a),(b) simultaneously removing the steam from the lens mold surface.

As illustrated in FIG. 32, the cover assembly 650 of the steam discharge apparatus includes bores for accommodating one or more heater cartridges (not shown) which function to keep the nozzles 527 at a temperature that will prevent water condensation from forming on the nozzle surface and to assist in preventing water condensation from forming on the back curve surface 34. Preferably, the temperature of the heater cartridges are programmed to maintain the temperature of the nozzle at 100° C. or greater. The cover assembly 650, as illustrated in the front elevational view of FIG. 32, accommodates two heater cartridge inlets 653(a),(b) with the cartridges therein connected Lo suitable heater cables 656(a),(b).

As shown in FIG. 30(a), during the time the steam discharge nozzles 527(a),527(b) thereof discharge steam to the back curve of the individual lens molds, a set 530(a), 530(b) of pry tool are extended by pneumatic drive motors 532,533, as indicated by the arrow "B", for insertion between the gaps formed between the respective front and back curves for each of the four lens molds situated on one side of the pallet 12(a). Likewise, a second set 530(c),530(d) of pry tools are extended by drive motors 534,535 in the direction of the arrow "B'" for insertion between the gaps formed between the respective front and back curves of each of the four lens molds situated on the opposite side of the pallet 12(a).

Figure 39:
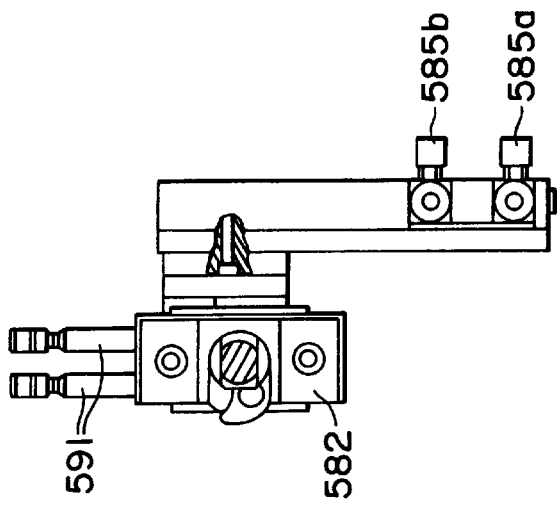
FIG. 39 illustrates a front elevational view of the suction cup assembly illustrated in FIG. 37.
Figure 37:
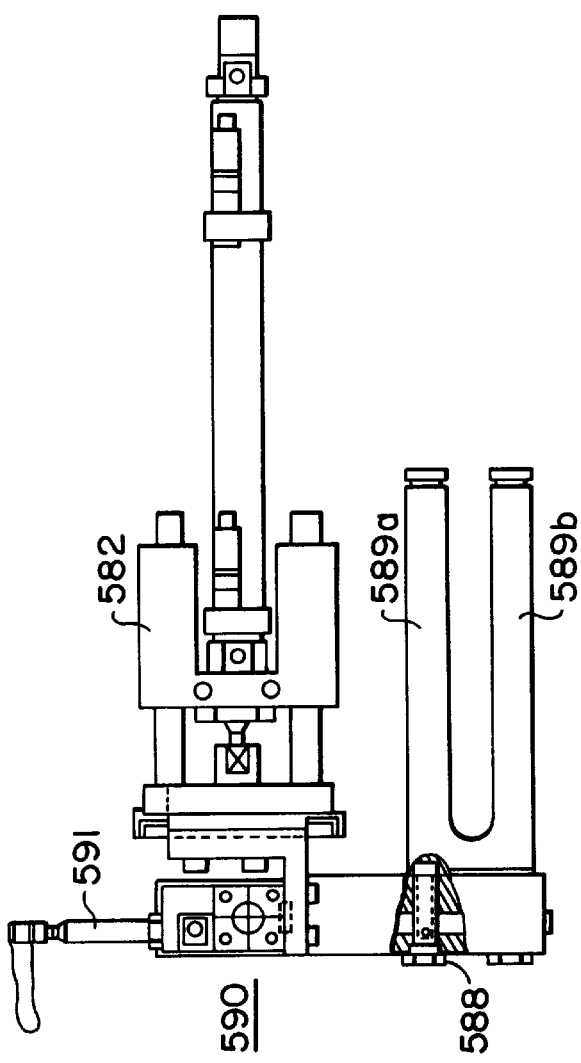
FIG. 37 illustrates in a top or plan view the suction cup assembly useful in the demolding station illustrated in FIG. 30.
Figure 38:
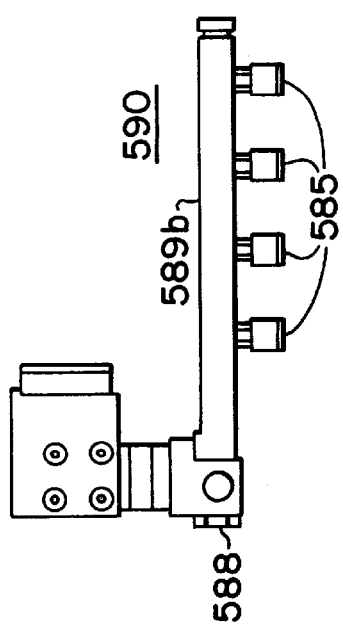
FIG. 38 illustrates a side elevation view of the suction cup assembly illustrated in FIG. 37.

Next, as illustrated in FIG. 30(b) after discharging the precision controlled amount of steam, the steam discharge assemblies and the steam nozzles 527 are retracted by a pneumatic drive as illustrated in FIG. 30(b) by the arrow "D", this enables a suction cup assembly unit 590 to align with the pallet 12(a) as shown. As shown in FIGS. 37–39, each suction cup assembly 590 contains eight suction cups (generally indicated as 585) for precise engagement with a corresponding back curve mold assembly on the pallet when the steam discharge nozzles 527(a),(b) are retracted.

As illustrated in FIGS. 37–39, the suction cup assembly unit 590 shown in FIGS. 30(b)–(d) is mounted on the movable platform 582 and both reciprocate in both horizontal and vertical directions with respect to the pallets and mold assemblies. As shown in the detailed view of FIGS. 37–39, each suction cup assembly unit 590 comprises a mounting unit 588 having legs 589(a),(b) that accommodate suction cups 585 positioned in a one-to-one correspondence with the individual contact lens mold assemblies of a respective pallet. Thus, as illustrated in FIG. 38 each leg 589(a),(b) has four (4) suction cups 585 that are spaced apart for gripping a respective back curve lens mold. As mentioned generally above, each suction cup 585 of the suction cup assembly unit 590(a),(b) vacuum grips a respective back curve 30 of a corresponding lens mold after the prying operation described in detail below. The mounting unit 588 and the legs 589(a),(b) thereof reciprocate along fixed guided mounts 582 by conventional pneumatic means. The vacuum suction is provided to each of the plurality of suction cups 585 via conduit 591 shown in FIG. 37.

In the preferred embodiment, the pry tools of demolding assembly 90, shown in the diagrammatic elevation views of FIG. 31 are more fully illustrated in plan view in FIG. 31. As illustrated, two paired sets of pry tools 530(a)–(d) and 540(a)–(d) each arranged on opposite sides of respective pallet conveyors 180(a),180(b). As shown in the FIG. 31, the first set of pry tools 530(a),(b) and a second set of pry tools 530(c),(d) are located on respective opposite sides of the conveyor 180(a) to enable the removal of the back curve lens mold from the front curve for each of the eight lens mold assemblies situated in a registered pallet 12 as represented by the phantom center lines on conveyor 180(a). Each set of tools 530(a),(b) and 530(b),(c) include upper and lower fingers which separate vertically, one from the other, in a manner to be herewith described in detail. Upper pry tool 530(a) includes a plurality of fingers 516 that form four bights or lens receiving areas 570, and lower pry tool 530(b) includes a plurality of fingers 515 that form four bights or lens receiving areas. Similarly, a first set of pry tools 540(a),(b) and a second set of pry tools 540(c),(d) are located on respective opposite sides of the conveyor 180(b) to enable the removal of the back curve lens mold from the front curve for each of the eight lens mold assemblies situated in a registered pallet as represented by the phantom center lines on conveyor 180(b). The description that follows is directed to one paired group of pry tools, e.g., 530(a),(b) and 530(c),(d) but it is understood that the following description applies equally to the other paired group of pry tools 540(a)–(d) for the pallet conveyed on conveyor 180(b).

As shown in the detailed side view of FIG. 29 and FIG. 30(a) the top group of pry fingers 516 is situated directly above the bottom group of pry fingers 515 and may be simultaneously inserted into the gap "A" illustrated in FIG. 29 defined between the circumferential flange portion 36 of the back curve 30 and the circumferential edge portion 18 of the front curve 10. The top and bottom fingers 515, 516 of pry tools 530(a),(b) are further reciprocable in a vertical direction with respect to each other to perform a prying operation, as will.be explained in detail below.

As further illustrated in FIG. 30(a), each set of pry tools 530(a),(b) are inserted in a manner such that fingers 515 thereof of a bottom set of the pry tools anchors the annular flange portion 18 of the front curve of the lens mold to the surface of the pallet, and that the fingers 516 of a top set of pry tools by action of a vertical drive means will lift beam 526 in the direction of arrow "C" in FIG. 30(c) which will then vertically separate (FIGS. 30(c) and (d)) the back curve mold portion 30 of the mold assembly from the front curve mold portion 10 without destroying the integrity of the contact lens or either of the mold parts.

During the mold separation step illustrated in FIG. 30(c), vacuum suction for the suction cup assembly 590 is activated, and the top group of pry tools 530(a),530(c) having a plurality of fingers 516 illustrated in FIG. 31, are caused to separate from the lower group of pry tools 530(b),530(d) by a vertical drive means to bias the circumferential flange of each of the back curve molds 30 away from each of the front curves 10 which retain a respective contact lens therein and are anchored by the lower group of pry fingers 515.

As illustrated in FIG. 29, the use of a controlled lifting motion between pry fingers 515 and 516 tends to bow the convex portion inwardly which will initiate a bilateral separation of the back curve lens, as denoted at 8(a) and 8(b). This, in turn, initiates a standing wave 8(c) in the material which travels downwardly along the convex surface of the back curve mold half. If the upward movement of the back curve mold half does not exceed the downward propagation rate of the standing wave in the material, then the back curve will be lifted cleanly without tearing the lens.

As the back curve is lifted free, it carries with it the HEMA ring 13 which may be preferentially retained on the back curve by means of corona treatment of the back curve flange 36, or by surfactant treatment of the front curve flange 18.

Thus, the back curve lens molds 30 are effectively removed from their respective front curve lens mold portions and retained by individual suction cups 585.

Finally, as illustrated in FIG. 30(d), the upper and lower sets of pry tools 530(a),530(c) and 530(b),530(d) are retracted laterally in opposite directions indicated by the arrows "E" and "F" in FIG. 30(d), to allow each pallet 12(a) now containing up to eight front curve lens mold portions and a respective contact lens therein, to be conveyed out of the demold assembly by the dual walking beam 180. The suction cups 585 retain the corresponding individual back curve mold portions for disposal. Specifically; the suction cup assembly 590 is retracted to its original position and the vacuum may be removed therefrom so as to release the removed back curve lens mold portions. The separated back curve mold parts are dropped in a bin at the retracted position, and evacuated by a vacuum line (not shown) for disposal.

After the mold assemblies have been separated in the demold apparatus 90, each pallet containing the front curve mold halves with an exposed polymerized contact lens therein, is subsequently transported to a hydration station for hydration and demolding from the front curve lens mold, inspection and packaging. As shown in FIG. 8(d), a dual pusher 202 having retractable arms 202 is provided to translate the motion of pallets 12(a) from each transport carrier of dual walking beam 180 to conveyor 31(d) for transport to the hydration chamber. Prior to transfer to the hydration chamber, the integrity of the mold halves contained in the pallets are checked to determine if any errors have occurred, for e.g., if a back curve mold half was not separated from a corresponding front curve mold half. The pallet is first clamped between upstream clamping jaws 207(a),(b) where the pallet is appropriately sensed to determine if any error is present. If an error indicating that a pallet should be rejected is found, that particular pallet and the contents therein are transferred from conveyor 31(d) to recirculating conveyor 31(e) by pusher assembly 80 as shown in FIG. 8(d). The clamping jaws 207(a),(b) release the rejected pallet and the pusher arm 80 pushes the pallet to recirculating conveyor 31(e) where the rejected pallet is conveyed back to the front curve supply conveyor 27. As mentioned above, the contact lens production line facility includes a suction vent apparatus (not shown) for removing the mold assemblies from the rejected pallet 12(a) while being recirculated back to or while on the front curve supply conveyor 27.

If the pallets containing the demolded contact lens assemblies are not rejected, they are alternately clamped by clamping jaws 207(a).,(b) and are conveyed as pairs by conveyor 31(d) to transfer pusher assembly 206 for transference to the hydration assembly 89. Prior to entering the transfer pusher 206, the upstream clamping jaws 209(a),(b) temporarily clamp a pallet to enable a pair of pallets-to accumulate therebehind. As controlled by the control means, the clamped pallet are released to enable two pallets 12(a), 12(al) to be forwardly conveyed for alignment with reciprocable pusher arm 210 of transfer pusher 206. Drive means 211 then enables pusher arm 210 to push the two pallets to a transfer apparatus 215, and specifically, a pallet 216 having a flat plate portion 219, that accommodates up to four pallets for transfer of the mold assemblies therein to the hydration chamber 89. After the first set of pallets is placed on plate 219, the pusher arm 210 is reciprocated to its original position to receive a second set of two pallets. The push arm 210 is then enabled to input the second set of two pallets onto the plate 219 of transfer pusher 216 causing the first set of pallets to advance on the plate. FIG. 8(d) shows the flat plate portion 219 of transfer pallet 216 containing four pallets that have been pushed thereto by pusher arm 210 two pallets at a time.

As shown in FIG. 8(d), the transfer pallet 216 is mounted for reciprocating horizontal movement on tracks 218(a),(b). In steady state operation, suitable drive means (not shown) enables transfer pallet 216 and plate 219 carrying four pallets to move across tracks 218(a),(b) in the direction indicated by arrow "K" in FIG. 19(a) toward the hydration chamber assembly 89 until it reaches the hydration assembly transfer point 219(b) where effective transfer of the front curve mold assemblies containing polymerized contact lenses to the hydration chamber takes place. After the transfer pallet 216 reaches the transfer point 219(a) a vacuum gripping matrix (not shown) of hydration assembly 89 is actuated to remove up to thirty-two front curve lens mold portions at a time from the four pallets on the transfer pallet 216 and transfer them to an appropriate receiving device which transfers the matrix to a de-ionized water bath. The transfer pallet 216 and plate 219 carrying empty pallets 12(a) now reciprocates along tracks 218(a),(b) in the direction indicated by arrow "M" in FIG. 8(d) back to its original position. The empty pallets are removed from plate 219 on to the return conveyor 31(f) when the incoming set of new pallets containing front curves are pushed onto the plate by pusher arm 210. Specifically, pusher arm 210 pushes a first set of new pallets 12(a) on the plate 219 to cause the first set of two empty pallets to exit the plate 219 and engage the conveyor 31(f) for recirculation back to the front curve conveyor 27 pick-up point. Likewise, pusher arm 210 pushes a second set of new pallets 12(a) on the plate 219 which causes the first set of previously positioned new pallets to advance on the plate 219 and enable the second set of two empty pallets to exit the plate 219 and engage the conveyor 31(f) for recirculation to the front curve supply pick-up point.

As illustrated in FIG. 8(d) the return conveyor 31(f) connects with the front curve supply conveyor 27 to return the empty pallets two at a time to the front curve pick-up point. Suitable pushing means 222 having reciprocating push arm 224 pushes the pallets onto the supply conveyor 27 where they are conveyed to the front curve injection mold assembly 20 to receive a new set of eight front curve lens mold halves in the manner described above.

We claim:

1. An apparatus for the automated manufacturing of contact lenses from a polymerizable hydrogel in a low oxygen environment, said apparatus comprising;
   (a) a molding station for injection molding fully degassed first and second polyolefin plastic mold parts for the production of soft contact lenses,
   (b) an enclosure for receiving said mold parts from said molding station and maintaining said mold parts in an inert gas environment for a period sufficient to remove substantially all of the oxygen from within the plastic mold parts,
   (c) a first automated station for receiving a plurality of first plastic mold parts and depositing therein a predetermined amount of a polymerizable hydrogel;
   (d) a second automated station for receiving said plurality of first plastic mold parts and assembling each first mold part with a second plastic mold part with said polymerizable hydrogel in a cavity formed therebetween;
   (e) a radiant energy source for polymerizing said polymerizable hydrogel in said cavity after said first and second halves are clamped together; and
   (f) a third automated station for removing said second plastic mold part and any excess hydrogel from said first plastic mold part and said molded contact lens.

2. An apparatus as claimed in claim 1 which further includes enclosure means for surrounding said first, second and third automated stations with an inert atmosphere.

3. A method of automatically molding contact lenses from a polymerizable monomer or monomer mixture in a low oxygen environment, said method comprising;
   (a) molding first and second polyolefin plastic mold parts for the production of soft contact lens blanks in first and second automated molding stations,
   (b) transferring said mold parts from said molding stations to an inert gas environment for a period sufficient to remove substantially all the oxygen from within the plastic mold parts and transporting said mold parts in said inert gas environment to and from a plurality of automated stations;
   (c) depositing a predetermined amount of a polymerizable monomer or monomer mixture in said first plastic mold part;
   (d) assembling each first mold part with a second mold part with the monomer or monomer mixture therebetween and then
   (e) polymerizing said monomer or monomer mixture in said cavity with radiant energy; and
   (f) automatically removing said second mold part and any excess monomer from said first plastic mold part and said molded contact lens.

4. A method as claimed in claim 3 which further includes the step of degassing the monomer or monomer mixture prior to filling the first mold part.

5. A method as claimed in claim 3 which further includes the step of molding sets of said first and second mold parts at a temperature of at least 450 degrees F. within a cycle time of 3 to 12 seconds.

6. A method as claimed in claim 5 wherein the step of transferring said molded sets from said molding step to said inert gas environment occurs within 15 seconds of the completion of said molding step.

7. A method as claimed in claim 3 wherein said method further includes the step of clamping said mold parts together in said assembly step while under vacuum to firmly seat and align the mold parts.

8. A method as claimed in claim 3 which further includes the step of forming each mold part with a flange member, and then coating the flange of said first mold part with a surfactant prior to assembly of said mold parts.

9. A method as claimed in claim 3 which further includes the step of transporting said first and said second mold parts in sets, on separate pallets.

10. A method as claimed in claim 9 wherein said transporting step further includes the step of interleaving pallets with a set of first mold parts with pallets having a set of second mold part.

11. A method as claimed in claim 10 which further includes the step of picking up a set of second mold parts from a pallet in a first cycle, and depositing said set of second mold parts on said first mold parts in a second pallet during a second cycle to assemble said mold.

12. An apparatus for the automated molding of contact lenses from a polymerizable hydrogel in a low oxygen environment, said apparatus comprising:
   (a) a molding station for injection molding fully degassed first and second mold parts for the production of soft contact lens blanks;
   (b) a transport means for receiving said mold parts from said molding station and transporting said mold parts in a low oxygen environment to and from a plurality of automated stations;
   (c) a first automated station for receiving a plurality of first mold parts and depositing therein a predetermined amount of a polymerizable hydrogel, said first automated station receiving said plurality of mold parts in a low oxygen environment;
   (d) a second automated station for receiving said plurality of first mold parts and assembling each first mold part with a second mold part in a low oxygen environment;
   (e) an automated station for clamping said first mold part against said second mold part for a predetermined pressure and time in a low oxygen environment to define a contact lens mold cavity and to remove any excess hydrogel from said cavity;
   (f) a radiant energy source for polymerizing said polymerizable hydrogel in said cavity after said first and second parts are clamped together; and
   (g) an automated demolding station for removing said second mold part and any excess hydrogel from said first mold part and said molded contact lens after polymerization of said lens.

13. An apparatus as claimed in claim 12 which further includes a means for degassing the hydrogel prior to deposit in said first mold part.

14. An apparatus as claimed in claim 12 wherein said molding station injection molds said first and second mold parts at a temperature of at least 450 degrees F. over a cycle of 3 to 12 seconds.

15. An apparatus as claimed in claim 12 which further includes robotic means for transfer of said mold parts from said molding station to said transport means and said low oxygen environment within 15 seconds or less.

16. An apparatus as claimed in claim 12 wherein said second automated station further includes a first clamping means for clamping said mold parts together under vacuum to displace any excess hydrogel and to firmly seat and align the mold parts.

17. An apparatus as claimed in claim 12 wherein each mold part includes a flange member, and said apparatus further includes a station for coating the flange of said first mold part with a surfactant prior to assembly of said mold parts.

18. An apparatus as claimed in claim 12 wherein said first mold parts are transported to said first and to said second automated stations on a pallet by said transport means.

19. An apparatus as claimed in claim 18 where said pallet includes registration means to cooperate with said second station to register said pallet prior to assembly of said mold parts.

20. An apparatus as claimed in claim 19 wherein said pallet includes a perimeter seal area to cooperate with a perimeter seal formed at said second automated station to enable assembly under vacuum.

21. An apparatus as claimed in claim 19 wherein said transport means further includes separate pallets for said second mold parts, wherein said pallets having first mold parts are interleaved with pallets having second mold parts.

22. An apparatus as claimed in claim 21 wherein said second automated station cycles between pallets, picking up second mold parts from a pallet in a first cycle, and depositing said second mold parts on said first mold parts in a second pallet during a second cycle to assemble said mold.

23. An apparatus as claimed in claim 12 wherein said first and second automated stations further comprise:
 (i) a housing member for surrounding aligned first and second mold parts to thereby enable a vacuum to be drawn around said parts; and
 (ii) said second automated station having a reciprocating means for reciprocating said second mold parts along a reciprocating axis to clamp said second mold parts against said first mold part with a predetermined pressure while said vacuum remains drawn.

24. An apparatus as claimed in claim 23 wherein said housing member and said reciprocating means reciprocate along parallel axes.

25. An apparatus as claimed in claim 24, wherein said reciprocating means includes a separate reciprocating member for each second mold part carried in said pallet.

26. An apparatus as claimed in claim 25 wherein each reciprocating member includes a seating means for engaging said second mold part and a vacuum port for drawing a vacuum between said reciprocating member and said second part to thereby enable said reciprocating member to lift said second mold part from its associated pallet.

27. An apparatus as claimed in claim 26 wherein each of said reciprocating members are separately biased from a common air plenum with respect to said reciprocating means to allow independent reciprocation and clamping by each reciprocating means at a common predetermined pressure.

28. An apparatus as claimed in claim 27 wherein said housing member may reciprocate with respect to said reciprocating means, and is resiliently biased to a first position with respect to said reciprocating means.

29. An apparatus as claimed in claim 28 wherein said resilient bias between said housing and said reciprocating means establishes a predetermined crush bias between said housing and said pallet to maintain said vacuum within said housing during assembly of said mold parts.

30. An apparatus as claimed in claim 12 wherein said first means for clamping is mounted within and defines a portion of said assembly station, and said apparatus further includes a precure station, said precure station including a second means for clamping said first and said second mold parts together and a radiant energy source for precuring said polymerizable hydrogel while said first and second parts are clamped together.

31. An apparatus claimed in claim 30 wherein said apparatus further includes a control means for varying the quantity of energy received by said hydrogel at said precure station.

32. An apparatus as claimed in claim 30 wherein said precure station includes a reciprocating clamping member positioned between said molds and said radiant energy source for clamping said first mold part against said second mold part.

33. An apparatus as claimed in claim 30 wherein said transport means moves said molds into resilient engagement with said second clamping member as said molds are moved into an exposure position.

34. An apparatus as claimed in claim 30 wherein said resilient clamping members are mounted on said radiant energy source and said radiant energy source moves said clamping members into resilient engagement with mold parts when said molds are moved into an exposure position.

35. An apparatus as claimed in claim 32 wherein each of said clamping members include an annular cylinder having an in annular diameter greater than the diameter of the contact lens to be polymerized.

36. An apparatus as claimed in claim 35 wherein said annular cylinder is resiliently biased into engagement with said mold.

37. An apparatus as claimed in claim 36 wherein said clamping pressure is 0.5 to 2.0 Kgf.

38. An apparatus as claimed in claim 34 wherein said radiant energy is emitted by ultraviolet lamps at 320 to 390 nm.

39. An apparatus as claimed in claim 33 wherein said transport means includes a plurality of lifting standards for raising said pallets into engagement with said second means.

40. An apparatus as claimed in claim 12 wherein said contact lens molds includes a first mold part and a second mold part, each part comprising an integral article of thermoplastic polymer transparent to ultraviolet light, said article having a central curved section defining a concave surface, a convex surface and a circular circumferential edge, at least the central portion of at least one of said concave surface and said convex surface having the dimensions of the front or back curve, respectively, of a contact lens to be produced in said mold assembly and being sufficiently smooth that the surface of a contact lens formed by polymerization of said polymerizable composition in contact with said surface is optically acceptable, said article also having an annular flange integral with and surrounding said circular circumferential edge and extending therefrom in a plane normal to the axis of said concave surface.

41. An apparatus as claimed in claim 40 in which each of said mold parts also has a generally triangular tab situated in a plane normal to said axis and extending from said flange, said article having a thinness sufficient to transmit heat therethrough rapidly and rigidity effective to withstand prying forces applied to separate said mold part from said mold assembly.

42. An apparatus as claimed in claim 40 wherein the surface of each mold part is essentially free of oxygen when molded.

43. An apparatus as claimed in claim 40 wherein said thermoplastic polymer is polystyrene.

44. An apparatus as claimed in claim 40 wherein each mold part is of essentially uniform thickness.

45. An apparatus as claimed in claim 40 wherein the central portion of said convex surface has the dimensions of the back curve of a contact lens that can be produced by polymerization of a polymerizable composition in contact with said convex surface, and wherein said convex surface is sufficiently smooth that the surface of said back curve can be worn comfortably in the eye.

46. An apparatus as claimed in claim 12 wherein said apparatus further includes a third automated station located between said first and said second station for applying a surfactant to at least one surface of said first mold part, wherein said surfactant assist in the release between said first and second mold parts and enables removal of any excess polymer molding material adherent to said at least one surface of said first mold part.

47. An apparatus as claimed in claim 46, wherein said third automated station includes:
(a) stamping means including at least one stamp being arranged in spaced relationship above said transport means, said at least one stamp being positionable in vertical alignment with said at least one first mold part;
(b) means for coating said stamp with a surfactant; and
(c) actuating means for said stamping means to displace said stamping means downwardly to an extent such that the surfactant-wetted surface portions of said at least one stamp contacts said at least one surface of said first mold part so as to impart a coating of said surfactant thereto.

48. An apparatus as claimed in claim 47 wherein said third station further includes a pad member containing a surfactant which is interposable between said stamping means and said at least one first mold part and means for displacing said pad member from the interposition thereof in said apparatus between said stamping means and said at least one first mold part.

49. An apparatus as claimed in claim 48, wherein said third station includes operative means for alternatingly positioning said pad member beneath said stamping means and withdrawing said pad member from said location in said apparatus to enable said at least one stamp to advance downwardly into contact with said at least one surface of said at least one first mold part.

50. An apparatus as claimed in claim 48, wherein said pad member comprises a porous polyethylene member having an average 10 micron pore size, said member being impregnated with a solution containing said surfactant.

51. An apparatus as claimed in claim 50, wherein an upper surface of said porous polyethylene member facing said at least one stamp of said stamping means is covered by a filter having a mesh size with opening of about 1.2 microns.

52. An apparatus as claimed in claim 51, wherein said filter controls the amount of surfactant wicked through said member and expelled upwardly through said filter in response to pressure exerted thereon upon being contacted by said at least one stamp so as to deposit a predetermined quantity of said surfactant on contacting surface portions of said at least one stamp.

53. An apparatus as claimed in claim 52, wherein at least the surface portions of said at least one stamp contacting said pad member for assuming surfactant therefrom is constituted from a compound comprising about 90% urethane and 10% silicone.

54. An apparatus as claimed in claim 47, wherein a plurality of said first mold parts are mounted on a pallet carried by said transport means, each said first mold part comprising a front curve for molding a hydrophilic polymer contact lens and an encompassing flange portion, each said mold means being operatively aligned with respectively one said stamp whereby contact between said front curve and an associated stamp transfers a thin film of said surfactant to a facing surface on said flange portion about said front curve from said stamp thereby facilitating detaching of a second mold part comprising a base curve for said lens and a ring of excess molding material adhesively deposited on the surfaces of said flange portion.

55. An apparatus as claimed in claim 12 wherein said transport means includes:
(a) one or more pallets for carrying one or more contact lens parts throughout the apparatus, said pallets having one or more first recesses formed in a surface thereof for receiving either one or more first mold parts or one or more second mold parts prior to assembling said contact lens mold; and
(b) conveyor means for transporting said pallets from station to station throughout said production line facility.

56. An apparatus as claimed in claim 55, wherein said transport means further includes registration means formed in said pallet surface for enabling precise positioning of said pallet at one or more automated stations in apparatus.

57. An apparatus as claimed in claim 56 wherein each of said first mold parts and second mold parts includes an annular uniplanar flange portion.

58. An apparatus as claimed in claim 57 wherein each of said first recesses further includes a recessed flange area for accommodating said annular flange portions of either said first mold part or said second mold part.

59. An apparatus as claimed in claim 55 wherein each of said first mold parts and second mold parts includes an uniplanar tab portion extending from said annular flange.

60. An apparatus as claimed in claim 59 wherein each of said first recesses further includes a recessed tab area for accommodating said tab portion of either said first mold part or said second mold part to normally seat said mold parts in a predetermined T or IC orientation within a respective first recess.

61. An apparatus as claimed in claim 55 wherein said conveyor means includes a rail means for guiding said pallet throughout predetermined portions of said production line, each of said pallets including indentations for engagement with said rail means while being transported.

62. An apparatus as claimed in claim 61 wherein said conveyor means includes a walking beam for driving said pallet along said rail means.

63. An apparatus as claimed in claim 55 wherein said conveyor means includes at least one single belt means for serially transporting pallets for predetermined distances along said production line.

64. An apparatus as claimed in claim 61 wherein said conveyor means includes a ram means for pushing said pallet for predetermined distances along said rail means.

65. An apparatus as claimed in claim 55 wherein said conveyor means comprises first and second belt means for simultaneously transporting a respective first series and second series of pallets, said first belt means conveying said first series of pallets carrying said first mold parts and said second belt means conveying said second series of pallets carrying said second mold parts for conveyance thereof.

66. An apparatus as claimed in claim 65 wherein said transport means further includes sequencing means for positioning a pallet carrying said first mold parts from said first belt means adjacent a pallet carrying said second mold parts from said second belt means and enabling said adjacently positioned pallets to be conveyed on a third belt means through said apparatus.

67. An apparatus as claimed in claim 65 which further includes accumulating means for enabling a series of pallets to accumulate on said conveyor means for batch processing at predetermined portions of said production line facility.

68. An apparatus as claimed in claim 67 wherein said accumulating means for enabling batch processing throughout predetermined portions of said production line facility includes a pallet clamping means at a downstream location for stopping motion of one or more pallets located upstream of said pallet clamping means to enable accumulation of pallets therebehind.

69. An apparatus as claimed in claim 68 which further includes ram means for enabling sequential transport of said pallets on said conveyor means after batch processing thereof.

70. An apparatus as claimed in claim 66 wherein said second mold parts are removed from said second series of pallets for assembly of contact lens molds at said second automated station.

71. An apparatus as claimed in claim 70 wherein said transport apparatus further includes means for returning said empty pallet along a forth belt means from said second automated station to said second belt means to receive said second mold parts.

72. An apparatus as claimed in claim 12 wherein said automated demolding station is adapted for demolding a mold assembly having a first and second flange formed on each of said first and second mold parts, and said station further includes:
(a) heating means for applying heat to said second mold part to form a temperature gradient between said second mold part and the contact lens; and,
(b) pry means for demolding said lens, said pry means inserted between said flanges of said first and said second mold parts of said mold assembly, said pry means including a first and second set of pry fingers for biasing said second mold part upwardly at a predetermined force with respect to said first mold part to remove said second mold part therefrom.

73. An apparatus as claimed in claim 72 wherein said pry means lifts said back mold part from said front mold part at a predetermined time after application of said heat.

74. An apparatus as claimed in claim 72 wherein said demolding station further includes a gripping means which simultaneously grips said second mold part when said second mold part is removed from its associated first mold part.

75. An apparatus as claimed in claim 72 wherein said pry means includes means for displacing said first set of pry fingers in a substantially vertical direction while said second set of pry fingers anchors said first mold parts, thereby separating said parts.

76. An apparatus as claimed in claim 75 wherein said first and second set of pry fingers are extensible from a first retracted position to a second extended position between said flanges of said first and said second mold parts of said mold assembly.

77. An apparatus as claimed in claim 76 wherein said pry means are inserted between said first and second flanges of said first and second mold parts of said contact lens mold assembly while said heat is applied to each second mold part by a heating means.

78. An apparatus as claimed in claim 77 wherein said heating means comprises means for applying a predetermined amount of steam.

79. An apparatus as claimed in claim 78 wherein said heating means for applying steam includes a means for discharging steam through a nozzle associated with a mold assembly.

80. An apparatus as claimed in claim 79 wherein said heating means further including means for advancing said steam discharging means from a first position to a second position in contact with said second mold part prior to discharging steam to said second mold part surface, and retracting said steam discharging means away from said second mold part towards said first position after discharging steam.

81. An apparatus as claimed in claim 12 wherein said automated demolding station further includes a gripping means for gripping and removing each of said second mold parts when said second mold part is separated from its respective first mold part.

82. An apparatus as claimed in claim 12 wherein said automated demolding station includes a steam nozzle assembly for heating the second mold part of a polymerized contact lens mold assembly, said nozzle assembly including:
(a) a plurality of steam nozzles for engaging a plurality of contact lens mold assemblies, each of said nozzles including:
(i) means for sealing said nozzle to said mold assembly to create a heating chamber between said nozzle and said contact lens mold assembly;
(ii) a steam orifice for discharging steam into said heating chamber; and
(iii) at least one port defined in each of said nozzles for exhausting steam from said heating chamber,
(b) means for moving said steam nozzles into engagement with said contact lens mold assemblies;
(c) a first plenum for distributing steam to each of said nozzle assemblies; and
(d) a second plenum for drawing a vacuum through said vent ports to exhaust steam from said heating chamber whereby a temperature gradient may be created between said back curve mold part and the contact lens in said mold assembly.

83. An apparatus as claimed in claim 12 wherein said automated demolding station further includes a source of intense electromagnetic radiation for heating one of said mold parts prior to demolding, said radiation being absorbed by said one mold part to create a temperature differential between said mold part and the contact lens to be demolded.

84. An apparatus as claimed in claim 83, wherein said demolding station also includes means for directing said electromagnetic radiation from the source to impinge the outer surface of said mold part to be heated.

85. An apparatus as claimed in claim 84 wherein the source of electromagnetic radiation is a laser.

86. An apparatus as claimed in claim 85 wherein the radiation has a wavelength of about 10.6 μm.

87. An apparatus as claimed in claim 12 in which said automated demolding station is particularly adapted to demold contact lenses molded between said first and second mold parts, wherein said first mold part is a concave front curve mold part and the second mold part is a convex back curve mold part, each of said parts having an outwardly extending flange member, which flange members are spaced from and substantially parallel to each other, said demold station including a demold apparatus comprising:

(a) at least one pair of lower pry fingers, said pair joined together at a bight to form lower U-shaped pry tool;

(b) at least one pair of upper pry fingers, said pair joined together at a bight to form an upper U-shaped pry tool;

(c) first means for reciprocating said upper and lower pry tools along an insertion axis from a first conveying position to a second insertion position;

(d) second means for reciprocating said upper and lower pry tools along a first pry axis from a first insertion position to a second demolded position; and (e) control means for sequentially actuating said first means to insert said pry tools between the flange members of said mold, and then actuating said second means to lift said back curve mold part upwardly to thereby separate said back curve mold part from said front curve mold part.

88. An apparatus as claimed in claim 87 wherein a plurality of contact lenses and mold parts are carried by said transport means on a pallet and said apparatus includes a plurality of pairs of upper and lower pry fingers.

89. An apparatus as claimed in claim 88 wherein said pallet contains two rows of contact lenses and mold parts, and said apparatus includes first and second sets of upper and lower pry fingers, with a first set positioned on a first side of said pallet and a second set positioned on a second side of said pallet.

90. An apparatus as claimed in claim 89 wherein in each pry tool is a thin flat blade member having a plurality of outwardly extending pry fingers.

91. An apparatus as claimed in claim 90 wherein said blade members are sandwiched together for insertion between said flanges.

92. An apparatus as claimed in claim 87 wherein said demold apparatus further including a suction cup for each at least one pair of upper pry fingers.

93. An apparatus as claimed in claim 92 wherein said apparatus further includes a third means for independent reciprocal movement of said suction cup to remove said back curve mold part from said upper pry fingers after separation of said mold parts.

94. An apparatus as claimed in claim 87 wherein said apparatus further includes a means for heating said back curve mold part before said second means is actuated.

95. An apparatus as claimed in claim 94 wherein said means for heating includes a steam nozzle.

96. An apparatus as claimed in claim 94 wherein said means for heating includes a laser.

97. In a method of automatically molding contact lenses from a polymerizable monomer or monomer mixture in a low oxygen environment, wherein the method includes the steps of filling a polyolefin concave lens mold with a reactive monomer composition, forming a mold assembly with a polyolefin convex lens mold, and curing the reactive monomer composition therebetween to form a contact lens, an improvement to the method which comprises integrating a polyolefin lens mold production line with a contact lens production line, immediately transferring freshly molded polyolefin lens molds to an inert atmosphere and degassing the lens molds in said inert atmosphere for a predetermined time correlated to any atmospheric exposure to provide levels of oxygen at the reactive monomer/lens mold interface of no greater than $1 \times 10^{-8}$ moles/cm$^3$ prior to said filling, forming and curing steps.

98. The method of claim 97 wherein the inert atmosphere is nitrogen, and said immediate transfer occurs within 15 seconds of molding said lens molds.

99. The method of claim 98 wherein the predetermined time for said degass step is at least 3 minutes.

* * * * *